US012602115B2

(12) United States Patent
Gutnisky et al.

(10) Patent No.: US 12,602,115 B2
(45) Date of Patent: Apr. 14, 2026

(54) SYSTEMS AND METHODS FOR GUIDING USERS TO PERFORM DETECTABLE BIOPOTENTIAL-BASED GESTURES TIED TO SPECIFIC MOTOR UNITS, AND ACTIONABLE FEEDBACK ASSOCIATED THEREWITH

(71) Applicant: Meta Platforms Technologies, LLC, Menlo Park, CA (US)

(72) Inventors: Diego Adrian Gutnisky, San Francisco, CA (US); Najja Marshall, New York, NY (US); Emanuele Formento, San Francisco, CA (US); Mario Bräcklein, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/920,940

(22) Filed: Oct. 20, 2024

(65) Prior Publication Data
US 2025/0130646 A1 Apr. 24, 2025

Related U.S. Application Data

(60) Provisional application No. 63/591,724, filed on Oct. 19, 2023.

(51) Int. Cl.
G06F 3/01 (2006.01)
G06F 3/0346 (2013.01)
G09B 19/00 (2006.01)

(52) U.S. Cl.
CPC .............. G06F 3/017 (2013.01); G06F 3/015 (2013.01); G06F 3/0346 (2013.01); G09B 19/003 (2013.01)

(58) Field of Classification Search
CPC ........ G06F 3/017; G06F 3/015; G06F 3/0346; G06F 3/014; G09B 19/003
See application file for complete search history.

(56) References Cited

U.S. PATENT DOCUMENTS 10,585,489 B2 * 3/2020 Han ......................... G06F 3/017
10,782,790 B2 * 9/2020 Juliato ................... A61B 5/002
(Continued)

*Primary Examiner* — Grant Sitta
(74) *Attorney, Agent, or Firm* — Morgan, Lewis & Bockius LLP

(57) ABSTRACT

System and method for guiding a user in activating biological motor units (MUs) are disclosed. A method includes presenting instructions for performing a movement associated with activation of MUs, and graphical elements associated with the activation of the MUs. The method includes, in response to detecting an activation of the MUs, determining, based on biopotential sensor data captured during performance of the movement an additional movement to be performed by the user and a change to the graphical elements. The method includes presenting additional instructions for performing the additional movement, and the change to the graphical elements. The method includes, in response to detecting an additional activation of the MUs, in accordance with a determination that additional biopotential sensor data captured during performance of the additional movement satisfies a threshold, associating the additional biopotential sensor data with biopotential-based gestures, and presenting an additional change to the graphical elements.

20 Claims, 57 Drawing Sheets
(12 of 57 Drawing Sheet(s) Filed in Color)

(56)        References Cited

U.S. PATENT DOCUMENTS

| | | | |
|---|---|---|---|
| 10,852,928 B2 * | 12/2020 | Yi | H04N 5/64 |
| 10,908,695 B2 * | 2/2021 | Huffman | G06V 40/28 |
| 11,023,045 B2 * | 6/2021 | Liu | G06F 3/014 |
| 2009/0327171 A1 * | 12/2009 | Tan | G06F 3/015 |
| | | | 706/12 |
| 2014/0139454 A1 * | 5/2014 | Mistry | G06F 3/017 |
| | | | 345/173 |
| 2015/0301606 A1 * | 10/2015 | Andrei | G06F 1/163 |
| | | | 345/156 |
| 2016/0063232 A1 * | 3/2016 | Seol | G06F 21/32 |
| | | | 726/19 |
| 2023/0021247 A1 * | 1/2023 | Han | H04L 63/0815 |
| 2025/0291420 A1 * | 9/2025 | Alessi | G06F 3/0346 |

* cited by examiner

Almost There! Try To Focus On The Muscles On Or Around Your Little Finger

Magnificent! You've Performed A Micromovement. Remember That Feeling

Lets Practice! Perform The Little Finger Micromovement 5 Times

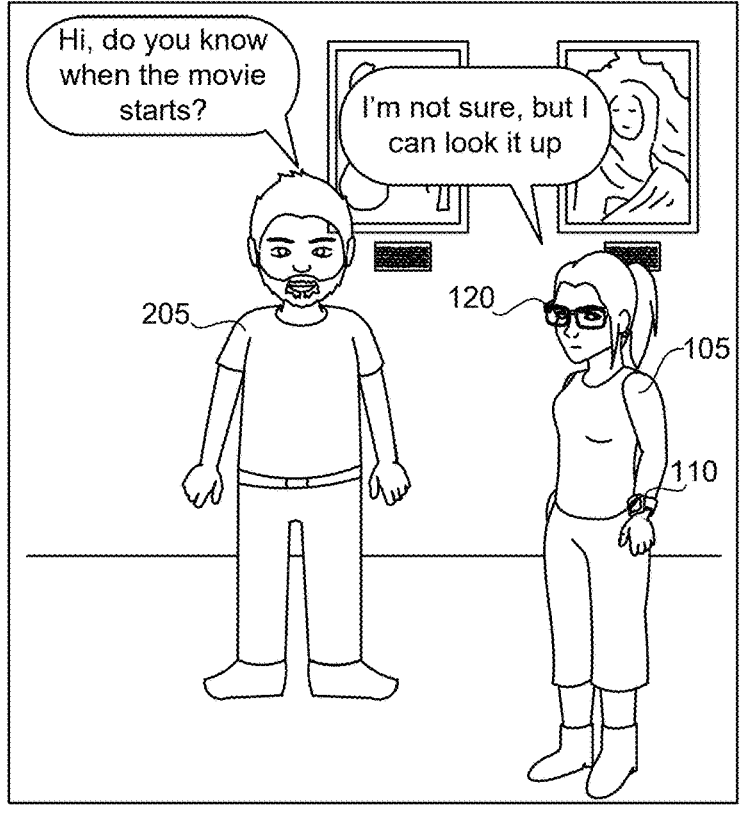
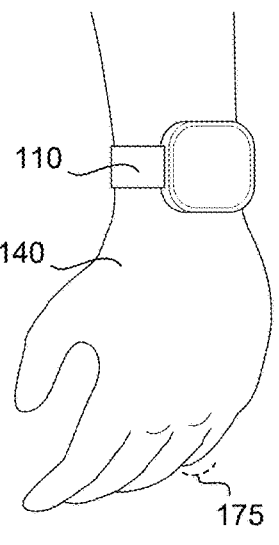
Figure 2A
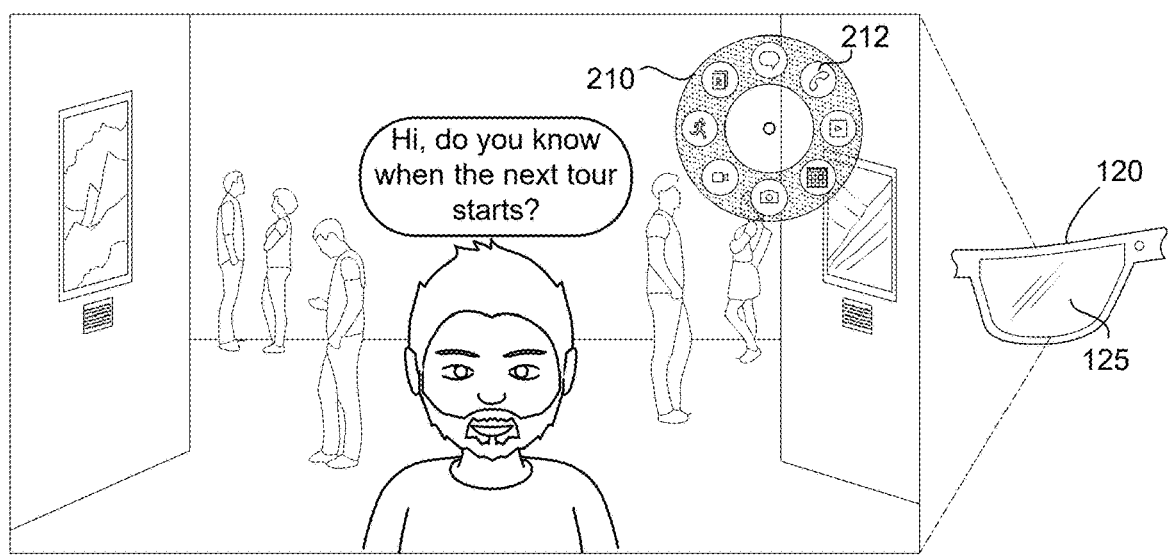
Figure 2B

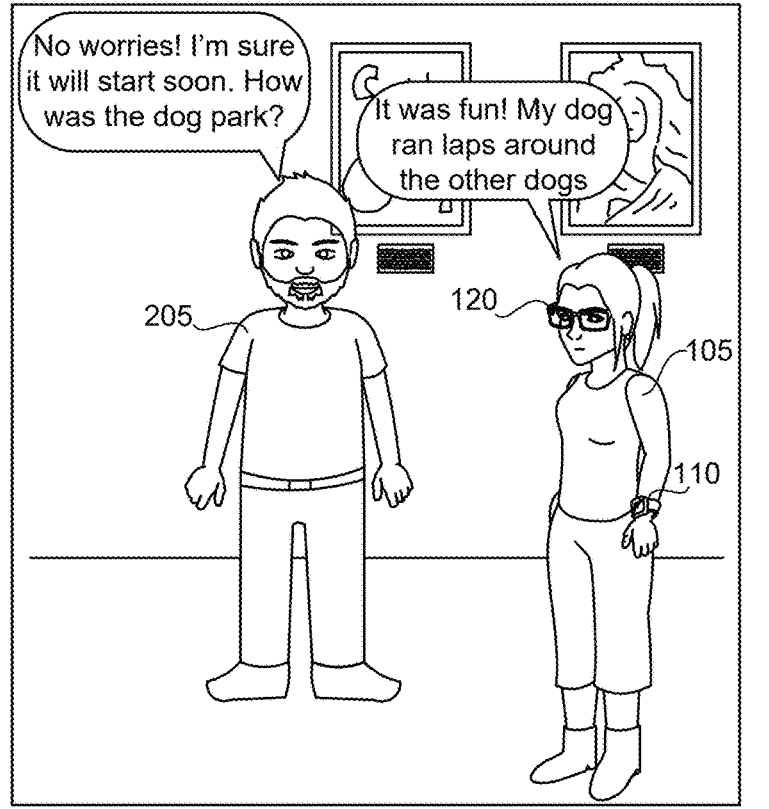
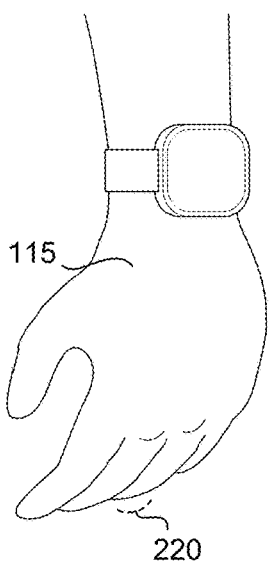
Figure 2C
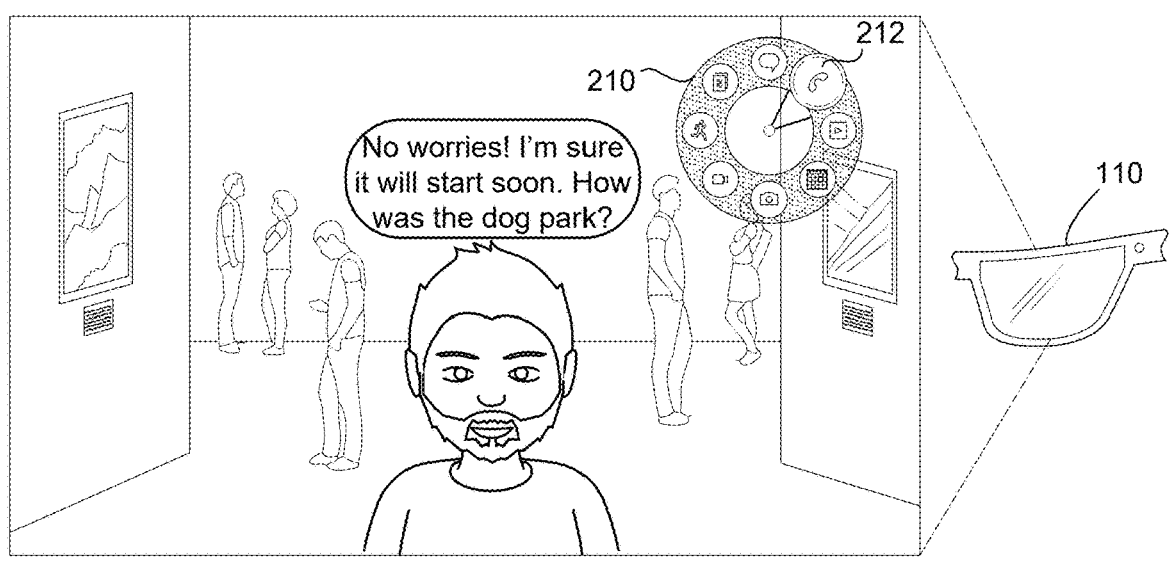
Figure 2D

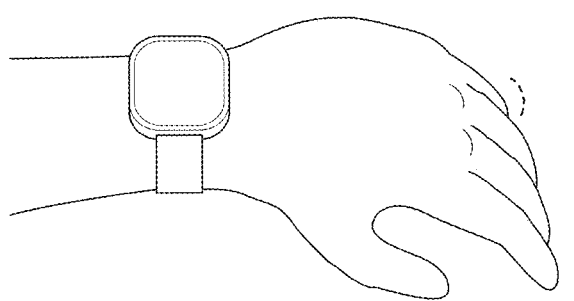
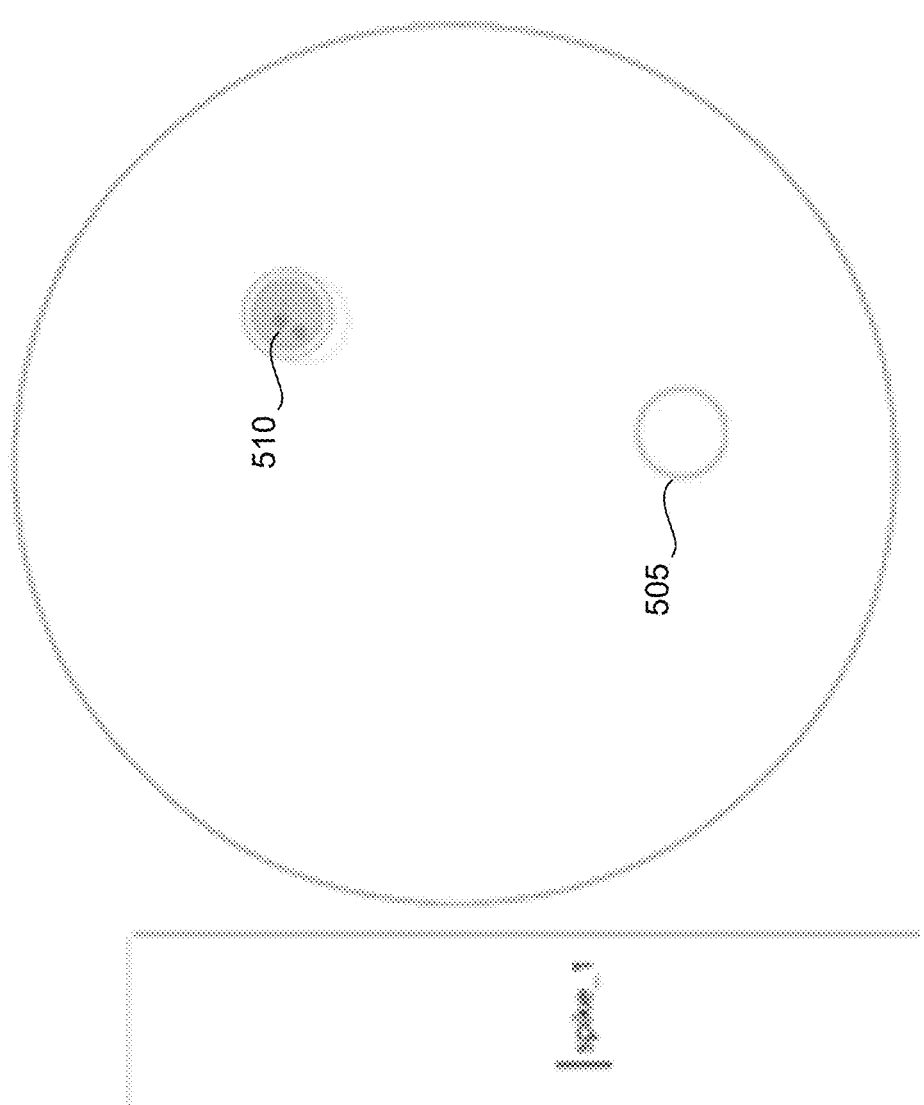
Figure 5A

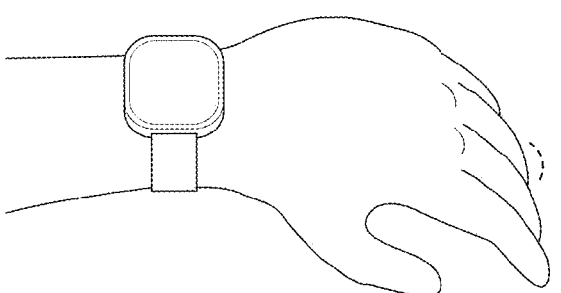
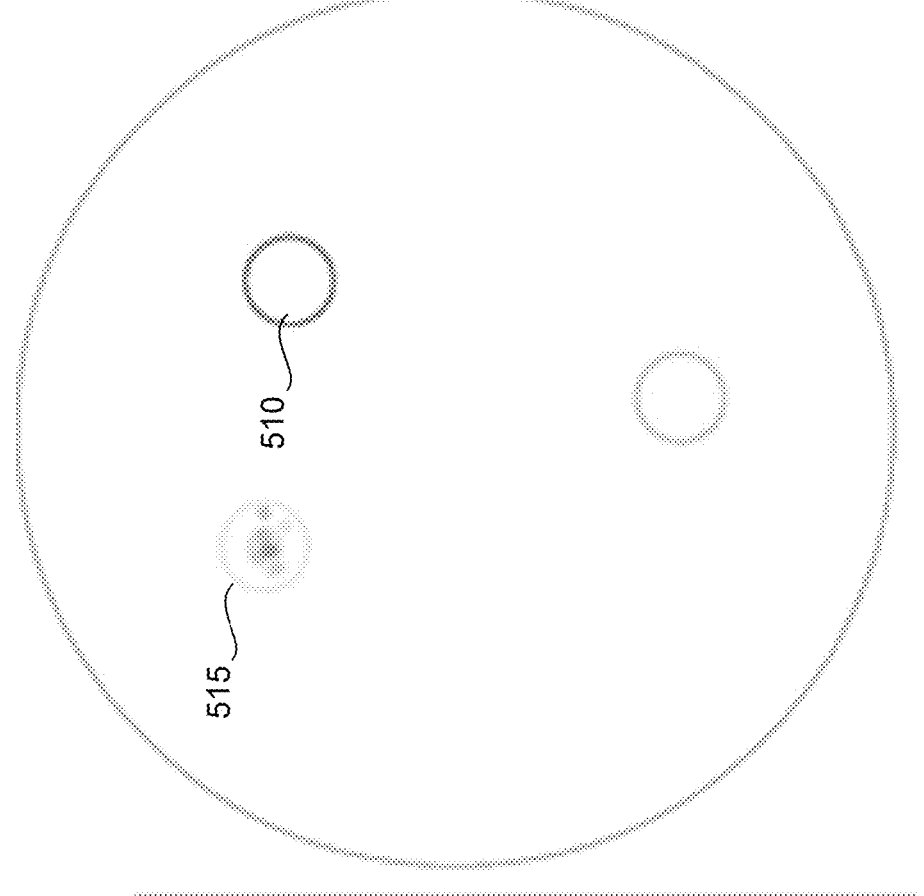
Figure 5B

510

515

Multiple discovery

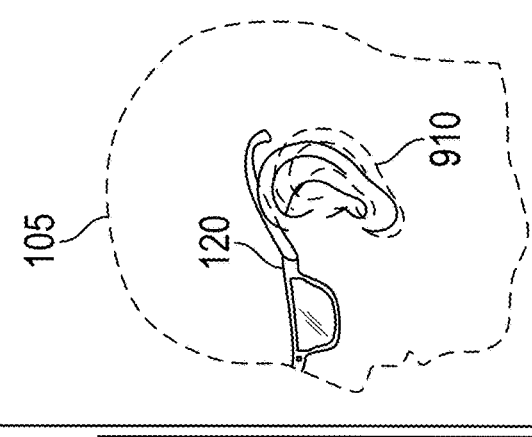
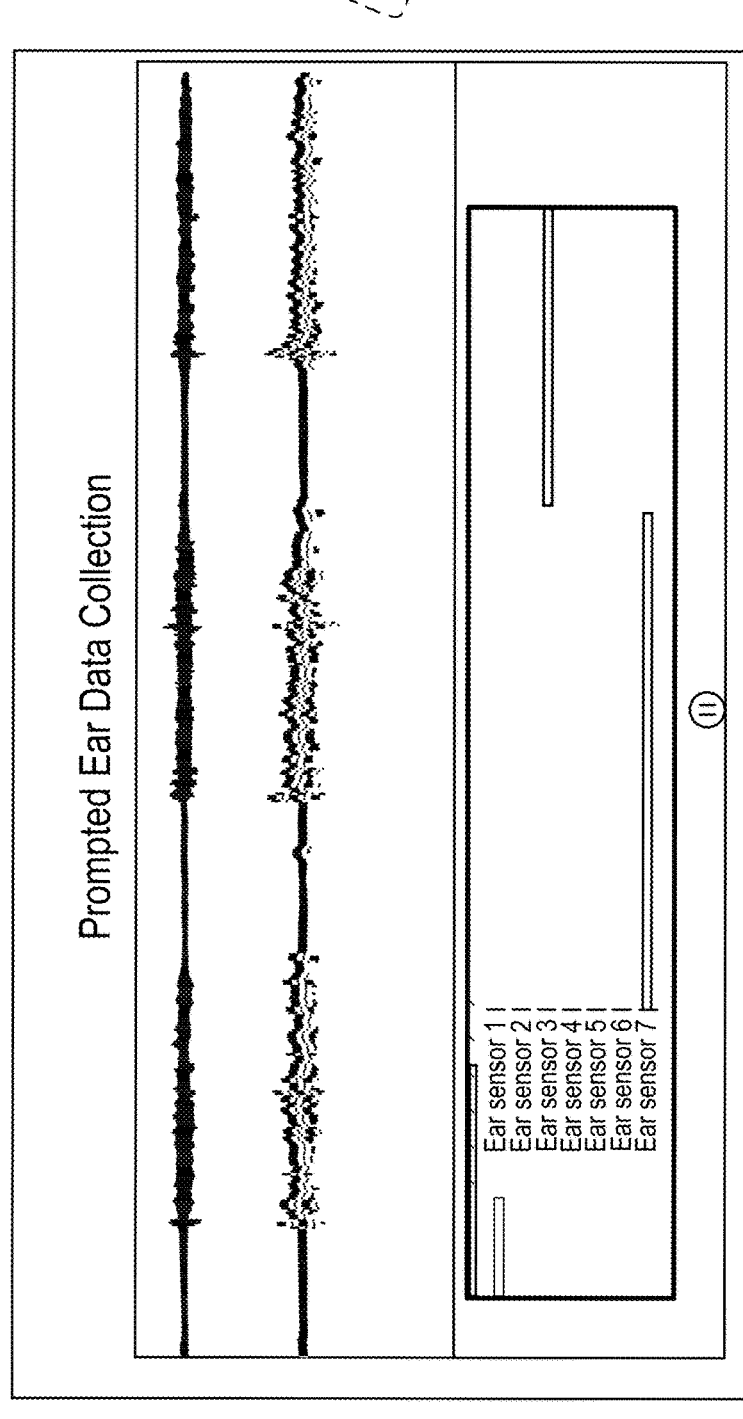
Figure 9

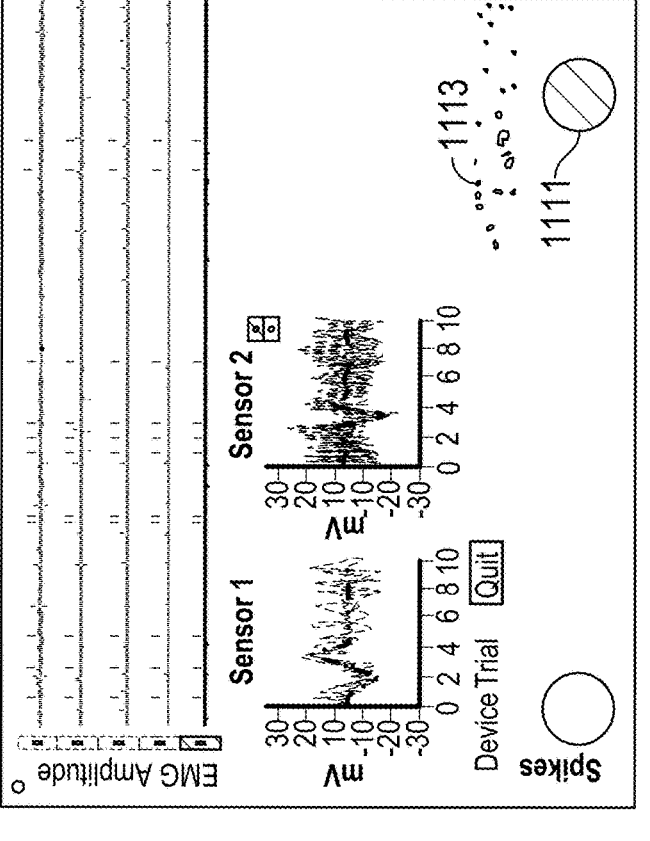
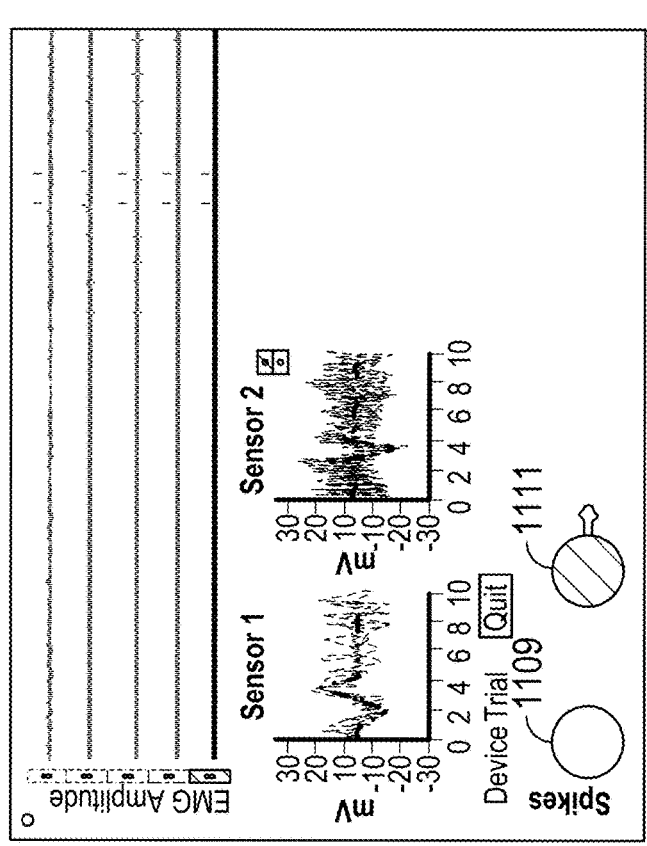
Figure 11C

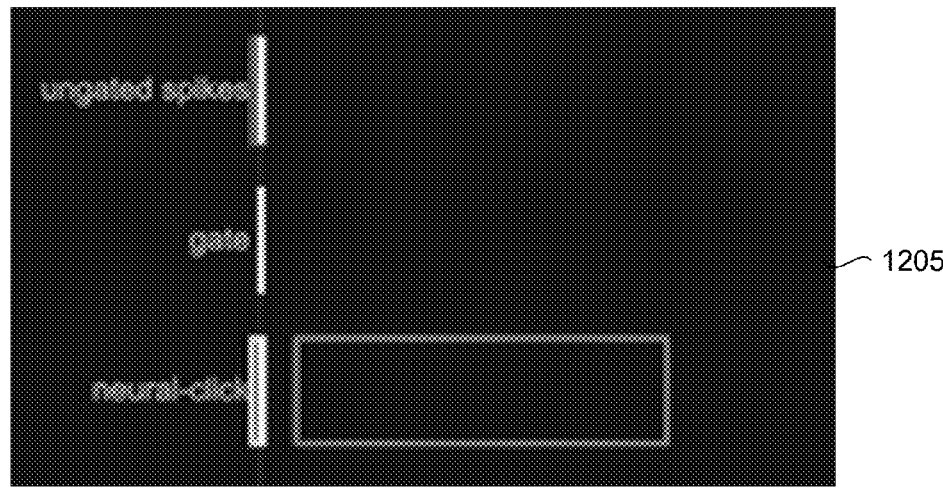
1205
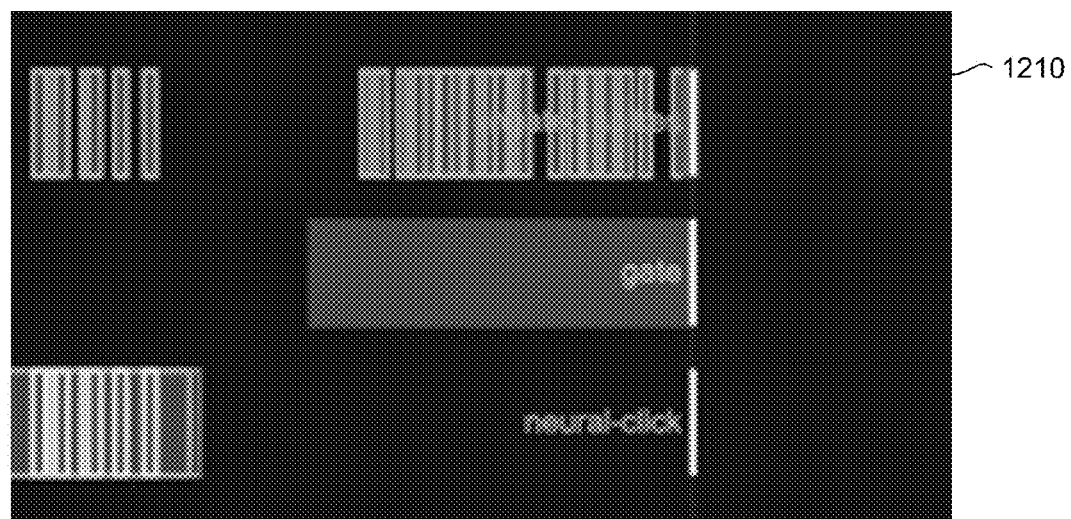
1210
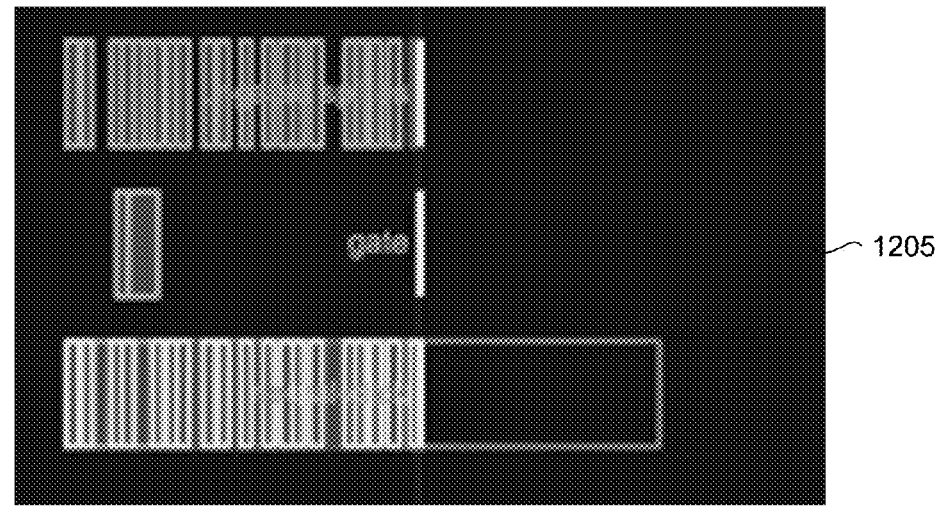
1205
Figure 12

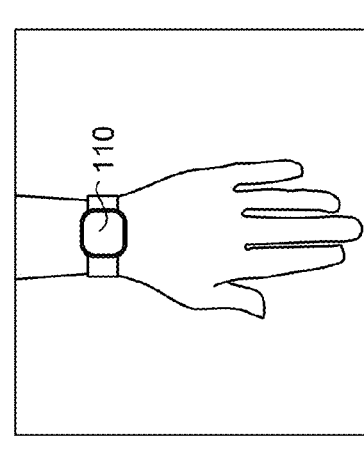
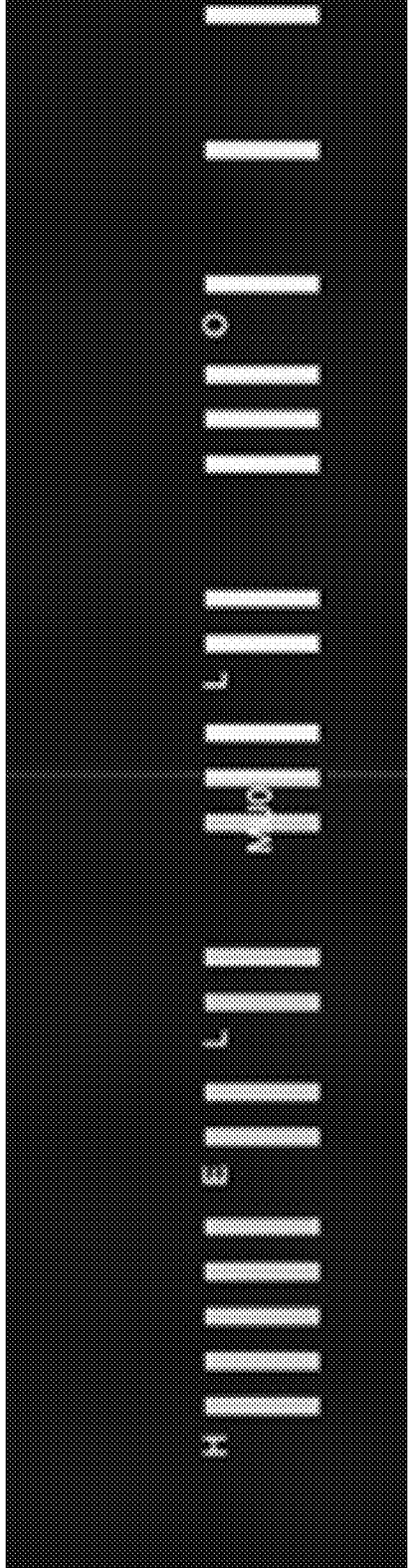
Figure 14

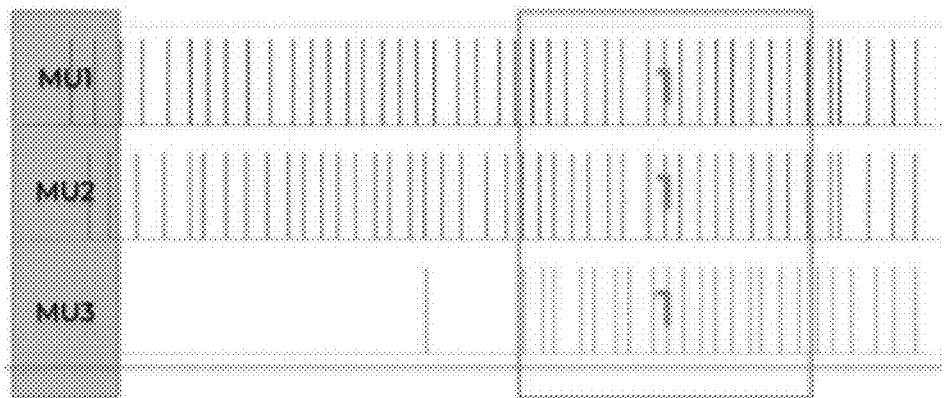
MU1, MU2, and MU3 activation
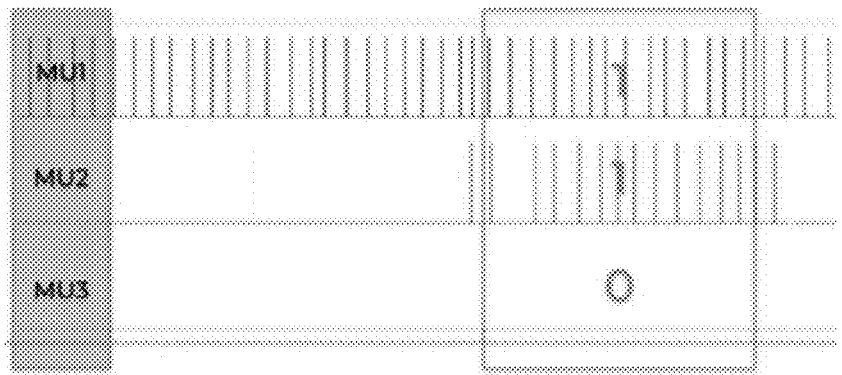
MU1 and MU2 activation
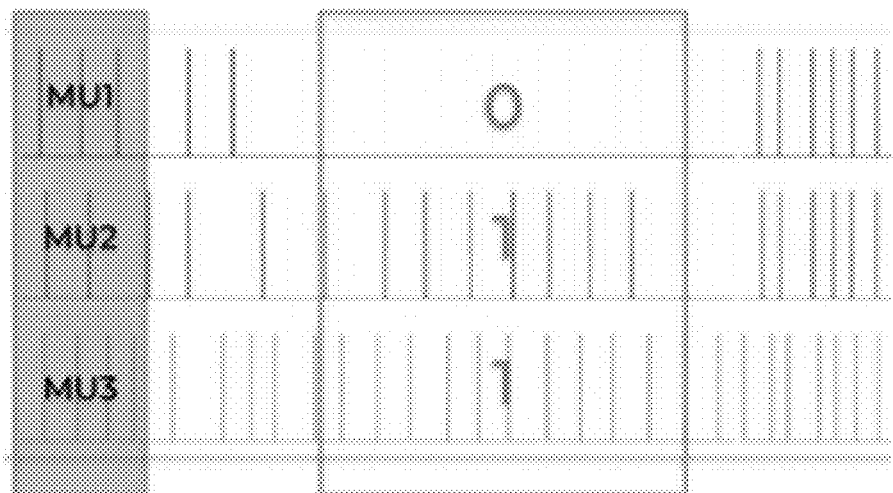
MU2 and MU3 activation
Figure 17A

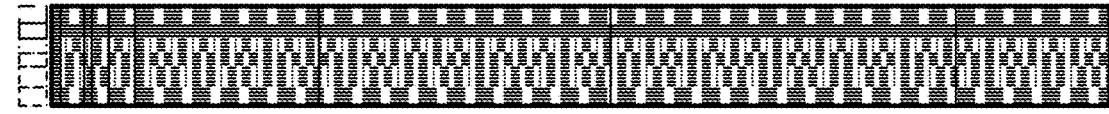
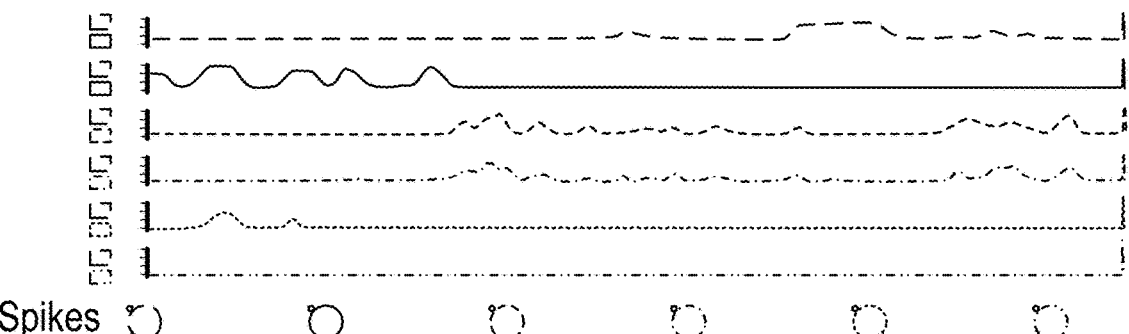
Spikes
Spikes
1805
1810
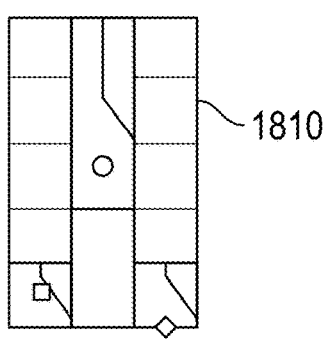
Figure 18

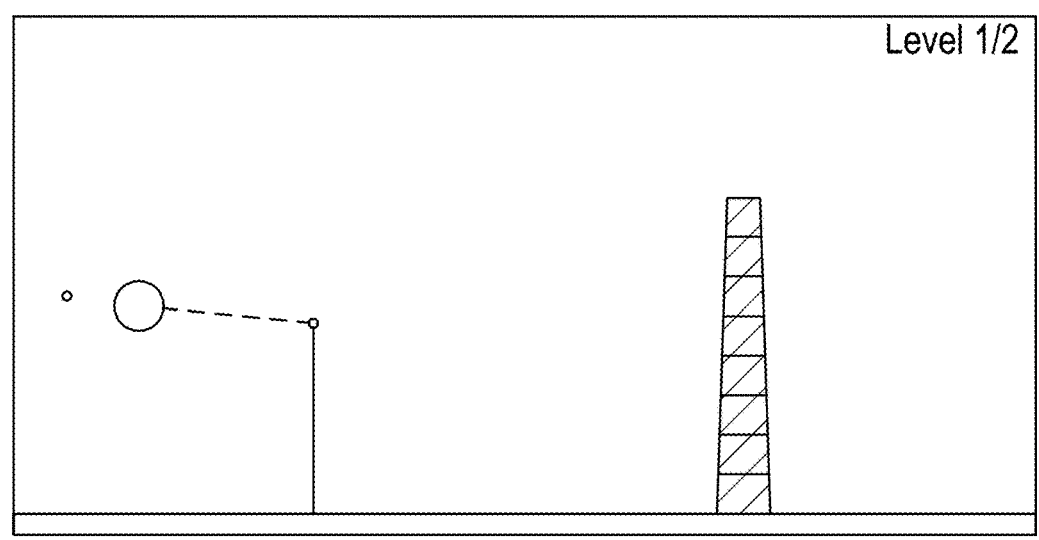
Level 1/2
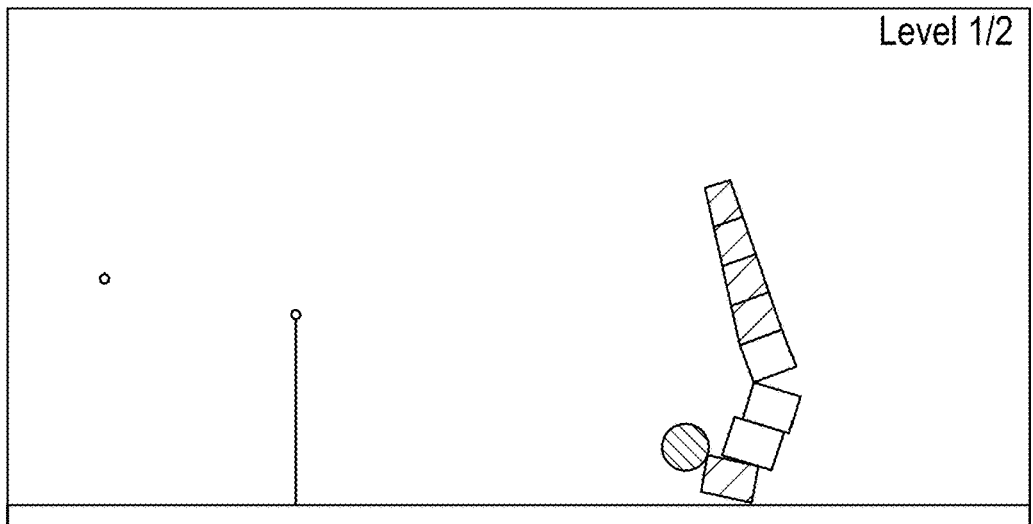
Level 1/2
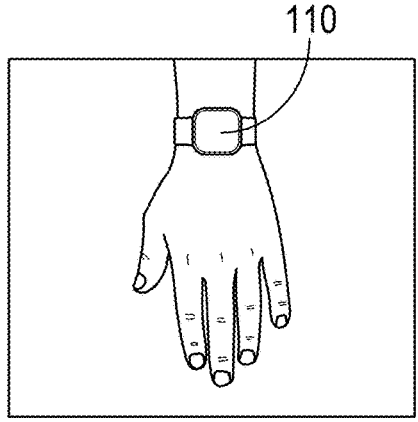
110
Figure 19

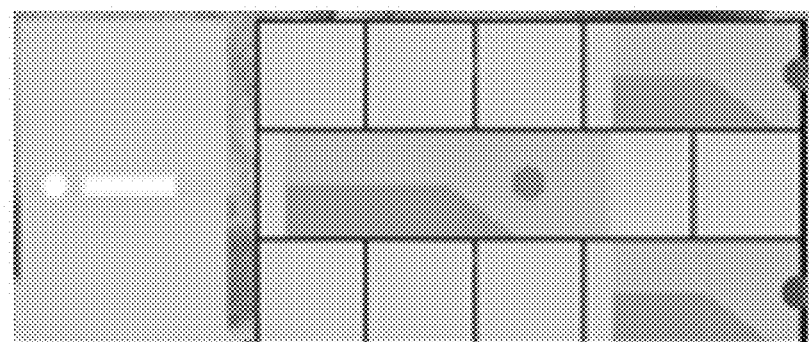
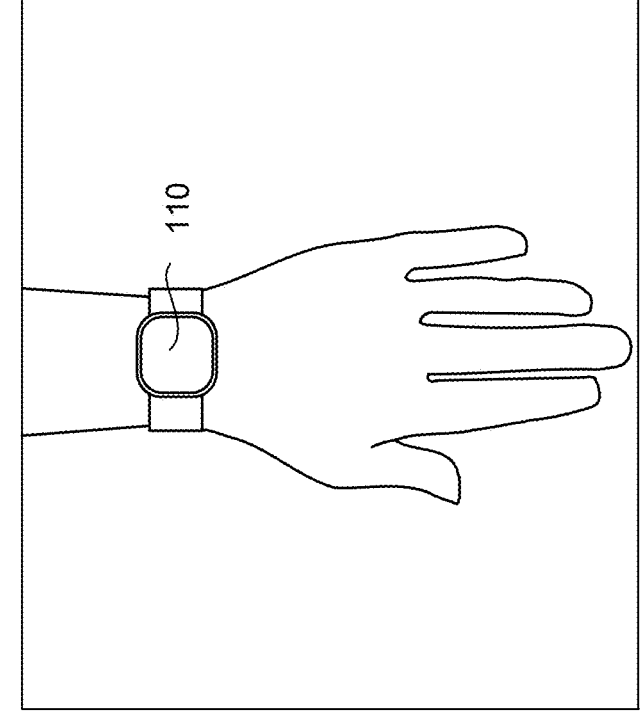
110
Figure 21

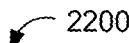
2200
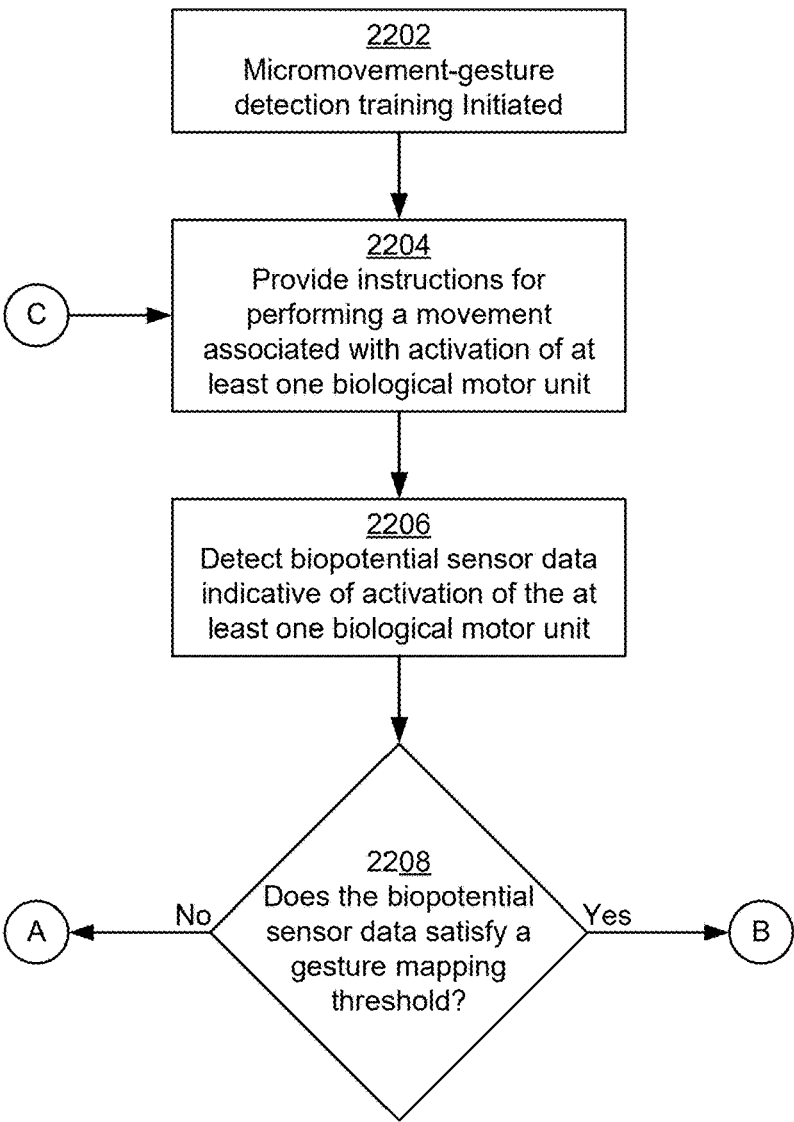
Figure 22A

2200
(Cont.)

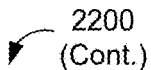
2200
(Cont.)
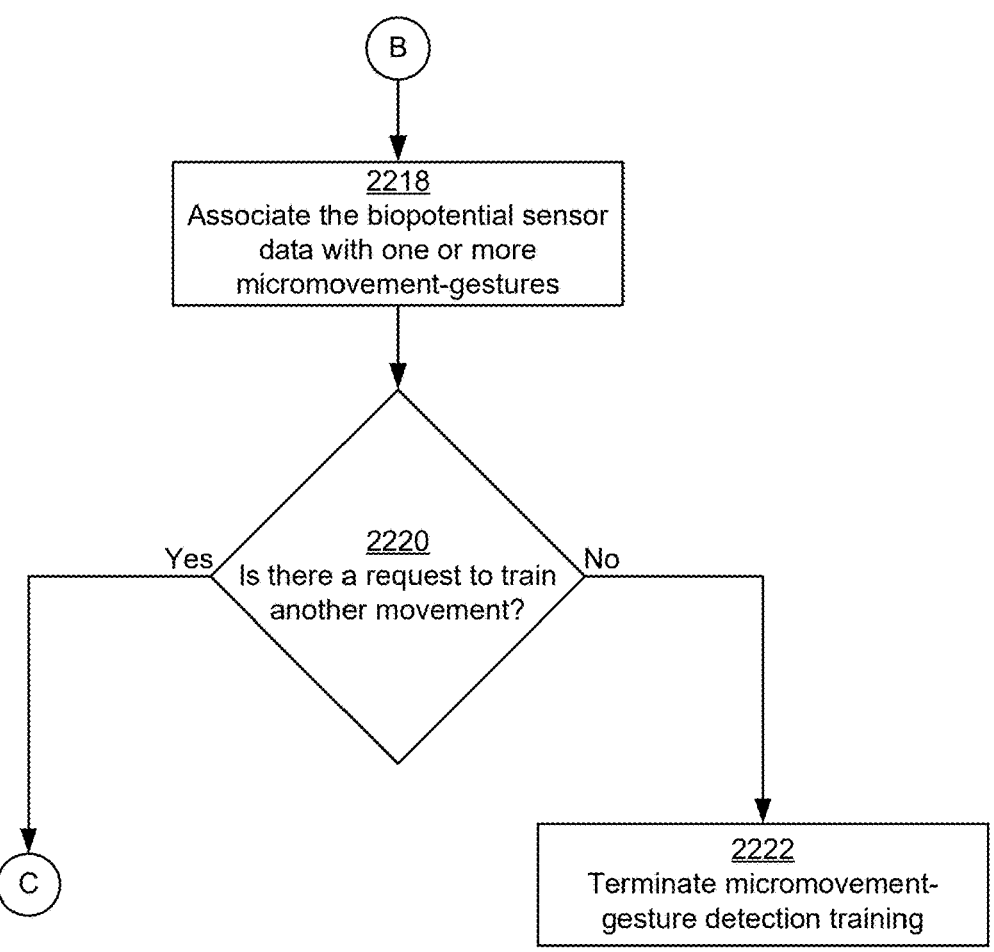
Figure 22C

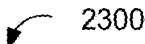 2300

2302
While an artificial-reality (AR) user interface (UI) is presented and overlayed over a field of view of a user:

2304
Present i) first instructions for performing a first movement associated with activation of one or more biological motor units, and ii) graphical elements associated with the activation of one or more biological motor units

2306
In response to detecting a first activation of the one or more biological motor units:

2308
determine, based on first biopotential sensor data captured during performance of the first movement:

2310
A second movement to be performed by the user

2311
The second movement is i) associated with the activation of the one or more biological motor units and is ii) predicted to generate optimized biopotential sensor data during performance of the second movement that would satisfy a gesture mapping threshold

2312
A first change to the graphical elements

2313
The first change indicating partial activation of the one or more biological motor units

2314
Present i) second instructions for performing the second movement, and ii) the first change to the graphical elements

Figure 23A

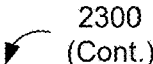

2300
(Cont.)

2302

A

---

2316
In response to detecting a second activation of the one or more biological motor units:

2318
In accordance with a determination that second biopotential sensor data captured during performance of the second movement satisfies the gesture mapping threshold:

2320
Associate the second biopotential sensor data with one or more biopotential-based gestures 2322
Present a second change to the graphical elements, the second change indicating successful activation of the one or more biological motor units

---

2324
In accordance with a determination that second biopotential sensor data captured during performance of the second movement does not satisfy the gesture mapping threshold:

2326
Determine, based on the second biopotential sensor data captured during performance of the second movement:

2328
A third movement to be performed by the user, the third movement i) associated with the activation of the one or more biological motor units at the portion of the user's body and ii) predicted to generate further optimized biopotential sensor data during performance of the second movement that would satisfy the gesture mapping threshold 2330
A third change to the graphical elements, the third change indicating additional partial activation of the one or more biological motor units 2332
Present third instructions for performing the third movement, and the third change to the graphical elements

Figure 23B

VR device 2610

2612

2614

2616

2648A-1

2639B     2639C     2639A     2639D

2616

2639D 2648A-2     2690

2618

2705
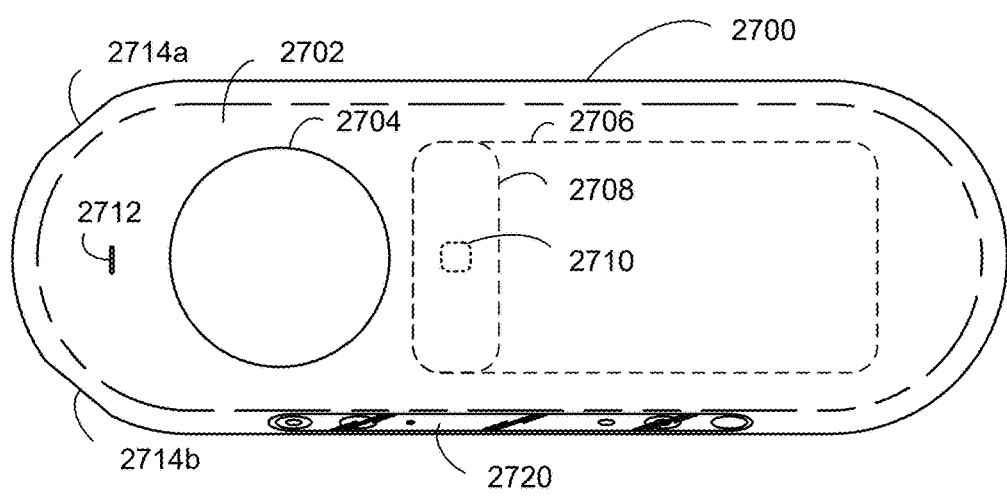
2725
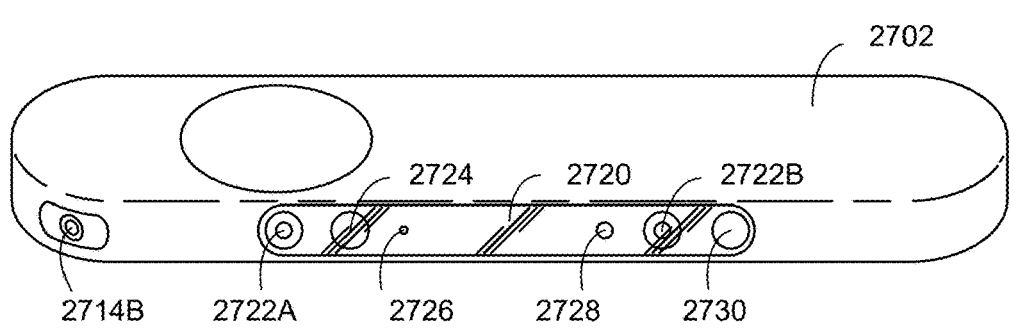
Figure 27A

SYSTEMS AND METHODS FOR GUIDING USERS TO PERFORM DETECTABLE BIOPOTENTIAL-BASED GESTURES TIED TO SPECIFIC MOTOR UNITS, AND ACTIONABLE FEEDBACK ASSOCIATED THEREWITH

CROSS-REFERENCE TO RELATED APPLICATIONS

This application claims priority to U.S. Prov. Patent App. No. 63/591,724, filed Oct. 19, 2023, entitled "Systems and Methods For Guiding Users To Perform Detectable Biopotential-Based Gestures Tied To Specific Motor Units, And Actionable Feedback Associated Therewith" which is hereby fully incorporated by reference in its entirety.

TECHNICAL FIELD

This description relates generally to the detection of biopotential-based gestures using biopotential sensors data captured during the activation of one or more biological motor units, and more specifically, including but not limited to techniques for training users to perform micromovements that activate one or more specific biological motor units involved in generating detectable biopotential sensors data, and active feedback for optimizing the micromovements (subtle body movements that cannot be easily seen by the human eye) and activation of the one or more specific biological motor units.

BACKGROUND

Electronic devices, such as mobile phones, tablets, laptops, etc., have become a common staple in everyday life. Users interact with their electronic device's multiple times a day. Each time the user interacts with the electronic devices, they disengage from the real world. Additionally, the actions of retrieving an electronic device, providing inputs at the device, and returning the device are inefficient, distracting, and not always socially acceptable.

As such, there is a need for solutions that allow users to quickly and efficiently interact with their electronic device in a manner that keeps the user engaged in real-world activities and that are socially acceptable.

SUMMARY

The methods, systems, and devices described herein train users to perform substantially imperceptible movements to perform inputs at a communicatively coupled device. Specifically, the methods, systems, and devices described herein assist users in identifying and isolating one or more biological motor units that can be used to perform biopotential-based gestures. The methods, systems, and devices described herein further teach users to optimize activation of the one or more biological motor units such that movements performed by the user are substantially imperceptible to bystanders. By teaching users to perform substantially imperceptible movements, the users are able to interact with their electronic devices without disengaging with the real world and can use their electronic devices in a socially acceptable manner in a number of different situations and environments. Additionally, use of the substantially imperceptible movements to perform inputs at a communicatively coupled device decrease user fatigue by minimizing user movements (e.g., thumb or finger travel is minimized).

One example of micromovement guidance method is described herein. This example method is performed by a head-wearable device, a wrist-wearable device, and/or a handheld intermediary processing device in communication with the head-wearable device and/or the wrist-wearable device. The method is performed while the head-wearable device and the wrist-wearable device are worn by a user. In some embodiments, while the method is performed, the head-wearable device is configured to cause presentation, via its display, of an artificial-reality user interface overlaid over a field of view of the user. The method includes presenting i) first instructions for performing a first movement associated with activation of one or more biological motor units, and ii) graphical elements associated with the activation of one or more biological motor units. The method includes, in response to detecting, by one or more biopotential sensors of the wrist-wearable device, a first activation of the one or more biological motor units, determining, based on first biopotential sensor data captured during performance of the first movement a second movement to be performed by the user and a first change to the graphical elements. The second movement i) is associated with the activation of the one or more biological motor units and ii) is predicted to generate optimized biopotential sensor data during performance of the second movement that would satisfy a gesture mapping threshold. The first change indicates partial activation of the one or more biological motor units. The method further includes presenting second instructions for performing the second movement, and the first change to the graphical elements. The method also includes, in response to detecting, by the one or more biopotential sensors of the wrist-wearable device, a second activation of the one or more biological motor units, in accordance with a determination that second biopotential sensor data captured during performance of the second movement satisfies the gesture mapping threshold, i) associating the second biopotential sensor data with one or more biopotential-based gestures, and ii) presenting a second change to the graphical elements. The second change indicates successful activation of the one or more biological motor units.

Having summarized the first aspect generally related to use of training users to perform micromovements above, a second aspect generally related to isolating a biological motor unit is now described.

In this other example aspect, a method is performed by a head-wearable device, a wrist-wearable device, and/or a handheld intermediary processing device in communication with the head-wearable device and/or the wrist-wearable device. The method is performed while the head-wearable device and the wrist-wearable device are worn by a user. In some embodiments, while the method is performed, the head-wearable device is configured to cause presentation, via its display, of an artificial-reality user interface overlaid over a field of view of the user. The method includes presenting, via a display of the head-wearable device, first instructions to the user and, in response to detecting, via one or more biopotential sensor of the wrist-wearable device, performance of the first instructions, presenting, via the display of the head-wearable device, second instructions to the user. The method further includes, in response to detecting, via the one or more biopotential sensors of the wrist-wearable device, performance of the second instructions i) providing, via the display of the head-wearable device, visual feedback of performance of the second instructions, ii) obtaining biopotential data, captured by the one or more biopotential sensors of the wrist-wearable device, associated with performance of the second instructions, ii) determining, based on the biopotential data, a biological motor unit for detection of one or more biopotential-based gestures.

Having summarized the second aspect, generally related to use of training users to perform micromovements above, a third aspect generally related to activating distinct biological motor units is now described.

In this additional example aspect, a method is performed by a head-wearable device, a wrist-wearable device, and/or a handheld intermediary processing device in communication with the head-wearable device and/or the wrist-wearable device. The method is performed while the head-wearable device and the wrist-wearable device are worn by a user. In some embodiments, while the method is performed, the head-wearable device is configured to cause presentation, via its display, of an artificial-reality user interface overlaid over a field of view of the user. The method includes presenting, via a display of the head-wearable device, first graphical elements instructing the user to perform a first movement associated with activation of one or more biological motor units. The method, in response to detecting, by one or more biopotential sensors of the wrist-wearable device, activation of the one or more biological motor units, determining a second movement to be performed by the user, the second movement associated with activation of a distinct biological motor unit of the one or more biological motor units at the portion of the user's body. The method further includes presenting, via the display of the head-wearable device, second graphical elements instructing the user to perform the second movement.

Although the above example aspects describe a first and second movement, the skilled artisan will appreciate upon reading the descriptions provided herein, that the systems and methods disclosed herein can provide the user with any number of recommended movements to assist the user in identifying and isolating the activation of one or more biological motor units. In other words, the systems and methods disclosed herein can determine N (where N is any value greater than zero) number of movements to be performed by the user and each movement is associated with activation of a distinct biological motor unit of the one or more biological motor units (and/or isolation of the distinct biological motor unit).

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Detailed Description below, in conjunction with the following drawings in which like reference numerals refer to corresponding parts throughout the figures.

FIGS. 2A-2H, illustrate example actionable feedback associated detected biopotential-based gestures, in accordance with some embodiments.

FIGS. 5A-5C are an example representation of real-time detection of activation of one or more biological motor units, in accordance with some embodiments.

FIG. 9 illustrates activation of one or more biological motor units via one or more ear movements, in accordance with some embodiments.

FIGS. 11A-11C illustrate different example control exercises that are used for training a user to activate and control one or more biological motor units, in accordance with some embodiments.

FIG. 12 illustrates biopotential sensor data captured during user movement, in accordance with some embodiments.

FIG. 14 illustrates a practical application for biological motor unit control, in accordance with some embodiments.

FIGS. 17A and 17B illustrate combined control of multiple biological motor units, in accordance with some embodiments.

FIG. 18 illustrates online biological motor unit selection, in accordance with some embodiments.

FIG. 19 illustrates use of one or more biological motor units for providing an input at an application, in accordance with some embodiments.

FIG. 21 illustrates an example typing application using one or more biological motor units, in accordance with some embodiments.

FIGS. 22A-22C illustrate a detailed flow chart of a first method for guiding users to perform detectable biopotential-based gestures tied to specific motor units, and actionable feedback associated therewith, in accordance with some embodiments.

FIGS. 23A and 23B illustrate a flow chart of a second method for guiding users to perform detectable biopotential-based gestures tied to specific motor units, and actionable feedback associated therewith, in accordance with some embodiments.

FIGS. 27A-27B illustrate an example handheld intermediary processing device, in accordance with some embodiments.

Figure 1A:
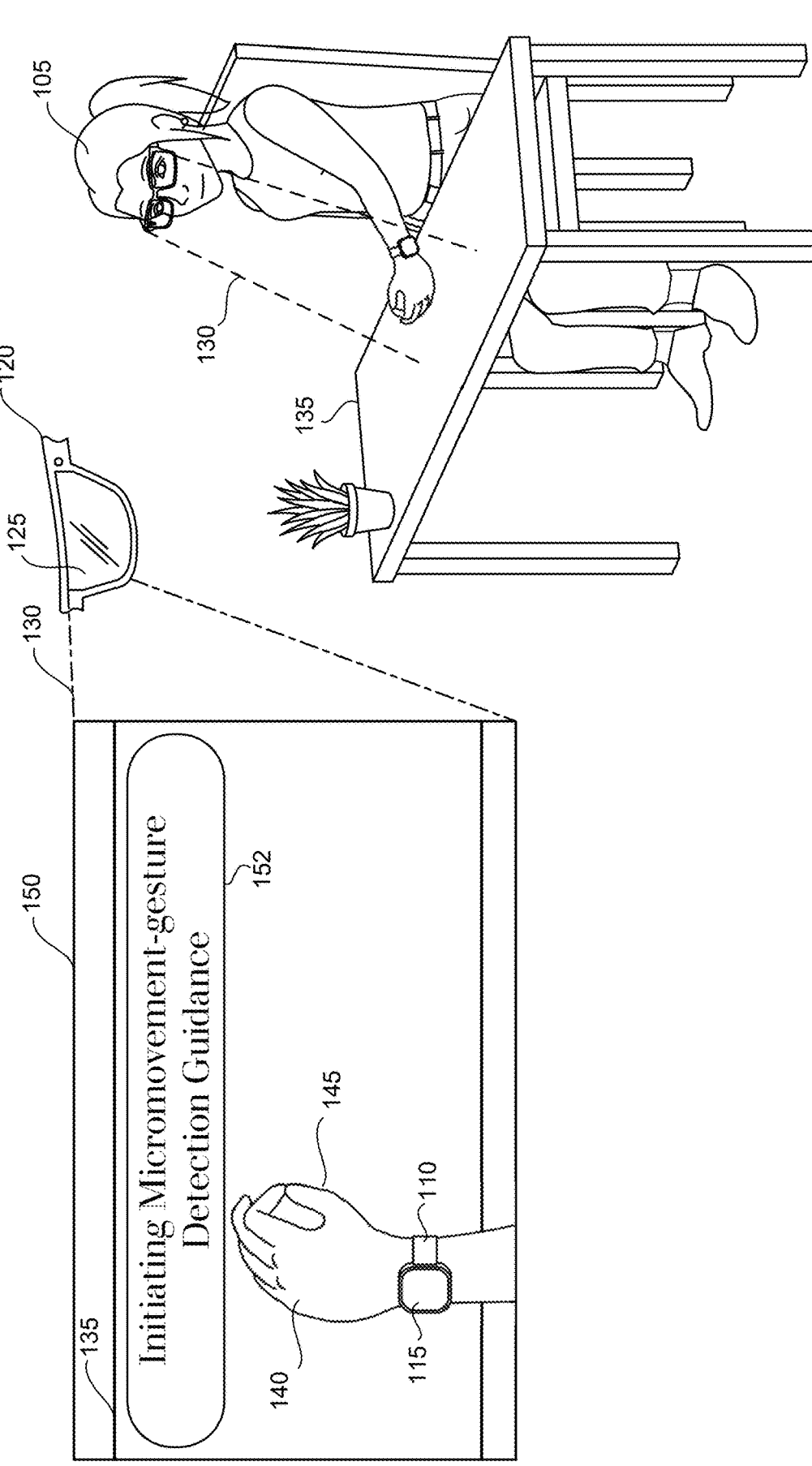
FIGS. 1A-1M illustrate a system guiding a user to perform detectable biopotential-based gestures associated with one or more specific biological motor units in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU) s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight (ToF) sensors, sensors of an inertial measurement unit, etc.) detected by a wearable device worn by the user and/or other electronic devices in the user's possession (e.g., smartphones, laptops, imaging devices, intermediary devices, and/or other devices described herein).

FIGS. 1A-1M illustrate a system guiding a user to perform detectable biopotential-based gestures associated with one or more specific biological motor units in accordance with some embodiments. A biological motor unit, for purposes of this disclosure, is a combination of a motoneuron and its associated muscle fibers that is involved in the performance of a user movement or action. A biological motor unit generates detectable biopotential signals when recruited (e.g., activated) for performing a particular action and/or activity. Specifically, one or more biopotential sensors arranged on a surface of the human body detect biological signals that result in motor activity, such as contraction of a muscle, and/or relate to the generation of action potentials in muscle fibers. The biological signals can be analyzed to identify patterns of activation associated with sub-muscular biological structures (e.g., individual biological motor units or groups of biological motor units). As described herein, control signals determined based on activation of sub-muscular structures (e.g., generally referred to as activation of one or more biological motor units or groups of biological motor units) can be used to control devices and/or perform commands associated with the activation of one or more biological motor units. Users can learn to activate and/or isolate one or more biological motor units through the performance of one or more movements. The example system of FIGS. 1A-1M guides a user 105 through the identification and activation of one or more biological motor units (e.g., at a portion of the user's body), and the association of the one or more biological motor units with one or more biopotential-based gestures for performing one or more commands at the system and/or electronic device communicatively coupled with the system.

The system can include a head-wearable device 120 and a wrist-wearable device 110. The wrist-wearable device 110 includes a watch display 115, one or more sensors 2521 (including one or more biopotential sensors), one or more processors 2579, and/or other components described below in reference to FIGS. 25A and 25B. The head-wearable device 120 includes an AR display 125, one or more sensors 2623 (including one or more respective biopotential sensors), one or more cameras 2638, one or more processors 2648, and/or other components described below in reference to FIGS. 26A-26C. The wrist-wearable device 110 and the head-wearable device 120 can be communicatively coupled such that the operations described below can be performed by a single device and/or both devices working in conjunction with one another. Although not shown, in some embodiments, the system includes a handheld intermediary processing device 2700, a server 2430, a computer 2440, a mobile device 2450, and/or other electronic devices described below in reference to FIGS. 24A and 24B.

In FIG. 1A, the user 105 wearing the head-wearable device 120 and the wrist-wearable device 110 and is seated at a desk 135 when they perform a first hand gesture 145 associated with a command for initiating a micromovement-gesture detection guidance process. The first hand gesture 145, when detected by the wrist-wearable device 110 and/or the head-wearable device 120, causes the wrist-wearable device 110 and/or the head-wearable device 120 to initiate the micromovement-gesture detection guidance process. When the micromovement-gesture detection guidance process is initiated, the head-wearable device 120 presents, via its AR display 125, an AR user interface (UI) 150 overlaid over a field of view 130 of the user 105. Specifically, the AR UI 150 augments the user 150's field of view to present additional information to the user without obstructing the field of view of the user 105. For example, as shown in FIG. 1A, the AR display 125 of the head-wearable device 120 presents a first UI element 152 notifying the user 105 that the micromovement-gesture detection guidance process is initiating. Respective UI elements of the AR UI 150 are presented over a portion of the field of view of the user 105 such that the user 105's view is not obstructed. For example, the first UI element 152 is presented at a portion of the field of view of the user 105 that does not include objects (e.g., hand 140) or is presented at a portion of the field of view of the user 105 that minimally obstructs objects (e.g., such that less than 5%-10% of the object is obstructed). Alternatively, respective UI elements of the AR UI 150 can be presented in varying transparencies (e.g., from fully transparent to opaque) depending on the objects in the user 105's filed of view 130.

The first hand gesture 145 can be detected via the wrist-wearable device 110 and/or the head-wearable device 120. For example, the first hand gesture 145 can be detected by one or more biopotential sensors of the wrist-wearable device 110. Alternatively or in addition, the first hand gesture 145 can be detected by the one or more cameras 2638 of the head-wearable device 120. For example, image data of the user 105's hand 140, captured by the one or more cameras 2638 of the head-wearable device 120, can be provided to a machine-learning model or system (AR processing modules 2655A; 26C) for gesture recognition, such that when the first hand gesture 145 is performed, first hand gesture 145 is recognized by the head-wearable device 120 and/or another communicatively coupled device. Although the above example describes the micromovement-gesture detection guidance process being initiated through a hand gesture, other user inputs can also be used to initiate the micromovement-gesture detection guidance process. For example, the user 105 can initiate the micromovement-gesture detection guidance process via a voice command (e.g., detected by a communicatively coupled device), a touch-input command (e.g., performed at a communicatively coupled device), a mobile application, etc.

Figure 1B:
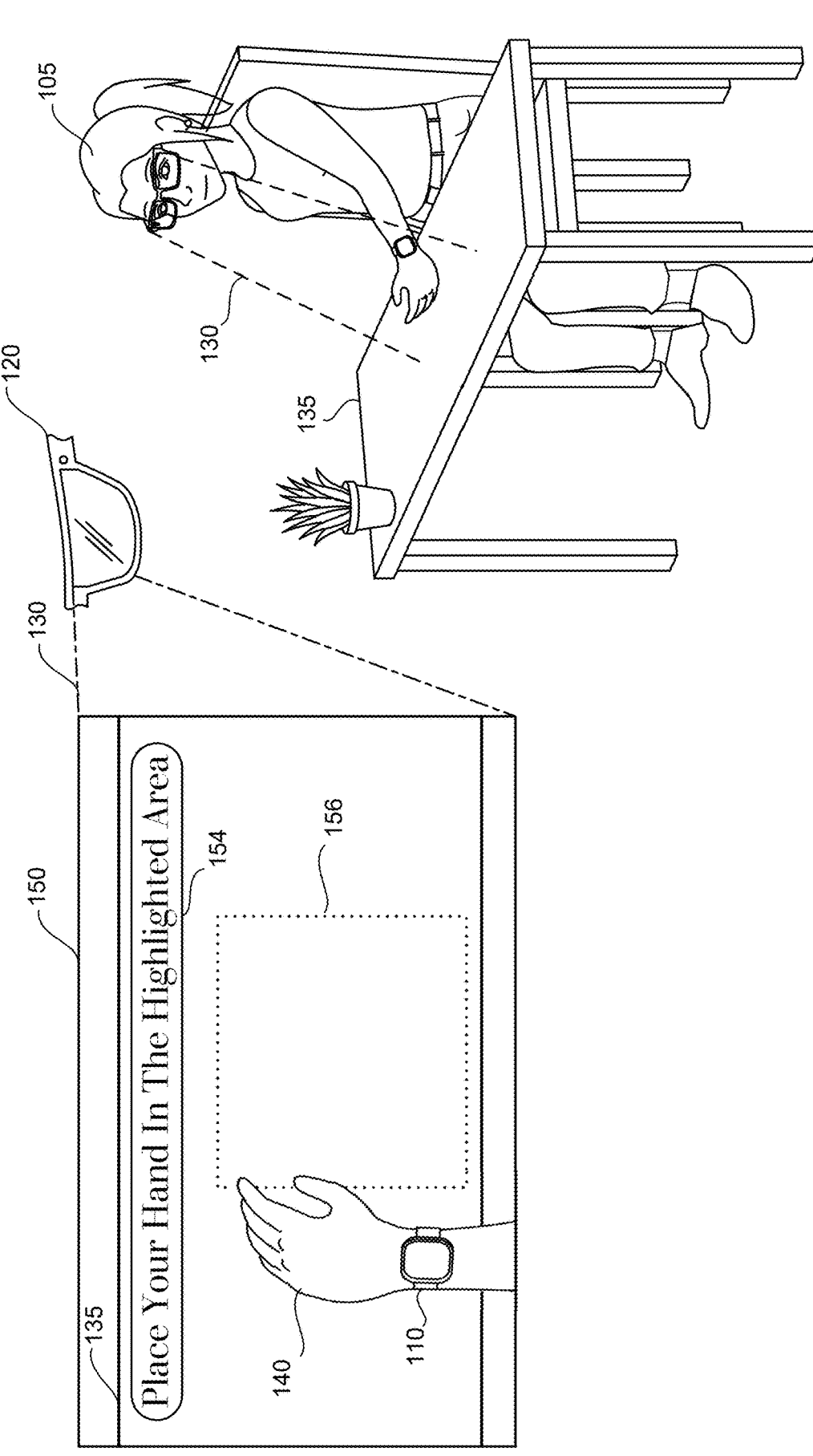

FIG. 1B shows a first operation performed during the micromovement-gesture detection guidance process. At the first operation, the AR UI 150 presents additional UI elements guiding the user 105 in the performance of a micro-gesture. Specifically, the AR UI 150 presents a second UI element 154 instructing the user 105 to perform a first hand movement (e.g., "Place Your hand in the highlighted Area") and a third UI element 156 (e.g., a bounding box or other boundary region) highlighting an area and/or location within the field of view of the user 105 at which the first hand movement should be performed. In some embodiments, the area and/or the location highlighted by the third UI element 156 is based on the user's environment (e.g., at a desk, standing, in front of a mirror, etc.), available space (e.g., clear space with little to no objects blocking the user 105's movement, crowded space with several objects buckling the user 105's movements, etc.), and/or targeted biological motor units (e.g., hand biological motor units, leg biological motor units, facial biological motor units, etc.). For example, because the user 105 is seated at a desk 135, the third UI element 156 can be defined such that the user 105 can rest her hand 140 on the desk 135 while participating in the micromovement-gesture detection guidance process.

Figure 1C:
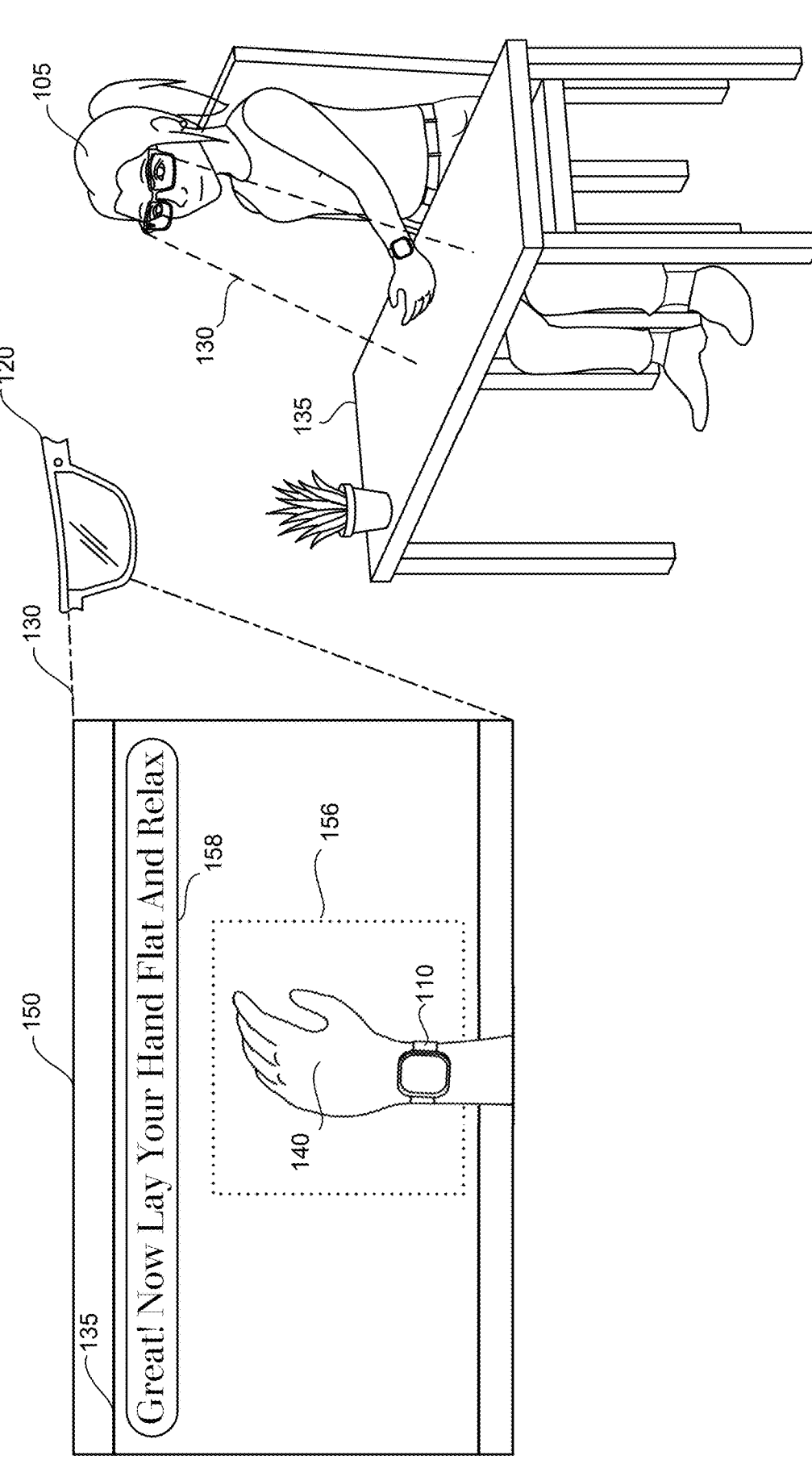

FIG. 1C shows a second operation of the micromovement-gesture detection guidance process. The second operation is performed in response to a determination, by the wrist-wearable device 110 and/or the head-wearable device 120, that the user 105 performed the first hand movement. The determination that the user 105 performed the first hand movement is based on sensor data and/or image data captured by the wrist-wearable device 110 and/or the head-wearable device 120. For example, in some embodiments, image data captured by the head-wearable device 120 can be used to determine that the user 105 moved their hand 140 within the highlighted area identified by the third UI element 156. Alternatively, or in addition, one or more sensors (e.g., inertial measurement units, biopotential-signal sensors, or other sensors described below in reference to FIGS. 25A and 25B) of the wrist-wearable device 120 can track a position, orientation, velocity, etc. of the user 105's hand 140 and/or measure biopotential-signals to determine performance of the first hand movement.

After the user 105 successfully performs of the first hand movement, the second operation causes a fourth UI element 158 to be presented at the AR UI 150. The fourth UI element 158 includes additions instructions describing another action to be performed by the user 105. For example, the fourth UI element 158 instructs the user 105 to perform a second hand movement (e.g., "Great! Now Lay Your Hand Flat and Relax"). The second hand movement is associated with activation of one or more biological motor units. Specifically, the second hand movement is expected to cause specific biological motor units on the user 105's body to activate (e.g., biological motor units at the user 105's hand 140).

Figure 1D:
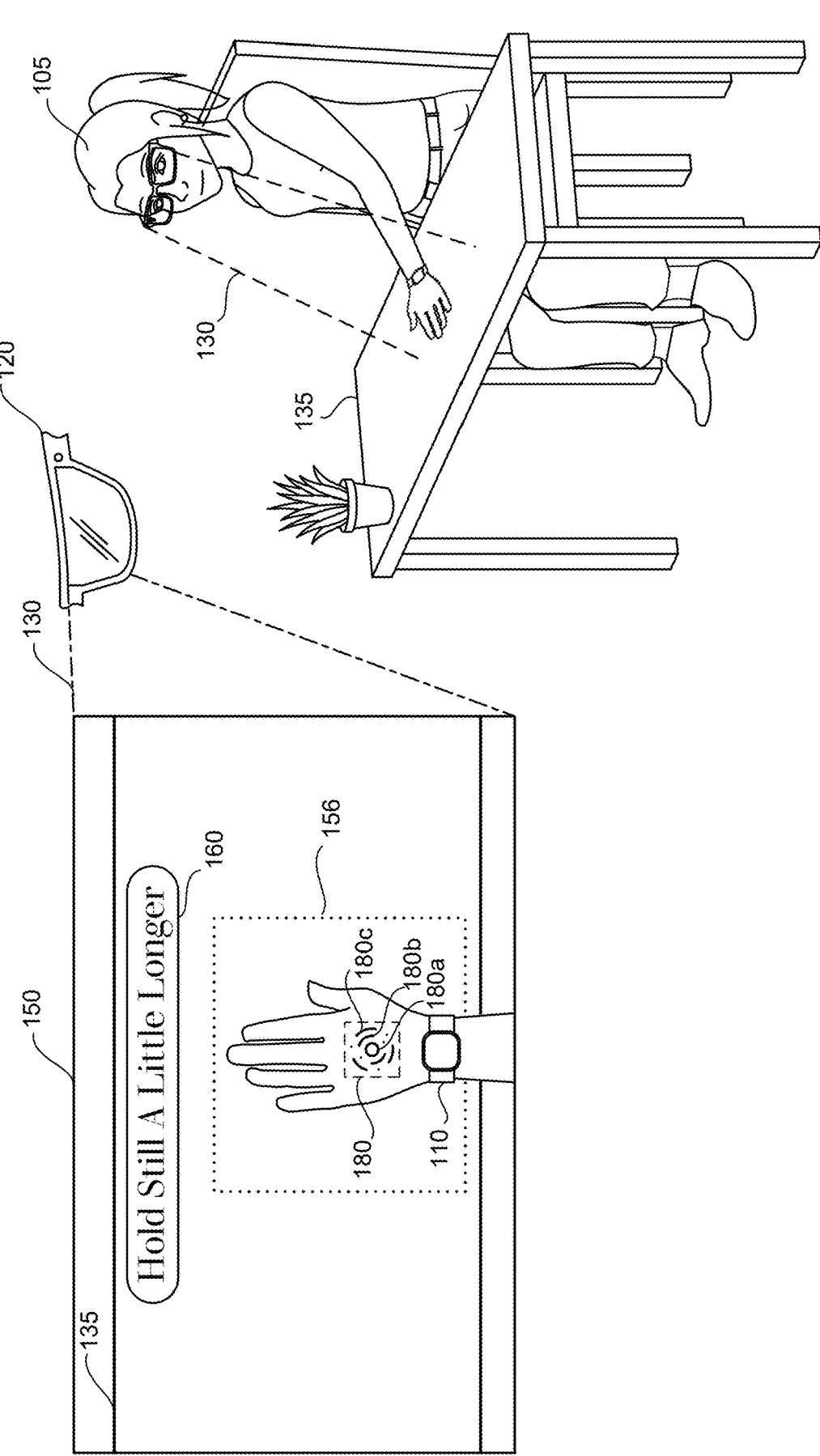

Turning to FIG. 1D, in response to detecting, via the wrist-wearable device 110 and/or the head-wearable device 120, performance of the second hand movement, the micromovement-gesture detection guidance process performs a third operation. In the third operation, the AR UI 150 replaces the fourth UI element 158 with a fifth UI element 160, which instructs the user 105 to perform a third hand movement (e.g., "Hold Still a Little Longer"). The third hand movement is based, in part, on biopotential sensor data captured, by one or more biopotential sensors of the wrist-wearable device 110, during performance of the second hand movement. Specifically, the third hand movement is an additional user movement that is configured to optimize activation of the specific biological motor units (e.g., initially targeted by the second hand movement). For example, the user 105 in FIG. 1D may be shaky or jittery resulting in the message to hold still.

In addition to the fifth UI element 160, the AR UI 150 also presents graphical elements 180. The graphical elements 180 are associated with the specific biological motor units activated by the second and third movements such that biopotential sensor data captured during the performance of the second and third hand movements cause the graphical elements 180 to change. For example, the graphical elements 180 can change from broken lines to solid lines based on the biopotential sensor data captured during the performance of a respective movement. In some embodiments, the graphical elements 180 are constantly moving or animated to inform the user 105 that requested movements have not been performed. For example, the broken lines of the graphical elements 180 can be fluctuating waves or vibrating lines that turn into a solid, steady, line when captured biopotential sensor data indicates that the third hand movement has been performed. The graphical elements 180 can include a predetermined number (e.g., 1, 3, 5, etc.) of individual graphical elements. In some embodiments, each graphical element of the graphical elements 180 can change between at least two states. For example, a graphical element can change from a first state (e.g., presented as a broken line to indicate that an action is incomplete) and to a second state (e.g., presented as a solid line to indicate that an action is complete), and vice versa. Alternatively, a graphical element can change from a first state (e.g., presented as a broken line to indicate that an action is incomplete), a second state (e.g., presented as a semi-broken line to indicate that an action is partially complete), and to a third state (e.g., presented as a solid line to indicate that an action is complete). The graphical element can change between any available states.

In some embodiments, the graphical elements 180 includes one or more concentric circles (or square, or other shape). Each concentric circle can be associated partial completion of a respective hand movement such that, as the user 105 performs respective portions of a hand movement, a change to each concentric circle is presented (e.g., transitioned or changed from a broken line to a solid line, and vice versa). For example, a first concentric circle 180a can indicate that the user 105 has performed 33 percent of the third hand movement, a second concentric circle 180b can indicate that the user 105 has performed 66 percent of the third hand movement, and a third concentric circle 180c can indicate that the user 105 has fully performed (e.g., 100 percent) the third hand movement; and, as the user 105 performs the third hand movement, the graphical elements 180 are changed to show the user's progress. In other words, graphical elements 180 can track the user's progress in performing an respective movement and provide a visual indicator of the progress. Alternatively or in addition, in some embodiments, each concentric circle of the one or more concentric circles can be associated with one or more respective biological motor units on the user 105's body (e.g., hand 140, wrist, and/or any other portion on the user 105's body) such that, when the one or more respective biological motor unit are activated (e.g., generating biopotential sensor data captured by one or more biopotential sensors) each concentric circle is updated based on corresponding biopotential sensor data. More specifically, when the user 105 activates a particular biological motor unit, a respective concentric circle associated with the particular biological motor unit can change based on the biopotential sensor data corresponding to the particular biological motor unit. Each concentric circle can change between different states as described above with reference to the graphical elements 180.

Figure 1E:
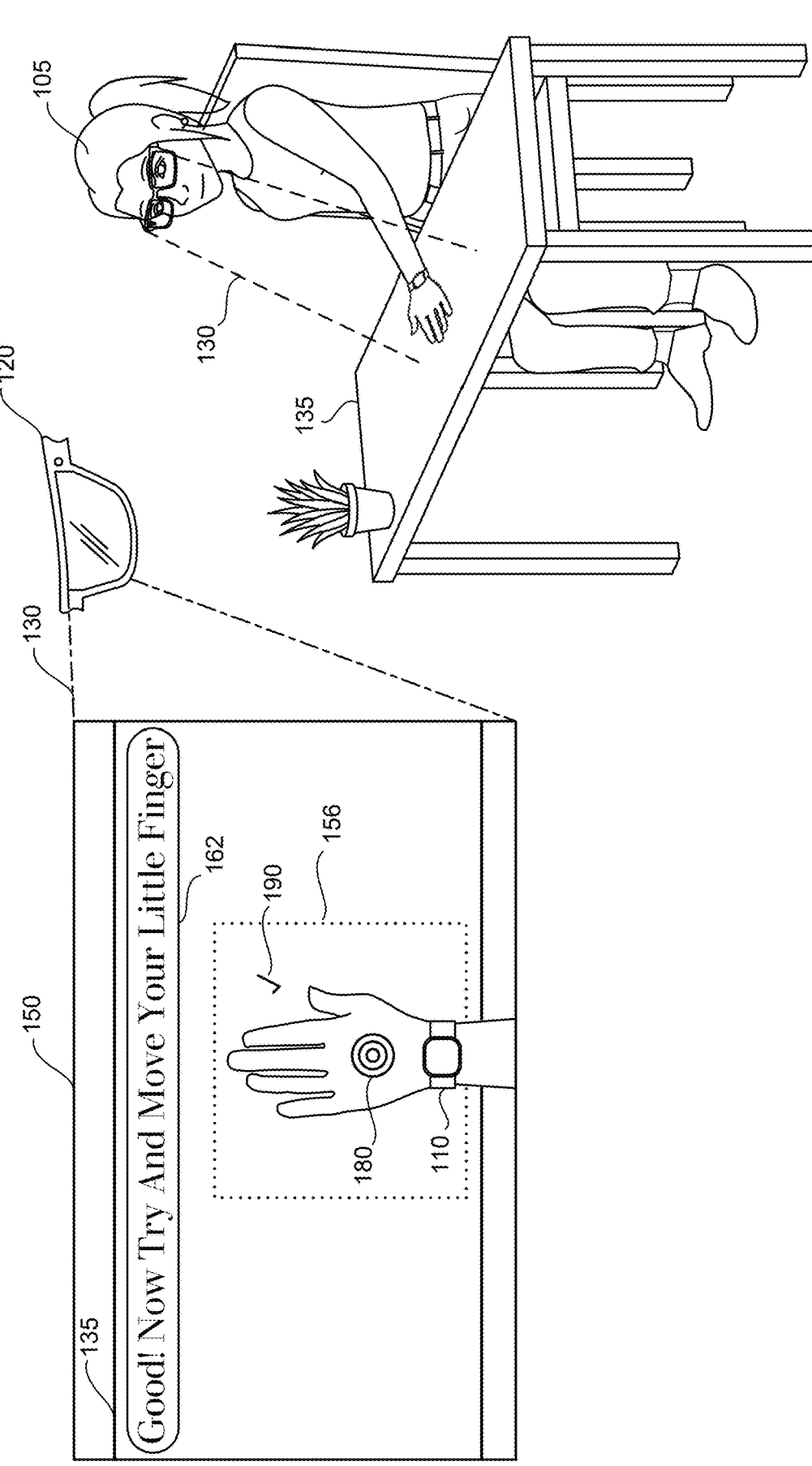

In FIG. 1E, a fourth operation of the micromovement-gesture detection guidance process is shown. In some embodiments, the fourth operation is performed responsive to the user 105 successfully performing the third hand movement. A determination that the third hand movement has been successfully performed is based on biopotential sensor data captured during the performance of the third hand movement. In particular, the third hand movement is determined to be successfully performed in accordance with a determination that the biopotential sensor data captured during the performance of the third hand movement satisfies an accuracy threshold. The accuracy threshold is satisfied when the biopotential sensor data captured during the performance of a respective movement is determined to be equal to or greater than the accuracy threshold. The accuracy threshold is a predetermined percentage of detected biological motor units in a set of biological motor units associated with a particular movement. For example, the accuracy threshold can be 70% and a particular movement can be associated with 10 biological motor units, the accuracy threshold is satisfied when at least 7 biological motor units of the 10 biological motor units are detected. If the accuracy threshold were 100% and the biopotential sensor data includes detected biopotential signals for each biological motor unit associated with a particular movement, the accuracy threshold is satisfied. In some embodiments, the accuracy threshold is not satisfied when a biological motor unit not associated with a particular movement is detected. For example, if the biopotential sensor data includes detected biopotential signals for at least one biological motor unit not associated with a particular movement, the accuracy threshold is not satisfied.

If the third hand movement is determined to be successfully performed, the graphical elements 180 are changed from broken lines to solid lines. The solid lines of the graphical elements 180 inform the user 105 that a respective movement has been successfully performed. In some embodiments, the AR UI further includes a confirmation UI element 190, which further notifies the user 105 that a respective hand movement has been successfully performed.

When the fourth operation is performed, the head-wearable device 120 is caused to present, via the AR UI 150, a sixth UI element 162. The sixth UI element 162 provides the user 105 with additional instructions for performing a fourth hand movement (e.g., "Good! Now Try and Move Your Little Finger"). The fourth hand movement is configured to assist the user 105 in identifying and isolating at least one distinct biological motor unit, such as at least one distinct biological motor unit associated with movement of the little finger. More specifically, the fourth hand movement is associated with at least one distinct biological motor unit such that the at least one distinct biological motor unit is activated when the user 105 performs the fourth hand movement. In some embodiments, the fourth hand movement is determined based on previously captured biopotential sensor data for the user 105.

Figure 1F:
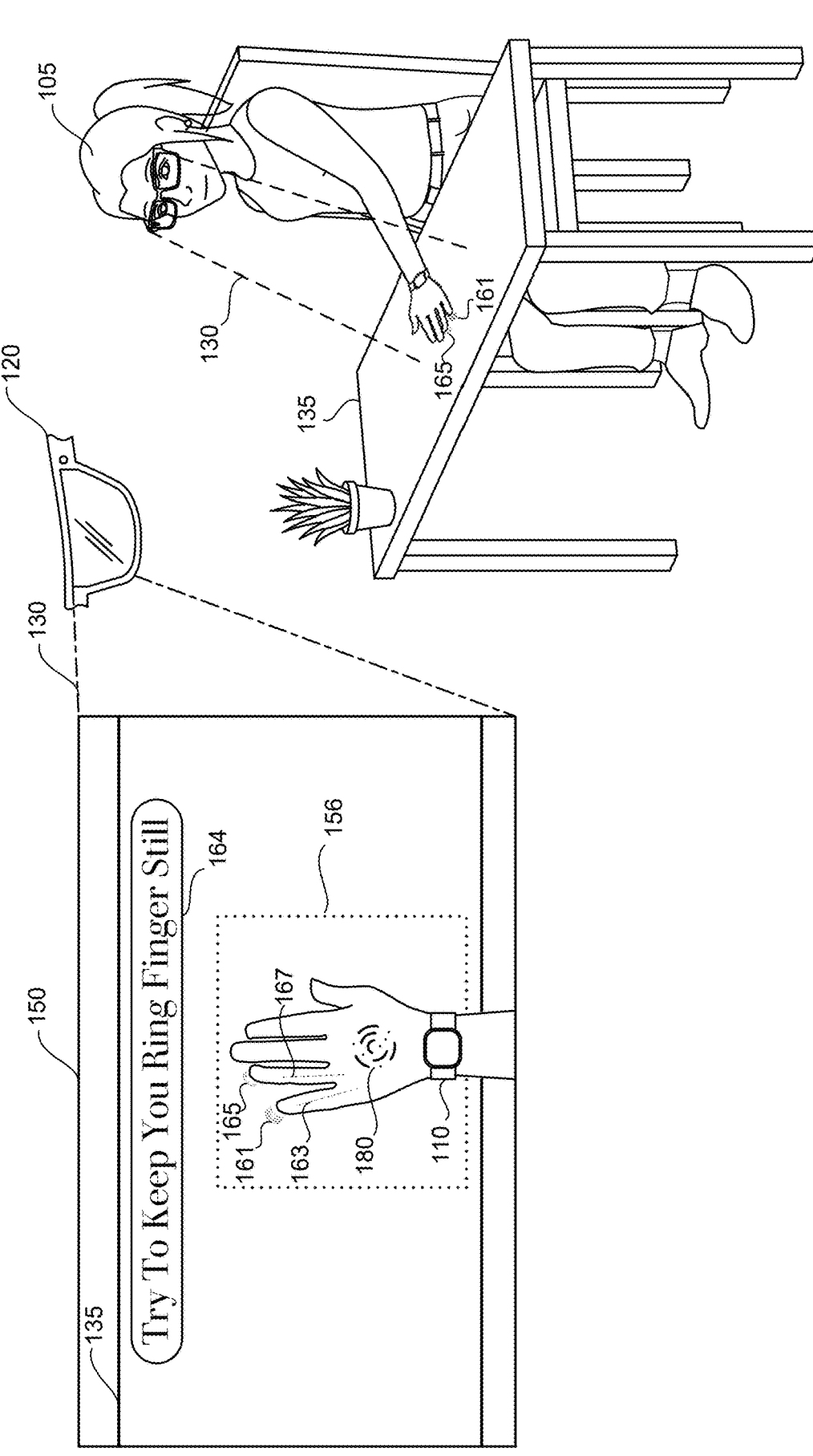

FIG. 1F shows a fifth operation of the micromovement-gesture detection guidance process. The fifth operation is performed responsive to the user 105 performing the fourth hand movement. The fifth operation causes the head-wearable device 120 to present a seventh UI element 164 that provides the user 105 with additional guidance for identifying and isolating at least one distinct biological motor unit. The additional guidance can include a recommendation to perform a fifth hand movement that is determined to further assist the user 105 in identifying and isolating at least one distinct biological motor unit. For example, the seventh UI element 164 provides the user 105 with a suggestion: "Try to keep you ring Finger Still."

The fifth hand movement is determined based on biopotential sensor data captured during performance of the fourth movement, and is predicted to generate optimized biopotential sensor data, when performed, that would satisfy the accuracy threshold and/or a gesture mapping threshold (discussed below in reference to FIGS. 1G-1I). For example, as shown in FIG. 1F, when the user 105 performed the fourth hand movement, she moved her little finger (e.g., movement represented by first movement waves 161) and her ring finger (e.g., movement represented by second movement waves 165). For purposes of this disclosure, the number of waves under the respective fingers represent a magnitude of the movement. For example, the movement of the little finger is larger than the movement of the ring finger as the first movement waves 161 includes more waves than the second movement waves 165. The movement of the ring finger and the little finger generate biopotential sensor data that is used by the head-wearable device 120 and/or the wrist-wearable device 110 to determine the fifth hand movement. The fifth hand movement is configured to remove movement of the ring finger and minimize the movement of the little finger. In this way, the fifth hand movement discourages activation of biological motor unit associated with the ring finger and encourages activation of the at least one distinct biological motor unit associated with the little finger.

In some embodiments, the AR UI 150 includes one or more visual assistance UI elements. The visual assistance UI elements represent activation of one or more biological motor units and/or movement of a particular finger. For example, a first visual assistance UI element 163 is representative of the little finger's movement and a second visual assistance UI element 167 is representative of the ring finger's movement. In some embodiments, the visual assistance UI elements are color coded to represent a magnitude. For example, the first visual assistance UI element 163 can be colored red to show that the little finger is making large movements and the second visual assistance UI element 167 can be colored blue to show that the ring finger is making small and/or unintentional movements. The visual assistance UI elements allow the user 105 to visualize their movements and correct any discrepancies such that the at least one distinct biological motor unit can be identified and isolated.

During the fifth operation, the AR UI 150 also includes the graphical elements 180. The graphical elements 180 are shown as broken lines because the user 105 has not successfully performed the fourth and fifth hand movements. In particular, the user 105's movement of the little finger includes incidental movement of the ring finger, which results in the capture of biopotential sensor data that is not associated with the at least one distinct biological motor unit (e.g., biological motor units specific to the little finger). As the biopotential sensor data captured during the performance of the fourth and fifth hand movements is not specific to the at least one distinct biological motor unit, the accuracy threshold and/or the gesture mapping threshold are not satisfied and the fourth and fifth hand movements are determined not to be successful (which is represented by the broken lines in the graphical elements 180).

Figure 1G:
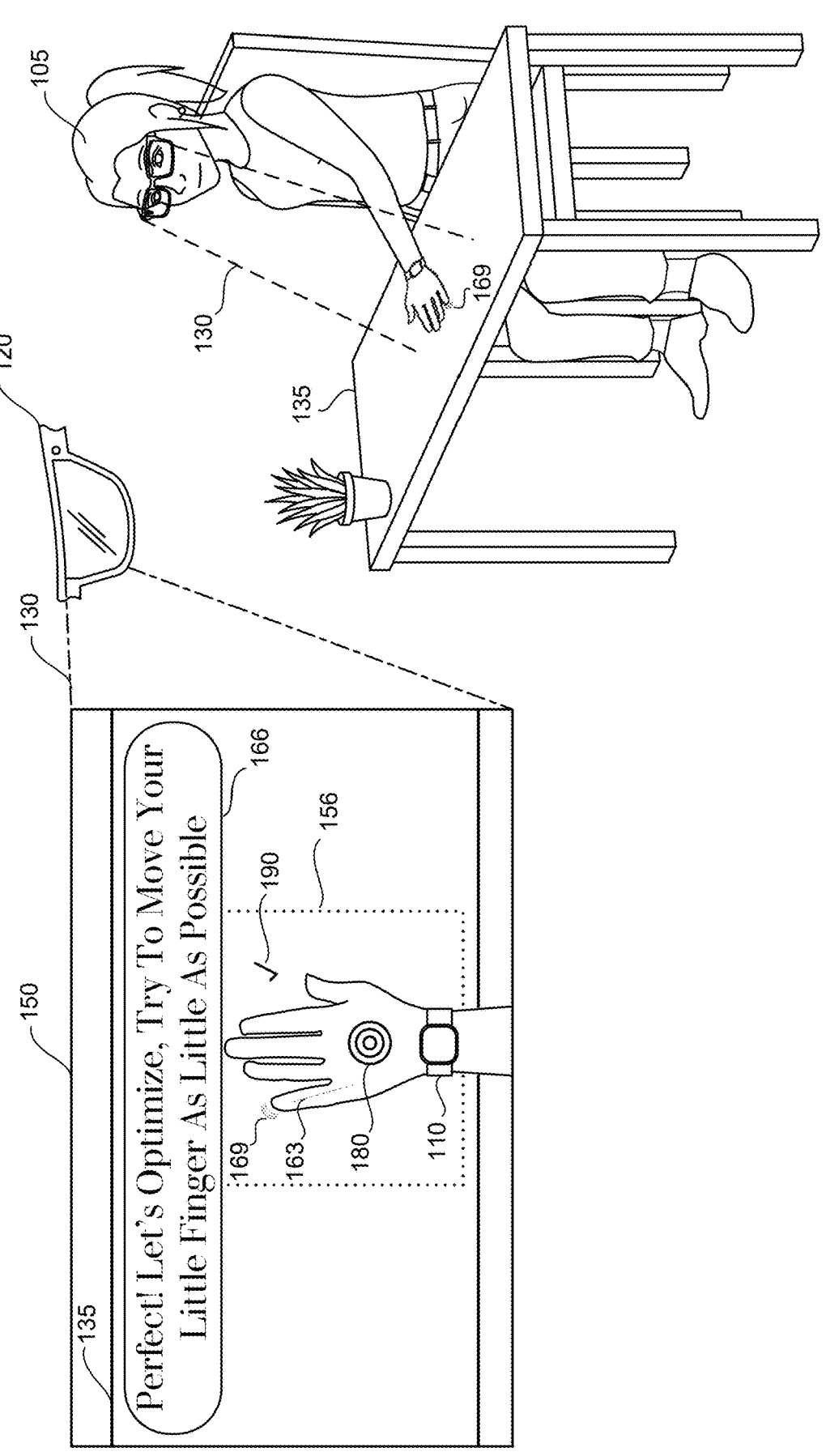

FIG. 1G shows a sixth operation of the micromovement-gesture detection guidance process. The sixth operation is performed after the user 105 successfully performs the fifth hand movement. Specifically, in FIG. 1G, the biopotential sensor data captured during the performance of the fifth hand movement satisfies the accuracy threshold. As the user 105 successfully performed the fifth hand movement, the graphical elements 180 are shown as solid lines and the confirmation UI element 190 is presented.

In the sixth operation, the AR UI 150 includes an eighth UI element 166, which provides the user 105 with instructions for optimizing the little finger movements (e.g., "Perfect! let's optimize, try to move your little finger as little as possible"). Specifically, the eighth UI element 166 recommends a sixth hand movement to be performed by the user 105. The sixth hand movement is determined based on biopotential sensor data captured during the performance of the fifth movement and is predicted to generate optimized biopotential sensor data that, when performed, would satisfy a gesture mapping threshold.

The gesture mapping threshold is a predetermined value of a biopotential signal detected for a biological motor unit. In some embodiments, the predetermined value of a biopotential signal is the minimum detectable magnitude of a biopotential signal (e.g., 0.1 mV to 0.5 mV) or approximate (e.g., +/−5%-10%) equal to the minimum detectable magnitude of a biopotential signal. In some embodiments, the gesture mapping threshold is based on the biopotential sensors and/or a location of the biopotential sensors. For example, sophisticated sensing instruments can have a lower minimum detectable magnitude of a biopotential signal than less sophisticated instruments. In some embodiments, the gesture mapping threshold is based on the particular biological motor unit and/or location of the particular biological motor unit. The gesture mapping threshold is satisfied when the biopotential sensor data captured during the performance of a respective movement is substantially equal (e.g., within a predefined accuracy range, such as 5%, 7%, etc.) to the predetermined value of a biopotential signal detected for the biological motor unit As shown in FIG. 1G, when the user 105 performed the fifth hand movement, she moved only her little finger (e.g., movement represented by third movement waves 169). The movement of the little finger in FIG. 1G is less pronounced than the movement in FIG. 1F. The movement of the little finger generates biopotential sensor data that is used by the head-wearable device 120 and/or the wrist-wearable device 110 to determine the sixth hand movement. The sixth hand movement is configured to minimize the movement of the little finger while still allowing for the capture of biopotential sensor data associated with movement of the little finger. In this way, the sixth hand movement trains the user 105 to perform the smallest detectable movement for activating the at least one distinct biological motor unit associated with the little finger.

The AR UI 150 shown in FIG. 1G includes the first visual assistance UI element 163 is representative of the little finger's movement. In some embodiments, the visual assistance UI elements are color coded to represent successful performance of a movement. For example, the first visual assistance UI element 163 can be colored green to show that the little finger movement was correct or improving.

Figure 1H:
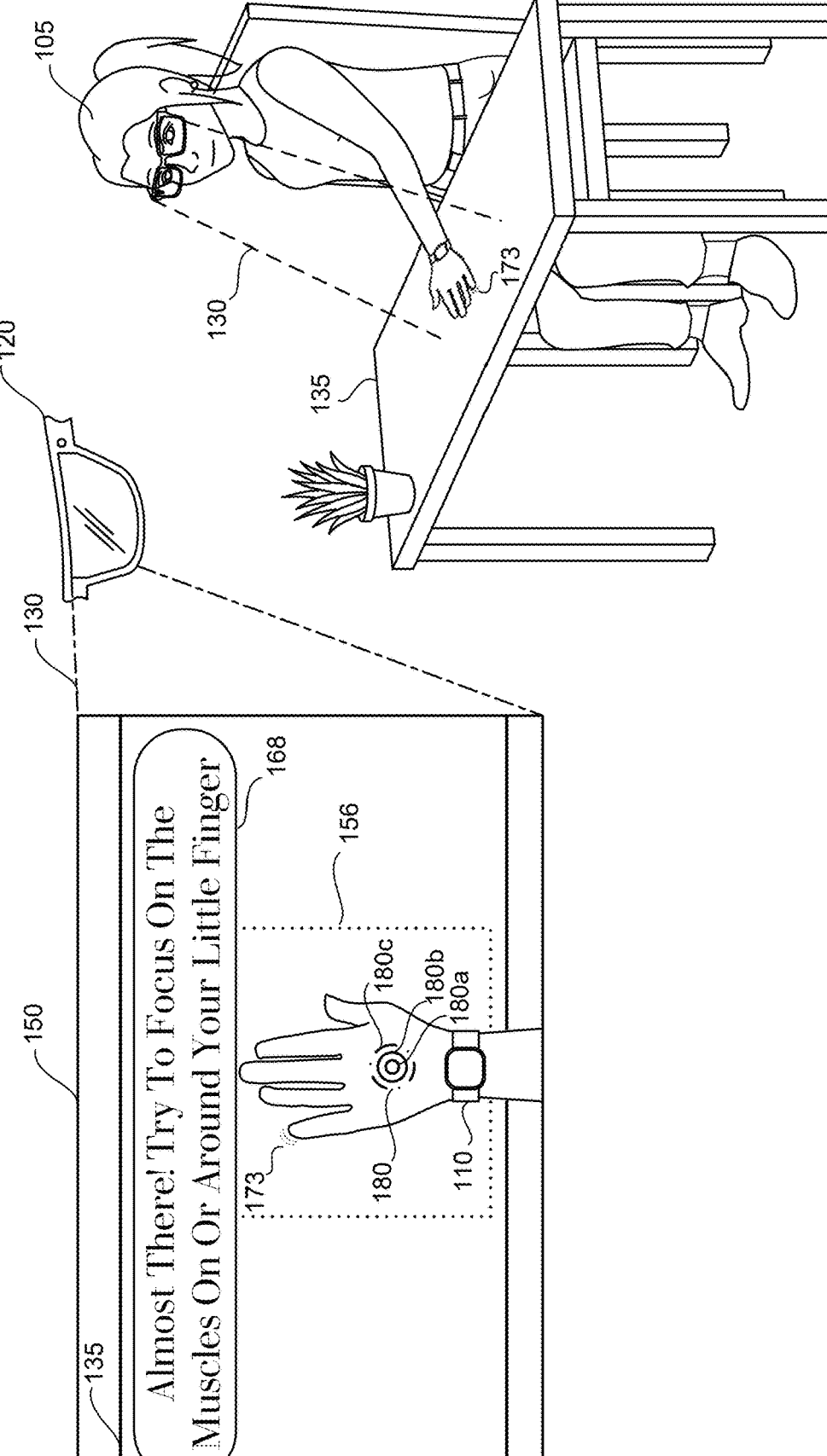

Turning to FIG. 1H, a seventh operation of the micro-movement-gesture detection guidance process is shown. The seventh operation is performed after the user 105 performs the sixth hand movement. In FIG. 1H, the biopotential sensor data captured during the performance of the sixth hand movement satisfies the accuracy threshold but does not satisfy the gesture mapping threshold. Specifically, the user 105 is performing the correct movements but the movements are not yet fully optimized. An optimized movement, for purposes of this disclosure, is a movement that is substantially imperceptible and/or a movement that generates the smallest detectable biopotential signal for a biological motor unit. As the user 105 has not fully optimized their little finger movement, the graphical elements 180 include at least one broken line to represent that an operation and/or respective movement is in process. For example, the first concentric circle 180a and the second concentric circle 180b are shown in solid lines to indicate that the user 105 has performed 66 percent of the optimization process (e.g., the sixth and seventh operations of the micromovement-gesture detection guidance process).

In the seventh operation, the AR UI 150 includes a ninth UI element 168, which provides the user 105 with instructions for fully optimizing the little finger movements (e.g., "Almost there! Try to focus on the muscles on or around your little finger"). Specifically, the ninth UI element 168 recommends a seventh hand movement to be performed by the user 105. The seventh hand movement is determined based on biopotential sensor data captured during the performance of the sixth movement, and is predicted to generate further optimized biopotential sensor data that, when performed, would satisfy the gesture mapping threshold. As shown between FIGS. 1G-1H, the micromovement-gesture detection guidance process performs iterative operations until the user movement is fully optimized.

As further shown in FIG. 1H, when the user 105 performed the sixth hand movement, she further minimized her little finger movement (e.g., movement represented by third movement waves 173). In particular, the movement of the little finger in FIG. 1H is less pronounced than the movement in FIG. 1G. The movement of the little finger generates biopotential sensor data that is used by the head-wearable device 120 and/or the wrist-wearable device 110 to determine the seventh hand movement. Similar to the sixth hand movement, the seventh hand movement is configured to further minimize the movement of the little finger while still allowing for the capture of biopotential sensor data associated with movement of the little finger.

Figure 1I:
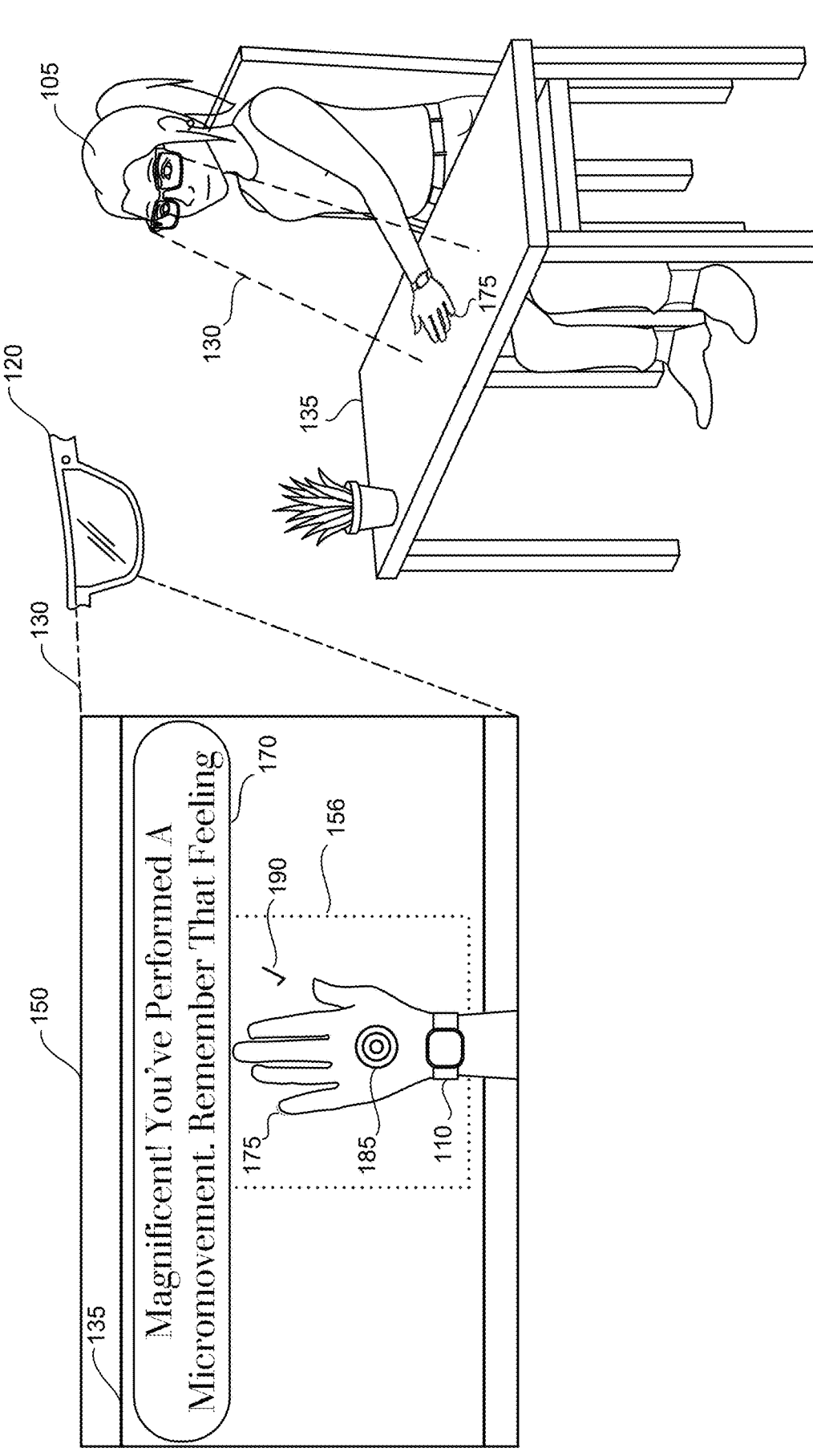

FIG. 1I shows an eighth operation of the micromovement-gesture detection guidance process. The eighth operation is performed after the user 105 successfully performs the seventh hand movement. Specifically, in FIG. 1H, the biopotential sensor data captured during the performance of the seventh hand movement satisfies the accuracy threshold and the gesture mapping threshold. As the user 105 has successfully performed the seventh hand movement and the accuracy threshold and the gesture mapping threshold are satisfied, the graphical elements 180 are shown as solid lines and the confirmation UI element 190 is presented. Additionally, in the eighth operation, the AR UI 150 includes a tenth UI element 170, which congratulates the user 105 for learning to perform an optimized little finger movement (e.g., "Magnificent! You've performed a micromovement. Remember that feeling").

At the eighth operation, in accordance with the determination that biopotential sensor data captured during performance of the seventh hand movement (e.g., optimized little finger movement, which is associated with activation of the at least one distinct biological motor unit associated with the little) satisfies the gesture mapping threshold, the biopotential sensor data captured during performance of the optimized little finger movement is associated with one or more biopotential-based gestures. Subsequent detection of the biopotential sensor data captured during performance of the optimized little finger movement finger (e.g., which represented by fourth movement waves 175), causes performance of an action or command associated with the one or more biopotential-based gestures. For example, when the head-wearable device 120 and/or the wrist-wearable device detect the biopotential sensor data (captured during performance of the seventh hand movement) at a future point in time (e.g., any time after completion of the micromovement-gesture detection guidance process), the head-wearable device 120 and/or the wrist-wearable device 110 cause performance of an action and/or command associated with the one or more biopotential-based gestures. The actions and/or commands associated with the one or more biopotential-based gestures can include initiating an imaging device, initiating a microphone, initiating a call, initiating an application, contacting a contact, drafting and/or sending a message, providing inputs in an application (e.g., inputs in a gaming application, social media application, business application, etc.).

Figure 1J:
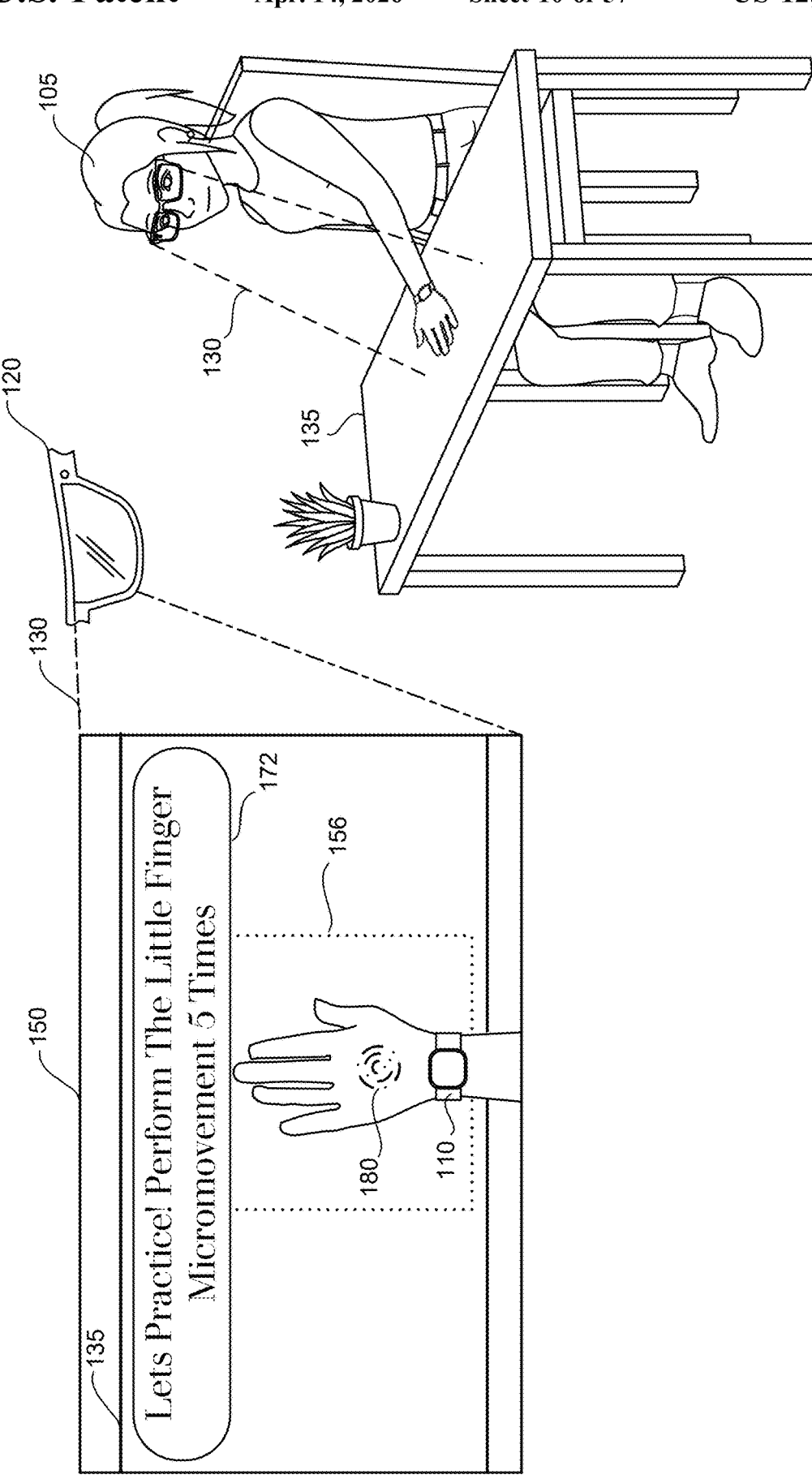

FIG. 1J shows a ninth operation of the micromovement-gesture detection guidance process. In the ninth operation, the gesture mapping process is complete, and a user practice process is initiated. The user practice process can include one or more instructions presented to the user 105 that are configured to increase user comfort and confidence in performing the learned micromovement (e.g., the optimized little finger movement). In the ninth operation, the AR UI 150 includes an eleventh UI element 172 guiding the user through the user practice process. Specifically, the eleventh UI element 172 includes instructions on additional movements to be performed by the user 105-"Lets Practice! Perform the little finger Micromovement 5 times." As a new operation is initiated, the graphical elements 180 are shown a broken lines.

Figure 1K:
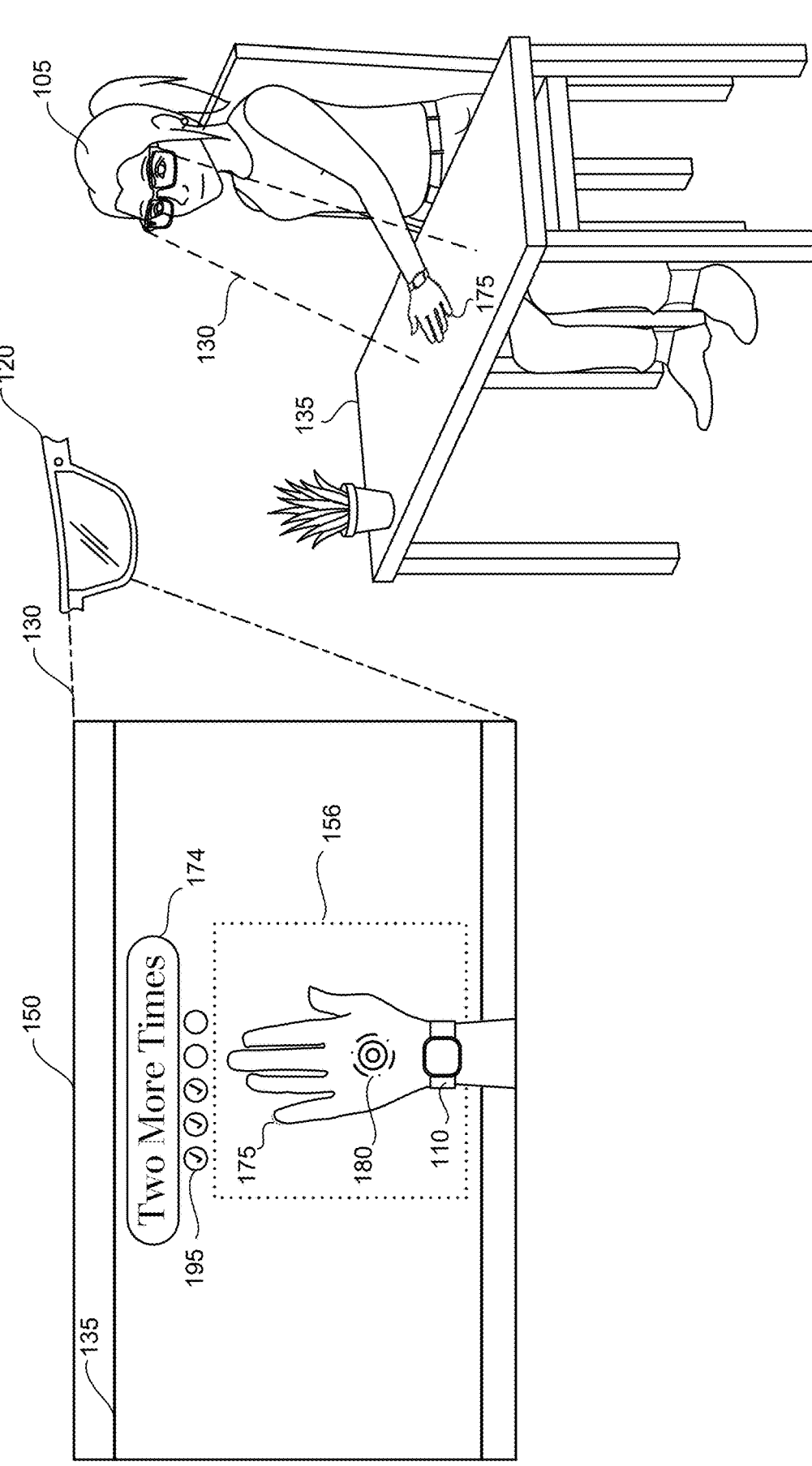

Turning to FIG. 1K, during a tenth operation of the micromovement-gesture detection guidance process, the user 105 performs the optimized little finger movement. The wrist-wearable device 110 detects activation of the specific biological motor units associated with the optimized little finger movement and provides the user 105 with an indication that the biopotential-based gestures associated with the activation of the specific biological motor units was detected and recognized. For example, the AR UI 150 presents to the user a twelfth UI element 174 notifying the user 105 of the remaining number times the biopotential-based gesture (e.g., activation of the specific biological motor units associated with the optimized little finger movement) is to be performed: "Two more times." The AR UI 150 also presents a counter UI element 195 that illustrates the number of times the biopotential-based gesture was detected. Additionally, as the user 105 has performed more than half of the total number of times the biopotential-based gesture was requested (e.g., 3 out of 5), the graphical elements 180 are presented with two solid lines and one broken line.

Figure 1L:
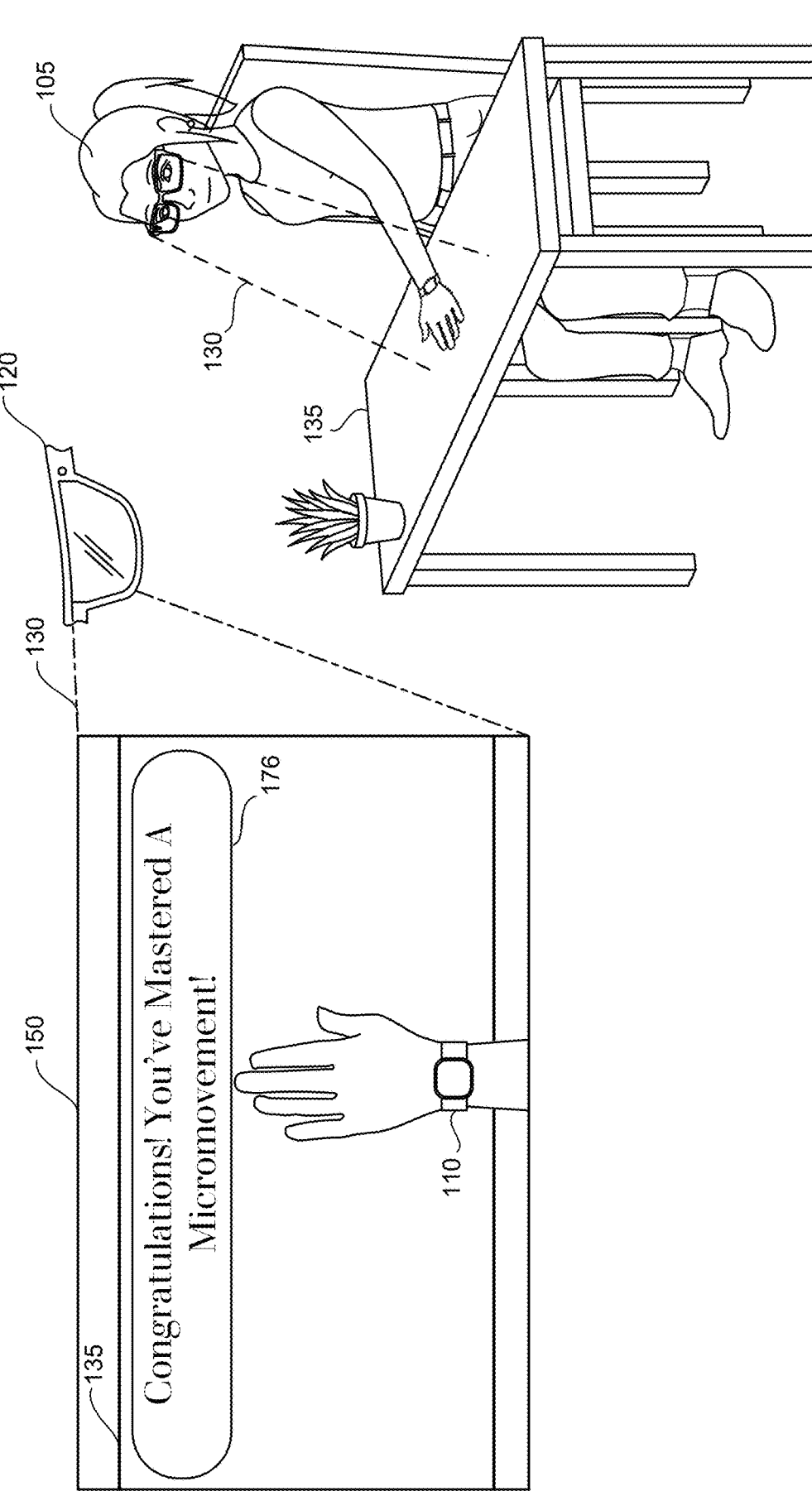

FIG. 1L shows a eleventh operation of the micromovement-gesture detection guidance process. In the eleventh operation, the user 105 is informed of the completed user practice process. For example, the AR UI 150 includes a thirteenth UI element 176 indicating "Congratulations! You've mastered a Micromovement!"

Figure 1M:
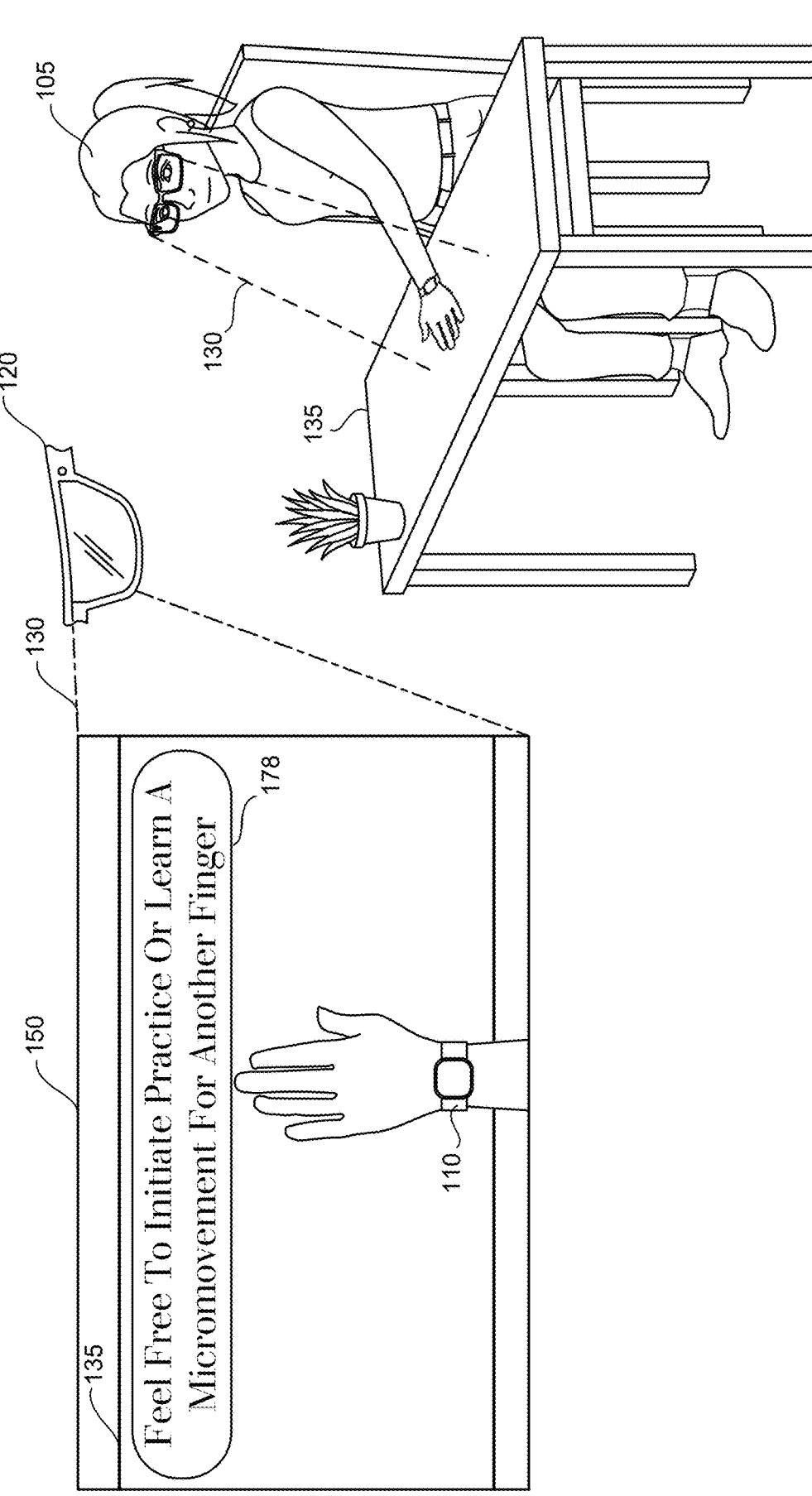

In FIG. 1M, a twelfth operation of the micromovement-gesture detection guidance process informs the user 105 that the micromovement-gesture detection guidance process is complete. In the twelfth operation, the user 105 is presented with options to initiate an additional user practice process (or other available training processes) or to learn to performs micromovements using a distinct portion of their body (and activating the specific biological motor units associated with the micromovements). For example, the AR UI 150 includes a fourteenth UI element 178 indicating "Feel free to initiate practice or learn a micromovement for another finger." Alternatively, the user 105 can terminate the micromovement-gesture detection guidance process and re-initiate the process at a future time.

FIGS. 2A-2H, illustrate example actionable feedback associated detected biopotential-based gestures, in accordance with some embodiments. Specifically, FIG. 2A-2H show a system performing one or more actions or commands associated with biopotential-based gestures in response to detected activation of one or more biological motor units associated with a micromovement. The system can include a head-wearable device 120 and a wrist-wearable device 110 as described above in reference to FIGS. 1A-1M. The head-wearable device 120 and the wrist-wearable device 110, while worn by the user 105, detect activation of one or more biological motor units (associated with a particular micromovement), determine the associated biopotential-based gestures, and perform an action or commands associated with the biopotential-based gestures. Use of micromovements to detect biopotential-based gestures allows users to stay engaged with the real-world while having access to their electronic devices in a socially acceptable manner.

In FIG. 2A, the user 105 approaches her friend 205 at a movie theater. The friend 205 greets the user 105 and ask about the next movie showing-"Hi, do you know when the movie starts?" The user 105, unsure of the movie show time, lets her friend 205 know that she will look up the move time—"I'm not sure, but I can look it up" The user 105 performs a first biopotential-based gesture (e.g., optimized little finger movement 175) which is associated with a command for causing the head-wearable device 120 to present a menu UI 210. As described above in reference to FIGS. 1A-1M, the optimized little finger movement 175, when performed, activates specific biological motor units of the little finger movement and generates detectable biopotential sensor data that is used for determining that the biopotential-based gesture was performed. The biopotential sensor data can be captured by one or more biopotential sensors of the wrist-wearable device 110. Either the head-wearable device 120 and/or the wrist-wearable device 110 can use captured biopotential sensor data to determine that a biopotential-based gesture was performed. Alternatively or in addition, another device (e.g., a handheld intermediary processing device HIPD 2700, a mobile device 2450, and/or any other device described below in reference to FIGS. 24A and 24B) communicatively coupled with the head-wearable device 120 and/or the wrist-wearable device 110 can use captured biopotential sensor data to determine that a biopotential-based gesture was performed.

FIG. 2B shows a field of view of the user 105 when the first biopotential-based gesture is performed. The head-wearable device 120, in response to a determination that the first biopotential-based gesture was performed, causes a menu UI 210 to be presented via its AR display 125. The menu UI 210 can be overlaid the field of view of the user 105. In some embodiments, the menu UI 210 is transparent or semi-transparent such that the field of view of the user 105 is not obstructed. In some embodiments, the menu UI 210 is presented at a portion of the field of view of the user 105 such that her friend 205 is the primary subject of her attention. This allows the user 105 to remain engaged with their friend 205.

The menu UI 210 can include one or more menu UI elements. Each menu UI element can be associated with a particular action or command to be performed by the head-wearable device 120, the wrist-wearable device 110, and/or any other communicatively coupled device. For example, the phone menu UI element 212, when selected, causes the head-wearable device 120, the wrist-wearable device 110, and/or any other communicatively coupled device to initiate an audio (or video) call.

In FIG. 2C, the user 105 continues to interact with her friend 205 and performs a second biopotential-based gesture (e.g., optimized ring finger movement 220). The second biopotential-based gesture, when detected by the wrist-wearable device 110, the head-wearable device 120, and/or a communicatively coupled device, allows the user to navigate the presented menu UI 210 (as shown in FIG. 2D). The user 105 is able to perform the second biopotential-based gesture without disengaging with her friend 205 or interrupting the flow of the conversation. For example, as shown in FIG. 2C, the user 105 and the friend 205 are able to discuss other events (e.g., the dog park) while the user 105 performs the second biopotential-based gesture.

FIG. 2D shows a field of view of the user 105 when the second biopotential-based gesture is performed. The head-wearable device 120, in response to a determination that the second biopotential-based gesture was performed, causes a menu UI element of the menu UI 210 to be selected. In particular, the second biopotential-based gesture allows the user to navigate through the menu UI and highlights the phone menu UI element 212.

Figure 2E:
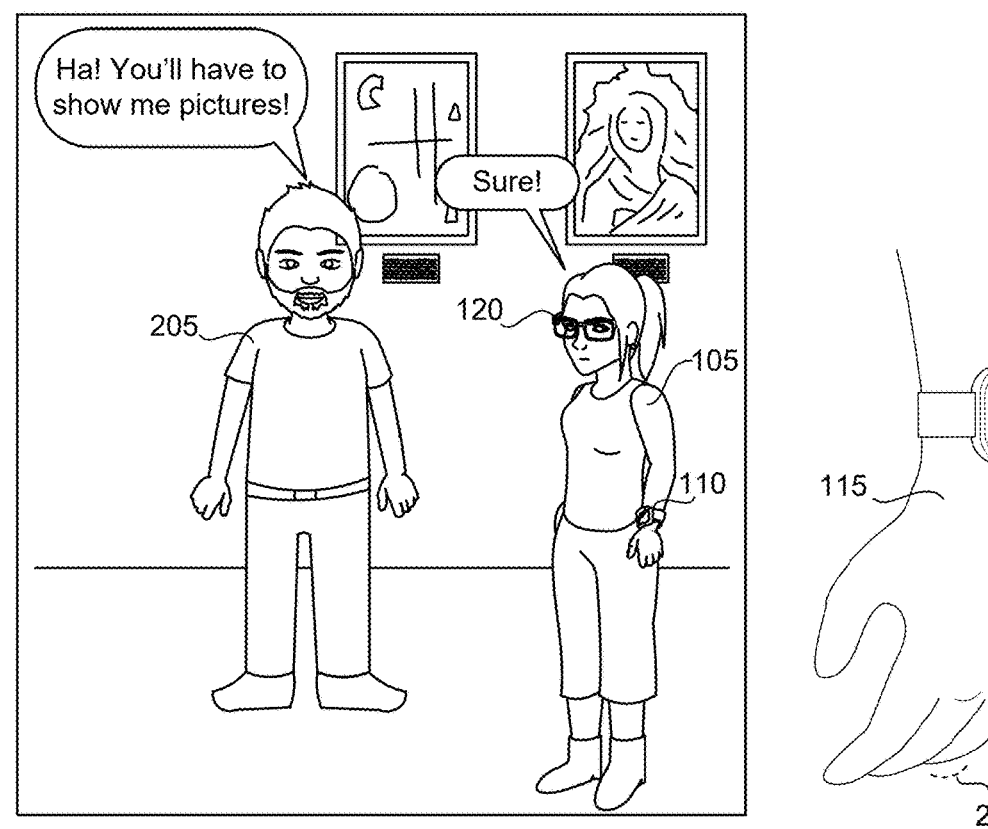

In FIG. 2E, the user 105 continues to interact with her friend 205 while navigating through the menu UI 210. Specifically, the user 105 performs the second biopotential-based gesture (e.g., optimized ring finger movement 220) one or more times to highlight different menu UI element of the menu UI 210. The user 105 and the friend are able to remain engaged without distraction.

Figure 2F:
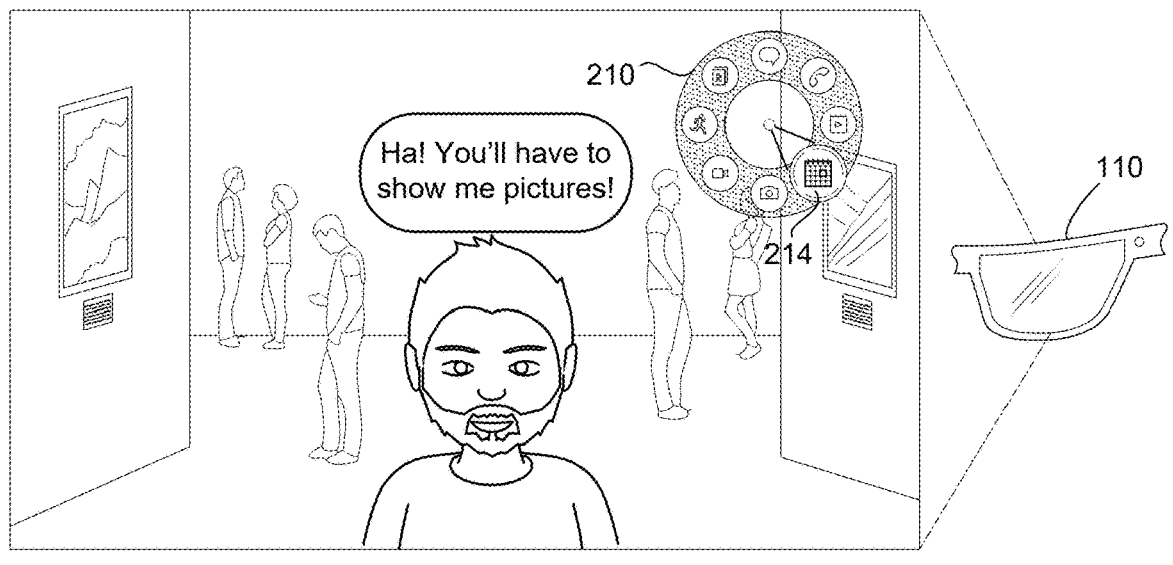

FIG. 2F shows a field of view of the user 105 when additional second biopotential-based gestures are performed. The head-wearable device 120, in response to a determination that the second biopotential-based gesture was performed again, causes a distinct menu UI element of the menu UI 210 to be selected. In particular, repeated performance of the second biopotential-based gesture allows the user to navigate through the menu UI and highlights the calendar menu UI element 212.

Figure 2G:
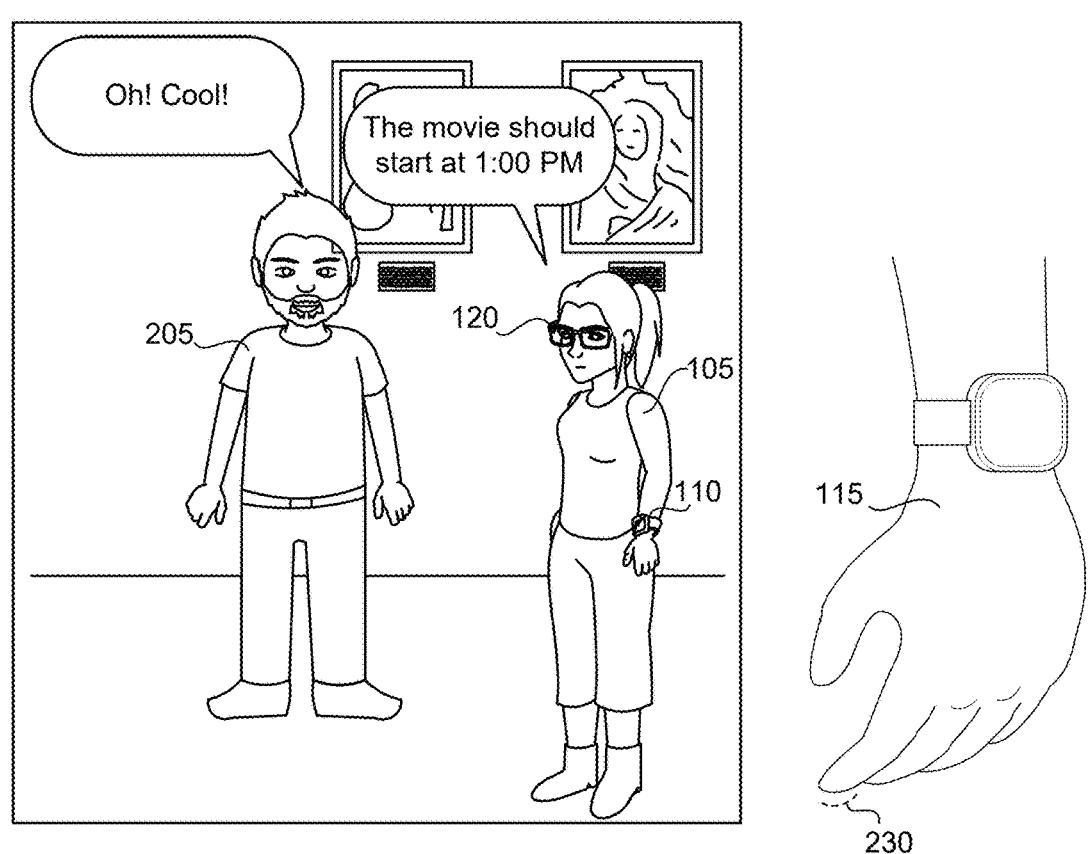

In FIG. 2G, the user 105 is able to provide her friend with the movie show time. Specifically, the user 105 performs a third biopotential-based gesture (e.g., optimized index finger movement 230) to select a menu UI element of the menu UI 210. The user 105 was able to look up information in a non-obtrusive manner and was able to remain engaged with her friend.

Figure 2H:
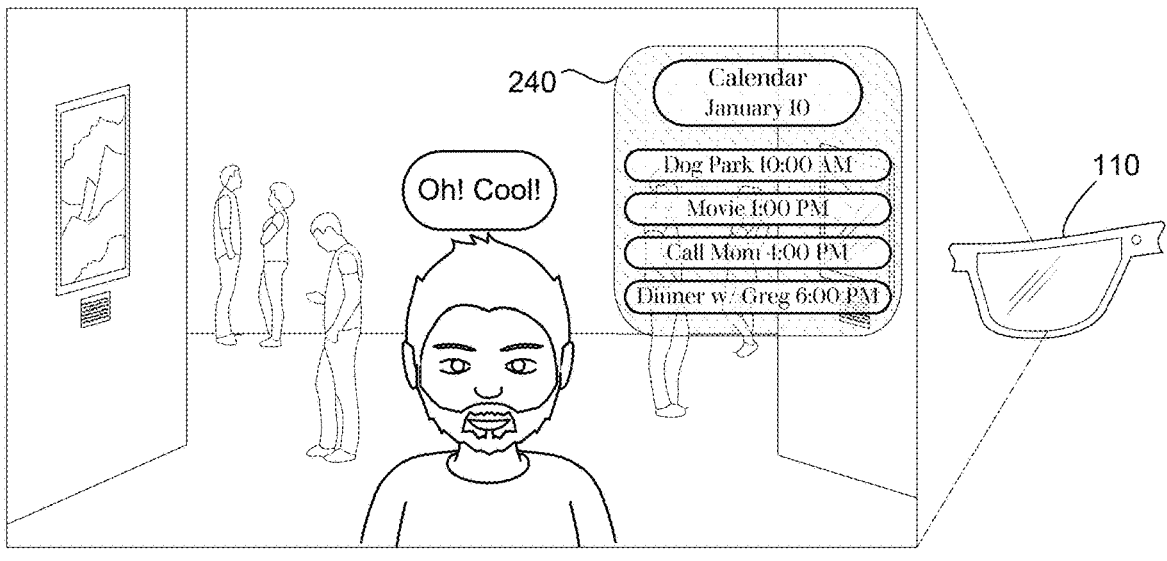

FIG. 2H shows a field of view of the user 105 when the third biopotential-based gesture is performed. The head-wearable device 120, in response to a determination that the third biopotential-based gesture was performed, causes the calendar menu UI element 212 to be selected and the menu UI 210 to be replaced with a calendar UI 240 (which is part of a calendar or calendar application associated with user 105 and shared with the head-wearable device 120, the wrist-wearable device 110, and/or other communicatively coupled device). The calendar UI 240 includes one or more calendar UI elements associated with one or events that the user scheduled for her day. The calendar UI 240 includes the movie show time and the user 105 shares the information with her friend 205.

In some embodiments, biopotential-based gestures improve accessibility of the head-wearable device 120 and the wrist-wearable device 110 and associated AR UI (e.g., AR UI 150). For example, biopotential-based gestures allow users who have a limited ability to activate one or more biological motor units (e.g., due to spinal cord injury, stroke, amputation, or other disabilities) to interact with the AR UI. In another example, biopotential-based gestures allow users who have encumbered hands (e.g., hands that are carrying something or otherwise perform another task) to interact with the AR UI.

Figure 3:
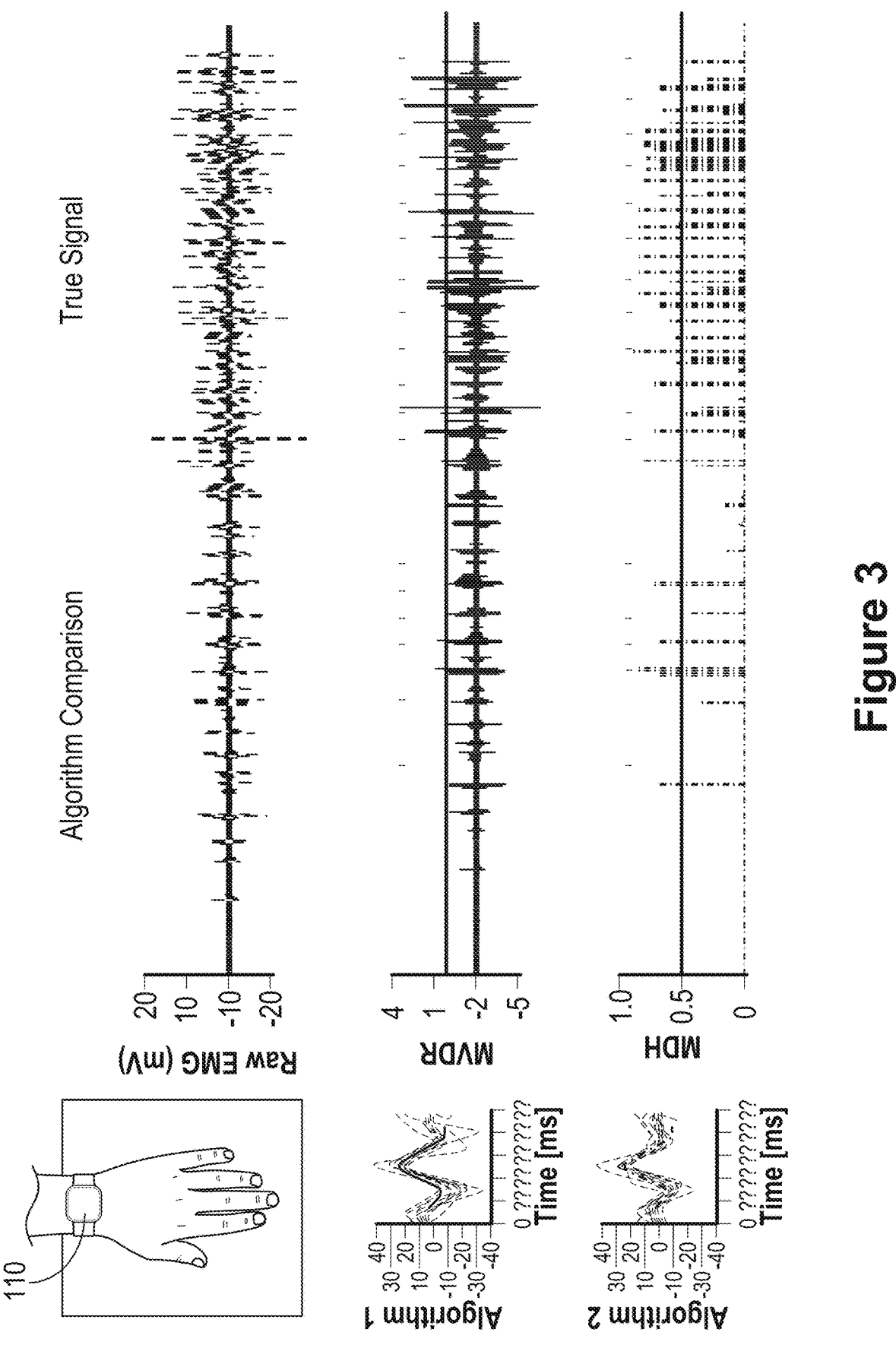
FIG. 3 shows an example comparison of models used in detecting activation of biological motor unit, in accordance with some embodiments.

FIG. 3 shows an example comparison of models used in detecting activation of biological motor unit, in accordance with some embodiments. In some embodiments, different models can be used for detecting activation of a biological motor unit. The different models (e.g., algorithm 1 and algorithm 2) can be compared against each other and/or a true signal (e.g., actual measured values of a biological motor unit when activated). In some embodiments, a model that closely resembles the true signal is selected. In some embodiments, the model with the least error (when compared against the true signal) is selected.

In some embodiments, errors detected within the models can be stored and reviewed to identify failures in a model and/or potential improvements to the models.

Figure 4:
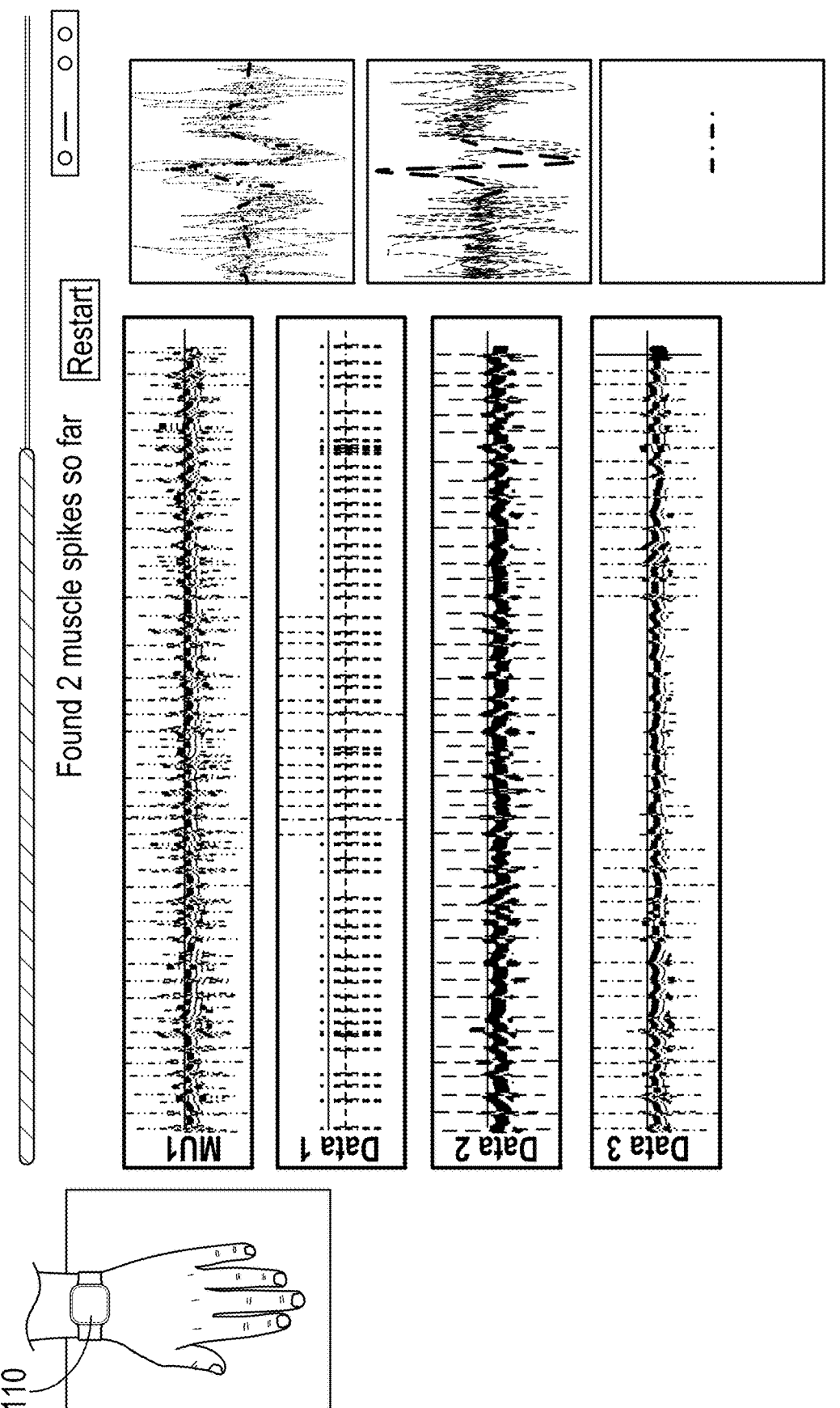
FIG. 4 illustrates the identification of biological motor units associated with a particular muscle.

FIG. 4 illustrates the identification of biological motor units associated with a particular muscle. In some embodiments, biopotential sensors data can be captured for a plurality of biological motor units. The captured biopotential sensors data can be analyzed to determine one or more biological motor units associated with a particular muscle. More specifically, the biopotential sensors data can be used to gradually discover multiple biological motor units from the same muscle. The multiple biological motor units from the same muscle can be determined in pseudo real-time. Identification of the biological motor units from a particular muscle assist in providing guidance to a user in identifying and isolating a particular biological motor unit, as described above in reference to FIGS. 1A-1M.

Figure 5C:
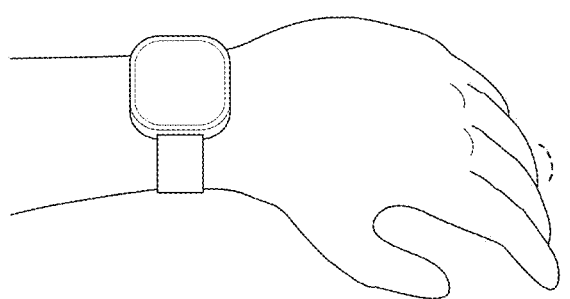

FIGS. 5A-5C are an example representation of real-time detection of activation of one or more biological motor units, in accordance with some embodiments. Biopotential sensors data captured during activation of one or more biological motor units can be abstractly presented to assist in the identification and isolation of a particular biological motor. Biopotential sensors data can be clustered to identify a biological motor unit (e.g., a spike). An identified biological motor unit is shown as a closed circle (e.g. first circle 505). As a cluster is formed, a circle gradually fills (e.g., second circle 510) and, when the circle fills, a biological motor unit is identified, and the circle is closed.

For example, in FIGS. 5A and 5B, the second circle 510 is gradually filled until there is sufficient biopotential sensors data to satisfy a threshold and close the second circle 510 (identifying a particular biological motor unit). The circle when closed includes a solid outline. Similarly, FIGS. 5B and 5C illustrate the detection of a third biological motor unit. The biopotential sensors data clusters together at a particular location and a third circle 515 is formed at the location of the cluster. In FIG. 5C, the third circle 515 is gradually filled until there is sufficient biopotential sensors data to satisfy a threshold and close the third circle 515 (identifying a another particular biological motor unit).

Figure 6:
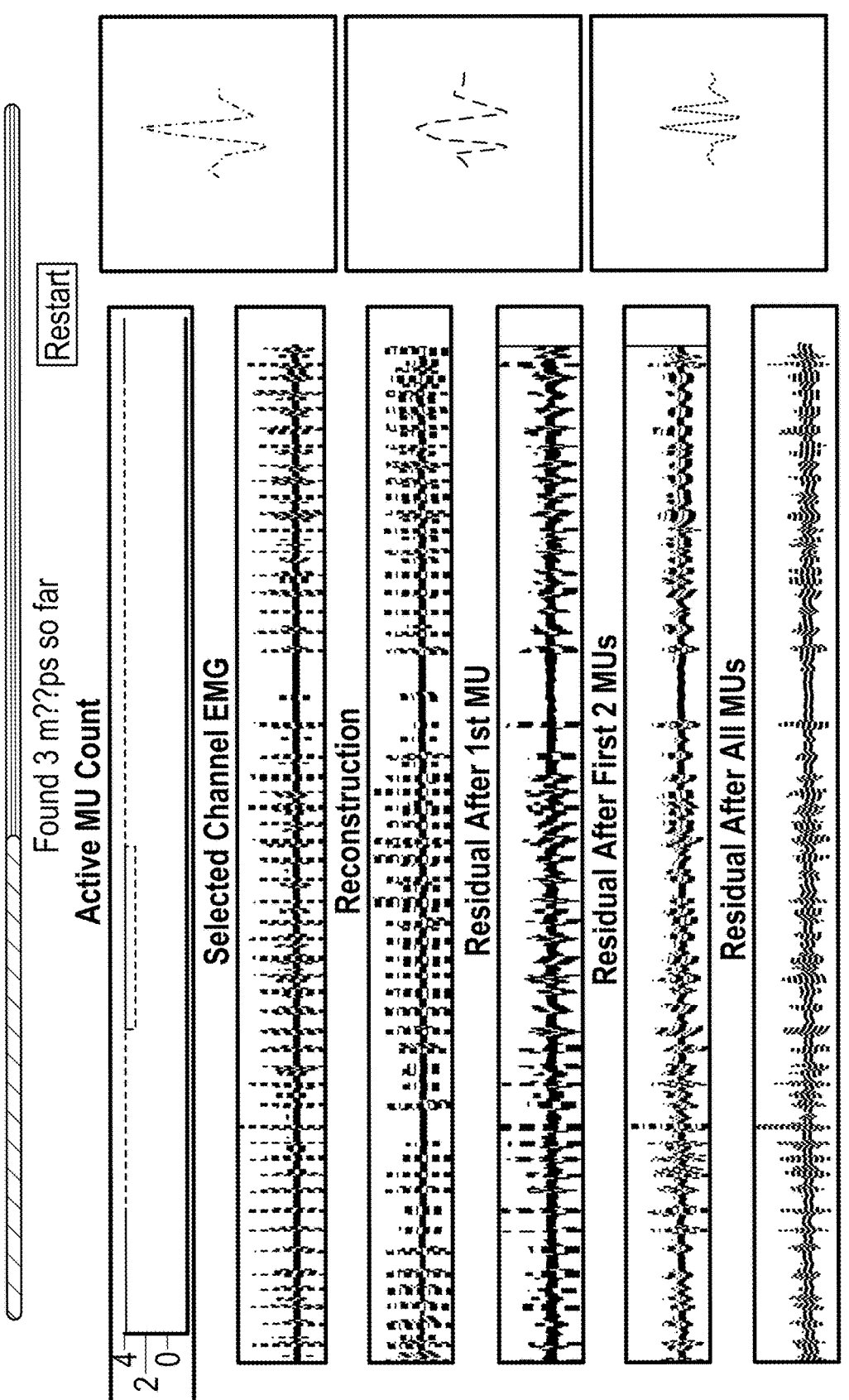
FIG. 6 illustrates example biopotential sensors data captured when a user performs a micromovement, in accordance with some embodiments.

FIG. 6 illustrates example biopotential sensors data captured when a user performs a micromovement, in accordance with some embodiments. When the user is instructed to perform a micromovement, the biopotential sensors data can be used to estimate the number of biological motor units activated. The estimate of the number of active biological motor units can be determined in real-time. The estimate the number of biological motor units activated can be used to further guide a user in the performance of additional movements for isolating one or more specific biological motor units (as described above in reference to FIGS. 1A-1M).

Figure 7A:
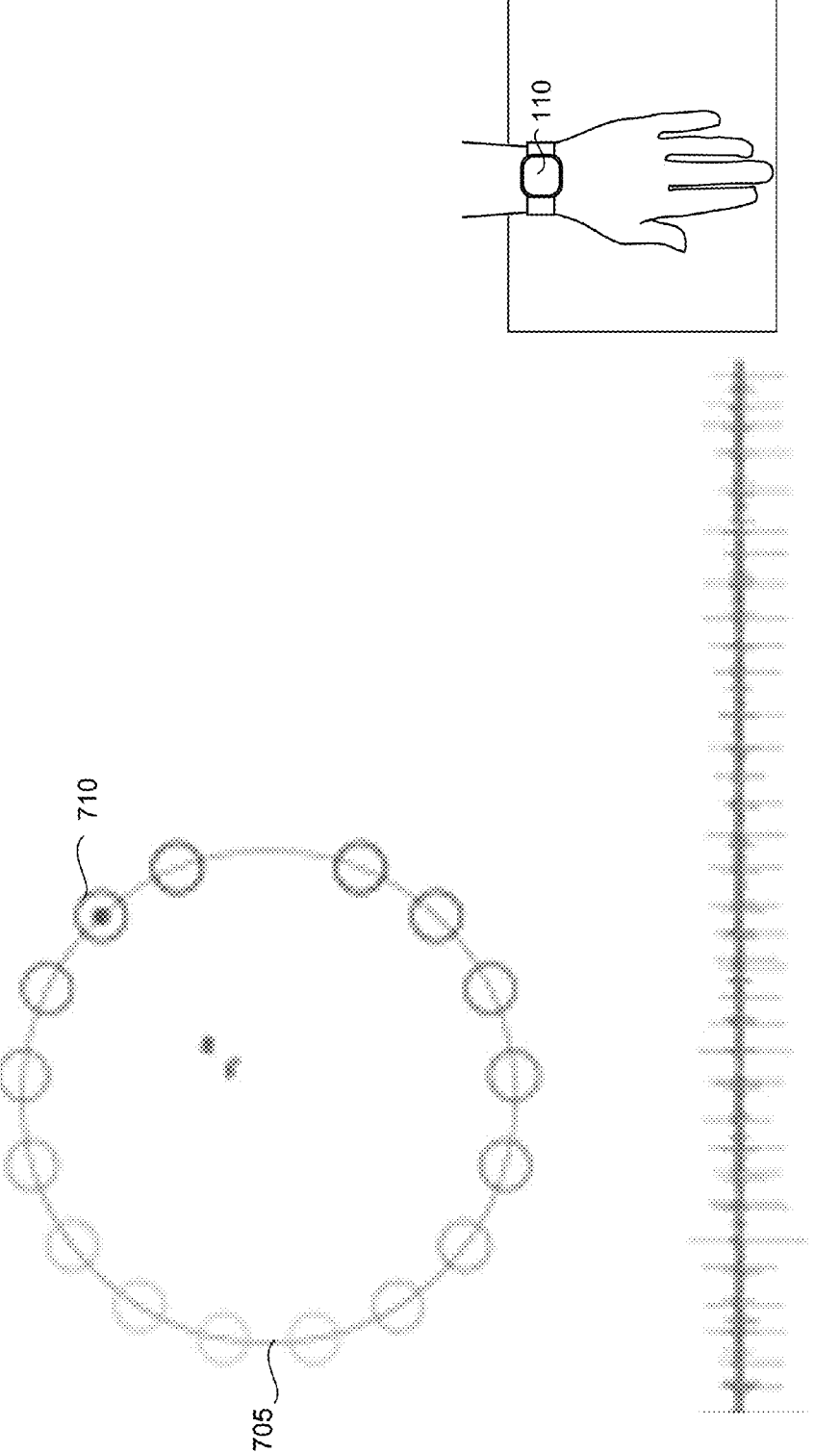
FIGS. 7A-7C illustrate a self-paced micromovement and biological motor unit exploration process, in accordance with some embodiments.
Figure 7B:
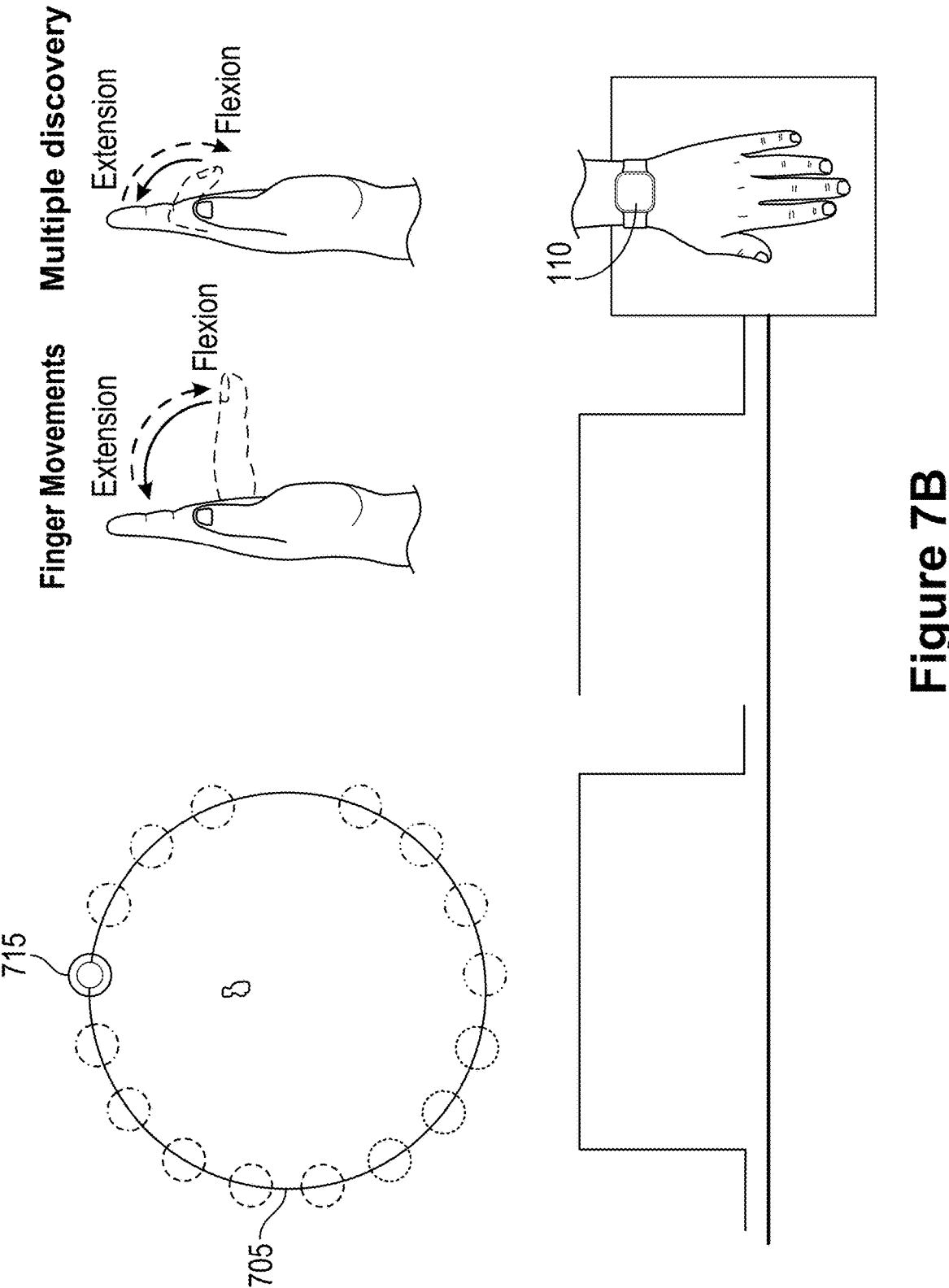
Figure 7C:
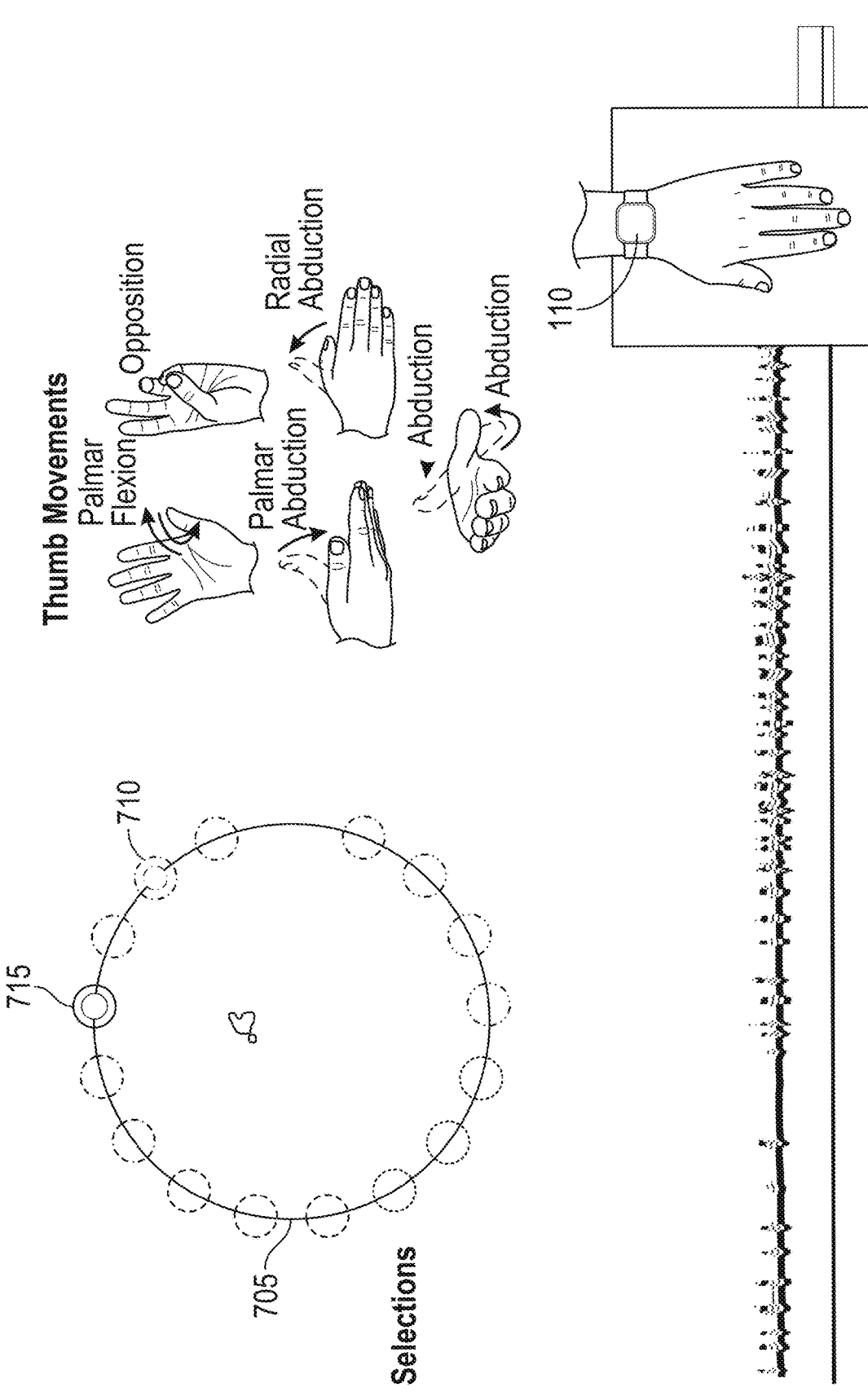

FIGS. 7A-7C illustrate a self-paced micromovement and biological motor unit exploration process, in accordance with some embodiments. In some embodiments, a user can be presented with real-time micromovement visual guidance. In particular, when a micromovement is performed, biological motor units are shown in the circular plot 705. As biopotential sensors data is captured during the performance of a micromovement, a cluster corresponding to a particular biological motor unit is gradually filled. For example, in FIG. 7A, a first cluster 710 is filled.

In FIG. 7B, the user is presented with a particular movement, and the user is asked to activate biological motor units associated with the movement (using micromovements). As biopotential sensors data is captured during the performance of the particular micromovement, a cluster corresponding to a particular biological motor unit is gradually filled. For example, in FIG. 7B, a second cluster 715 is filled.

Similarly, FIG. 7C, presents another particular movement to the user and the user is asked to activate biological motor units associated with the movement (using micromovements). As biopotential sensors data is captured during the performance of the other particular micromovement, a cluster corresponding biological motor units are gradually filled. For example, in FIG. 7C, both the first 710 and second cluster 715 are filled.

In some embodiments, the self-paced micromovement system of FIGS. 7A-7C can include auditory feedback for the user. In some embodiments, the user's results are scored based on the number of micromovements isolated and number of biological motor units elicited. The user's score can be ranked in a leaderboard to compare their results with others.

Figure 8:
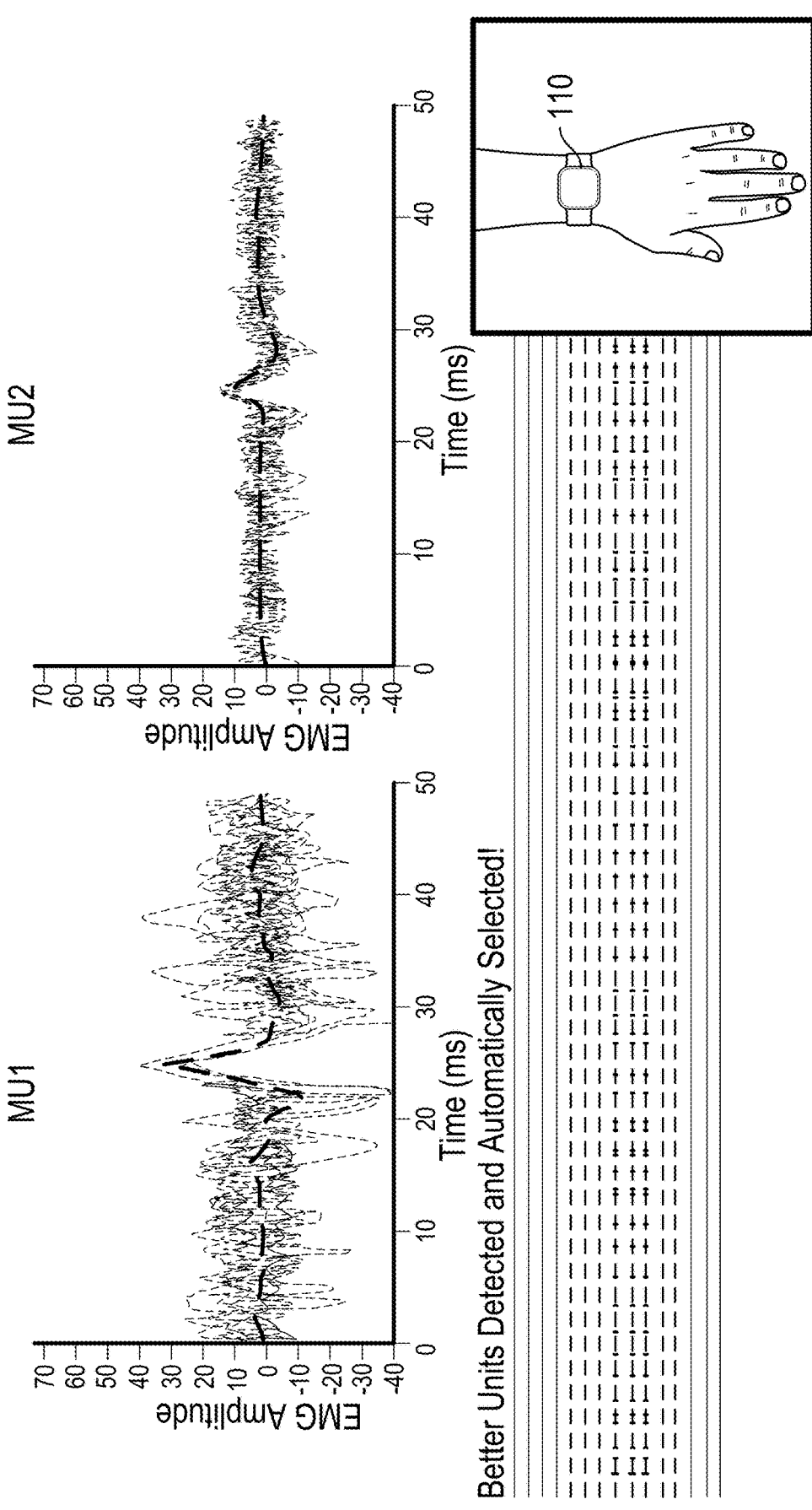
FIG. 8 illustrates the automatic selection of biological motor units, in accordance with some embodiments.

FIG. 8 illustrates the automatic selection of biological motor units, in accordance with some embodiments. In some embodiments, biopotential sensor data for two or more biological motor units can be provides. In some embodiments, one or more models are used to select the biological motor unit with the better performance. In some embodiments, the model is an automatic closed-loop motor unit selection. In some embodiments, an online estimation of neural drives is used.

In some embodiments, the model uses a co-adaptation method to select the best biological motor units for control. In the co-adaptation method, a user is asked to alternate between two micromovements (at their own pace). An algorithm (or model) suggests biological motor units that have higher chances of being controlled independently. The suggested biological motor units can be used in applications after selection of the biological motor units. In some embodiments, the co-adaptation method can select the biological motor units within a predetermined on boarding period (e.g., 1 minute, 2 minutes, etc.).

FIG. 9 illustrates activation of one or more biological motor units via one or more car movements, in accordance with some embodiments. More specifically, FIG. 9 shows biopotential sensor data captured during performance of an car movement 910. In some embodiments, one or more biopotential sensors of a head-wearable device 120 can be used to capture biopotential sensor data during performance of an ear movement 910. The one or more biopotential sensors of the head-wearable device 120 are deposed over extrinsic car muscles (e.g., auricularis posterior). In some embodiments, a training process (e.g., described above in reference to FIGS. 1A-1M) can be used to prompt the user to activate their left and/or right car muscle. Activation of the left and/or right ear muscle can be used to perform natural activities. In some embodiments, estimated EMG power thresholds are used to minimize false positives during natural car behaviors (e.g., car twitches).

Figure 10:
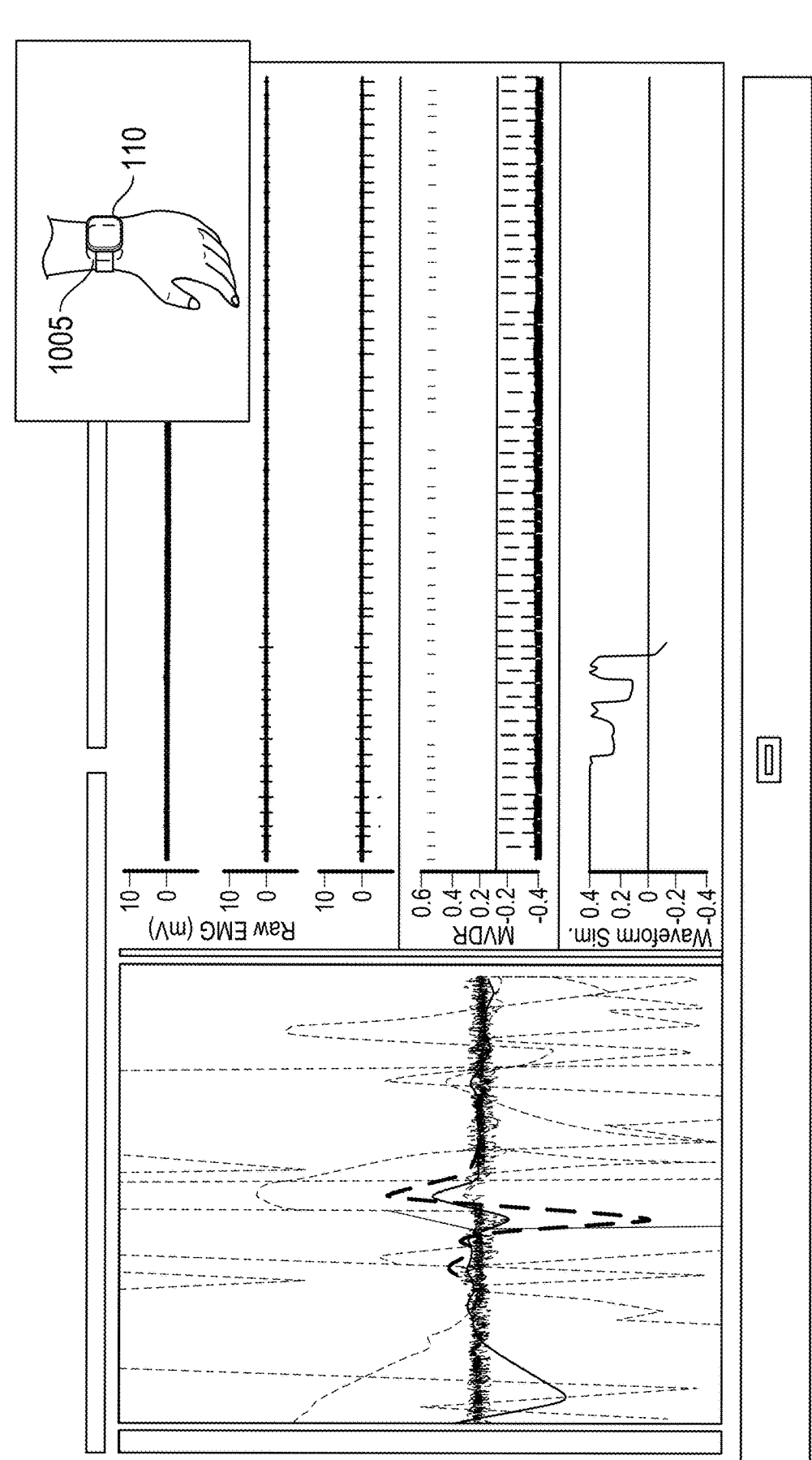
FIG. 10 shows historically tracked biopotential sensors data, in accordance with some embodiments.

FIG. 10 shows historically tracked biopotential sensors data, in accordance with some embodiments. In some embodiments, biopotential sensors data for a particular biological motor units can be tracked across sessions. A session can includes situations where the user removes and the wrist-wearable device 110 and repositions the wrist-wearable device 110 at a future time. The position of the wrist-wearable device 110 can change between sessions (as indicated by shifted display 1005). In some embodiments, the system matches a current template to a reference template by waveform similarity. In some embodiments, visual feedback on raw EMG, minimum variance distortionless response (MVDR) filter output (e.g., output of the online model used to detect motor unit activity), and waveform similarity is provided. In some embodiments, after a predetermined number of wrist-wearable device position adjustment attempts, a user can locate biological motor units that are putatively the same across sessions.

In some embodiments, the systems and models disclosed herein are able to detect differences in the biopotential sensors data based on the position of the wrist of the user. For example, a wrist positioned at a first angle can have first biopotential sensors data for a particular biological motor unit and the wrist positioned at a second angle can have second (distinct) biopotential sensors data for the same particular biological motor unit. In some embodiments, the systems and models disclosed herein use tracked biopotential sensors data to account for changes in the wrist angle.

Figure 11A:
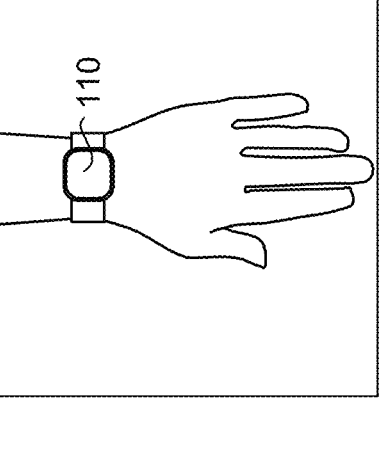
Figure 11B:
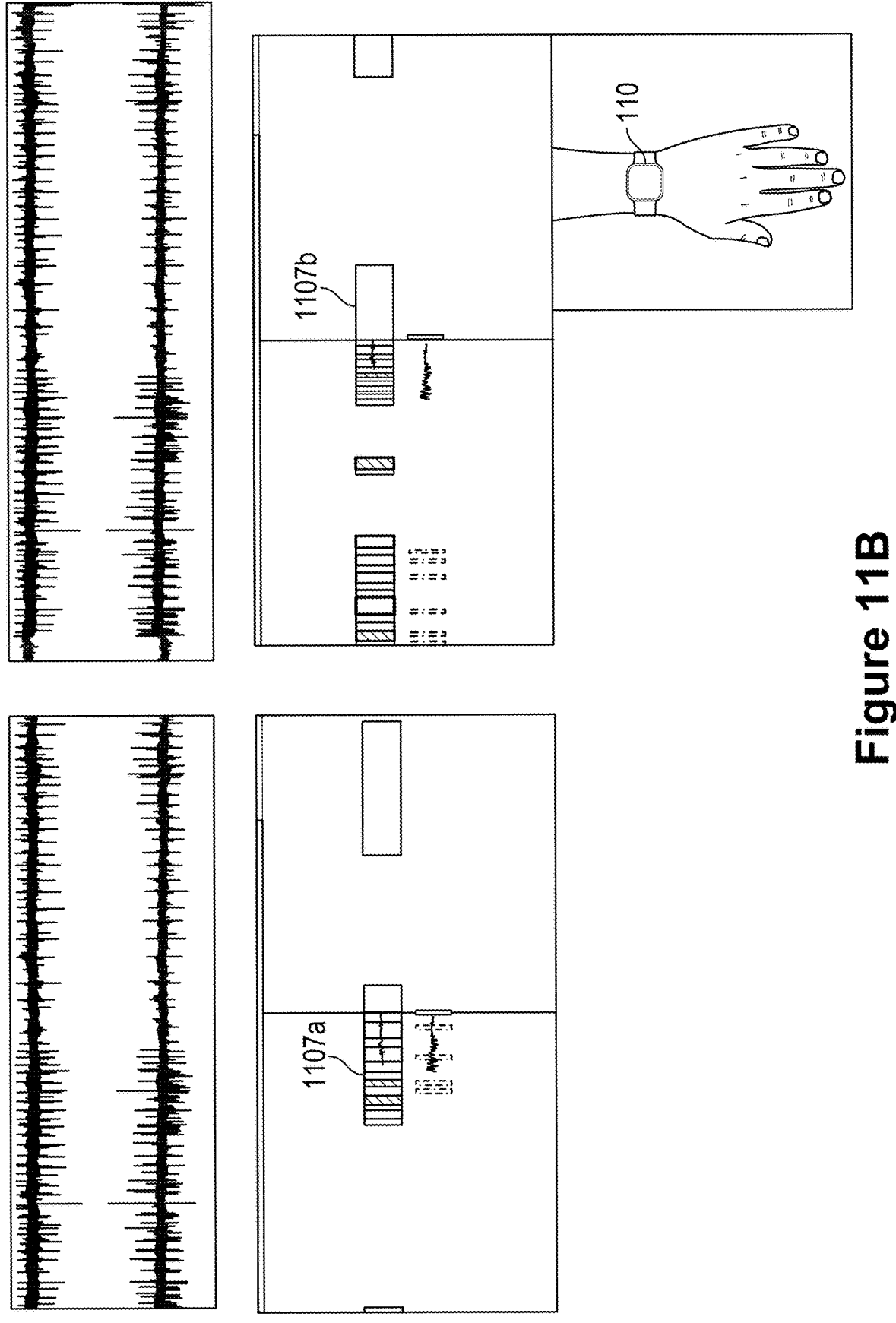

FIGS. 11A-11C illustrate different example control exercises that are used for training a user to activate and control one or more biological motor units, in accordance with some embodiments.

FIG. 11A illustrates selection of a single biological motor unit for event control, in accordance with some embodiments. In some embodiments, a single biological motor unit can be selected to control a particular action or event. For example, the user can be playing a game, and the systems and methods disclosed herein can select a single biological motor unit (e.g., the biological motor unit that generates the biopotential sensors data with the highest magnitude and/or reliability). The single biological motor unit can be used for simple control actions, such as making the character 1105 jump.

FIG. 11B illustrates state control using a single biological motor unit, in accordance with some embodiments. In some embodiments, a state (e.g., on/off or 1/0) of a single biological motor unit stays on if the instantaneous discharge rate is above a threshold. In the example exercise, the user is instructed to keep the single biological motor unit active for a predetermined time (e.g., the length of the moving target element passes, such as a first moving target element 1107a and a second moving target element 1107b). In some embodiments, the user is provided with feedback on the single biological motor unit's current state (e.g., 0 or 1). FIG. 12 shows individual spikes of the single biological motor unit and another single biological motor unit detected on the same channel.

FIG. 11C illustrates an example training method for teaching users to control at least two biological motor units of a muscle. The example control training exercise of FIG. 11C instructs users to move a cursor 1111 to a target location 1109. The target location 1109 is positioned on either the left or the right of a starting position of the cursor 1111. The cursor 1111 in centrally located at the start of each exercise. Once the user moves the cursor 1111 to the target location 1109, a celebration animation 1113 is presented, and the exercise restarts. Each detected biological motor unit activation causes the cursor 1111 to move a discrete step. The exercise is configured to break biological motor unit recruitment order.

FIG. 12 illustrates biopotential sensor data captured during user movement, in accordance with some embodiments. In some embodiments, biopotential sensor data is configured to be captured when associated biological motor units are activated during natural movements (e.g., small movements, stationary movements (e.g., hand movements while seated at a desk). In some embodiments, the biopotential sensors are configured to cease the capture of biopotential sensor data when the user is moving or performing substantial movements. For example, when a user wearing a wrist-wearable device moves (detected by one or more sensors, such as an inertial measurement unit), the capture of biopotential sensor data is gated (e.g., not captured). FIG. 12 shows the different points in time at which data is captured. In a first image 1205, no biopotential sensor data is captured as a process is being imitated. In a second image 1210, biopotential sensor data is gated, which is indicative of the user moving around. In a third image 1215, biopotential sensor data is captured, which is indicative of the user activating biological motor units while performing natural movements.

Figure 13:
FIG. 13 illustrates user control in activating biological motor units, in accordance with some embodiments.

FIG. 13 illustrates user control in activating biological motor units, in accordance with some embodiments. In particular, FIG. 13 shows raw biological sensor data captures. As shown in FIG. 13, the user is able to selectively control the number of biological motor units activated (e.g., 1, 2, 3, 4, etc.). In some embodiments, the user can control ballistically the number of activated biological motor units.

FIG. 14 illustrates a practical application for biological motor unit control, in accordance with some embodiments. In FIG. 14, a user activates a biological motor unit to transmit a message in morse code. Dots and lines in morse code are represented by short and long activation (e.g., spike) patterns. More specifically, the time between the activation of the biological motor unit can be used as morse code. For example, two successive activations of the biological motor unit can be a first letter, and a second activation of the biological motor unit timed 1 seconds after a first activation of the biological motor unit can be second letter, distinct from the first.

Figure 15:
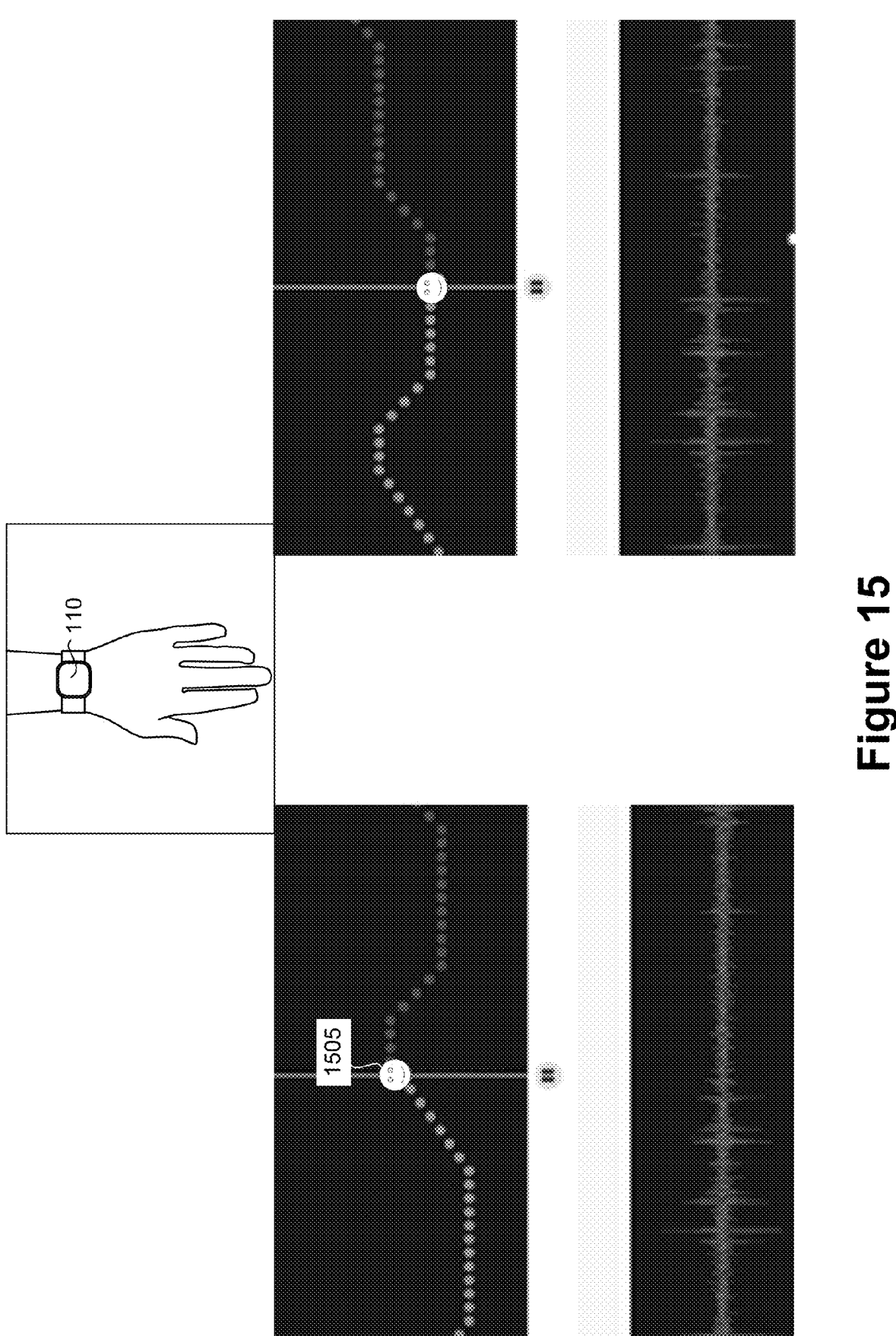
FIG. 15 illustrates one dimensional control using a biological motor unit, in accordance with some embodiments.

FIG. 15 illustrates one dimensional control using a biological motor unit, in accordance with some embodiments. In FIG. 15, activation of the biological motor unit is used to adjust a cursor 1505 position. In some embodiments, the cursor 1505 position is controlled by a continuous signal derived from the activation of the biological motor unit. In some embodiments, biopotential sensor data is smoothed and converted to a positional or velocity encoder. In some embodiments, the biological motor unit is configured for multi-dimensional control (e.g., 2-dimensional, or 3-dimensional control).

Figure 16:
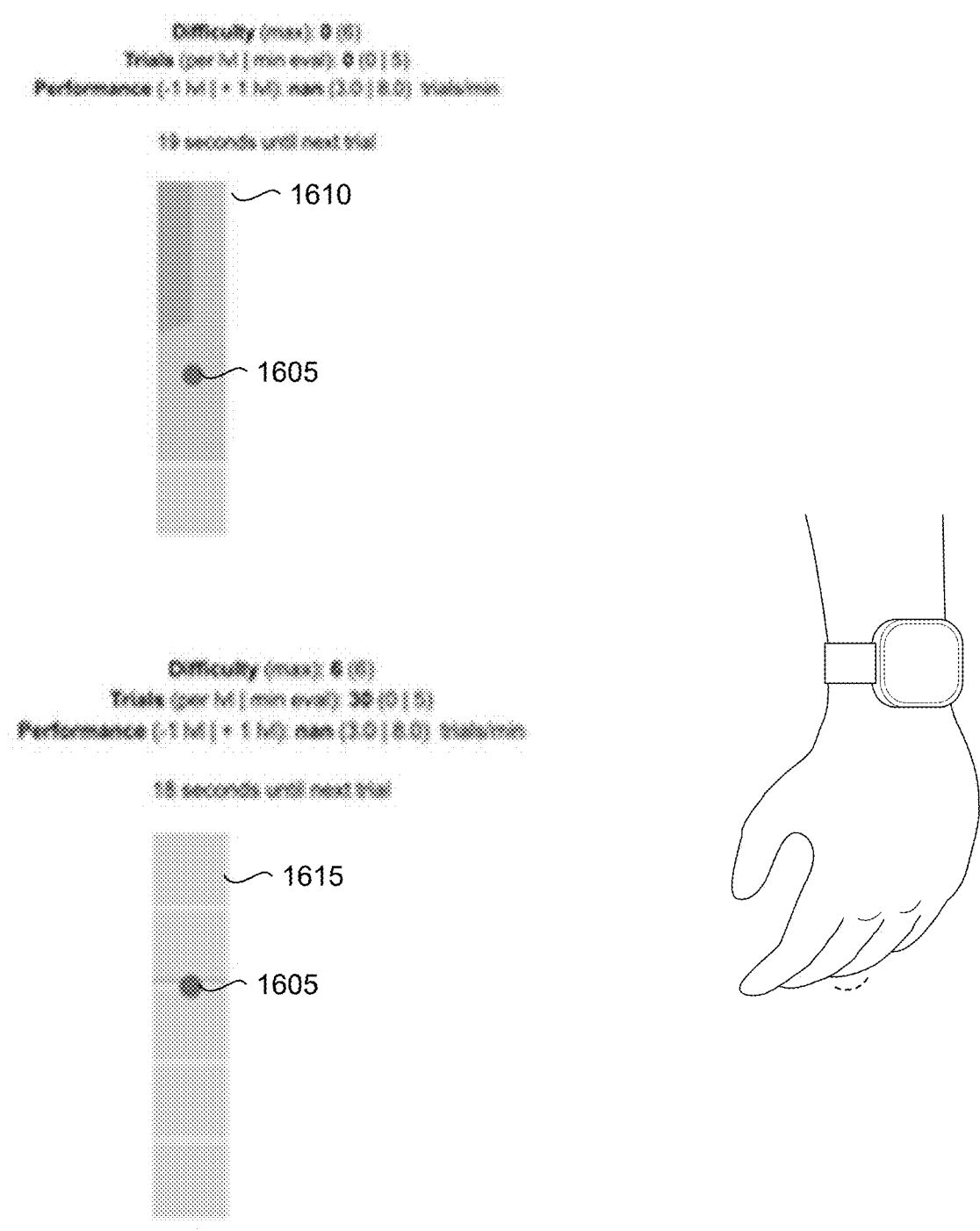
FIG. 16 illustrate an additional control exercise, in accordance with some embodiments.

FIG. 16 illustrate an additional control exercise, in accordance with some embodiments. In some embodiments, a user can practice low variance control of a discharge rate of an activated biological motor unit. For example, in FIG. 16 a cursor 1605 position is controlled (e.g., raised or lifted) when a biological motor unit is activated, and begins to fall when the biological motor unit is no longer activated. A user can practice low variance control to account for the discharge rate such that the fall of the cursor 1605 can be controlled. In some embodiments, the cursor 1605 position is controlled by a continuous signal derived from biopotential sensor data captured when the biological motor unit is activated. As the user becomes more skilled in biological motor unit control, more difficult challenges are presented. For example, in FIG. 16 a low difficulty game is presented in a first challenge UI element 1610, and a high difficulty game is presented in a second challenge UI element 1615. In each game, the user is challenged to position the cursor 1605 in a particular location.

Figure 17B:
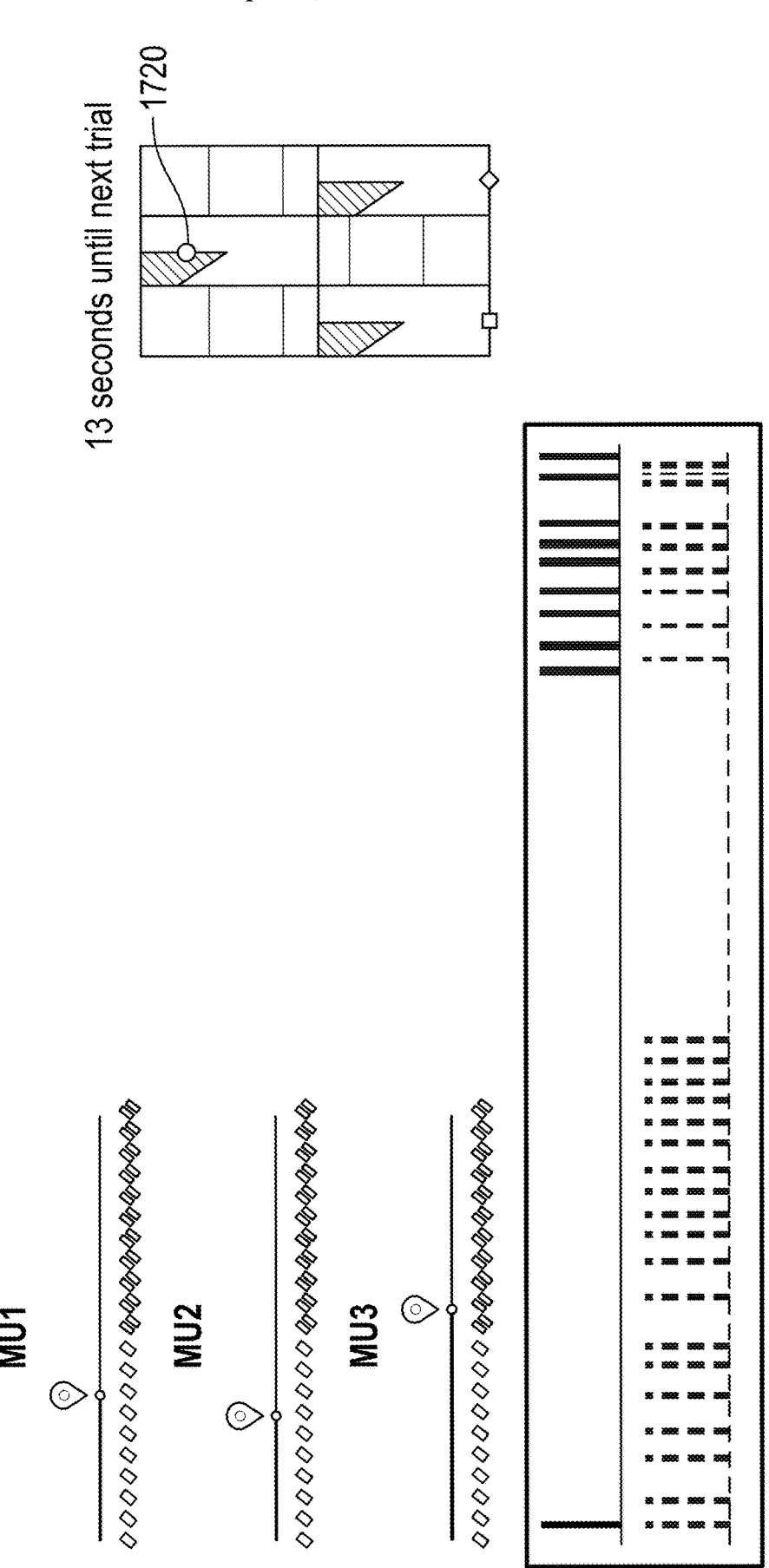

FIGS. 17A and 17B illustrate combined control of multiple biological motor units, in accordance with some embodiments. In particular, FIG. 17A illustrates the user selectively activating particular biological motor units. In some embodiments, combinatorial control of multiple biological motor units is performed for the muscle (to which the biological motor units are associated). In some embodiments, the discharge rate of each biological motor unit is binarized. In some embodiments, control signals are triggered if the activation pattern is held for a certain amount of time, which reduce the false positive rate.

FIG. 17B illustrates a challenge that the user can participate in to master combined control of multiple biological motor units. The challenge can require the user to control each cursor and position the cursor at a particular location. By selectively activating two or more biological motor units, the user can adjust the position of each cursor.

FIG. 18 illustrates online biological motor unit selection, in accordance with some embodiments. FIG. 18 shows a closed-loop activation discovery identifies and selects biological motor units with the highest potential for independent control. In some embodiments, dancing-dots, as shown in the challenge game 1810, task a user to further train and evaluate independent control of the selected biological motor units. In some embodiments, the user is presented with auditory and/or visual feedback for detected biological motor unit activity to assist the user in self-paced exploration for developing strategies in independent controlling biological motor units.

FIG. 19 illustrates use of one or more biological motor units for providing an input at an application, in accordance with some embodiments. In FIG. 19, a user activates one or more biological motor unit to pull back a sling shot, and shoot a ball at a pillar of blocks.

Figure 20:
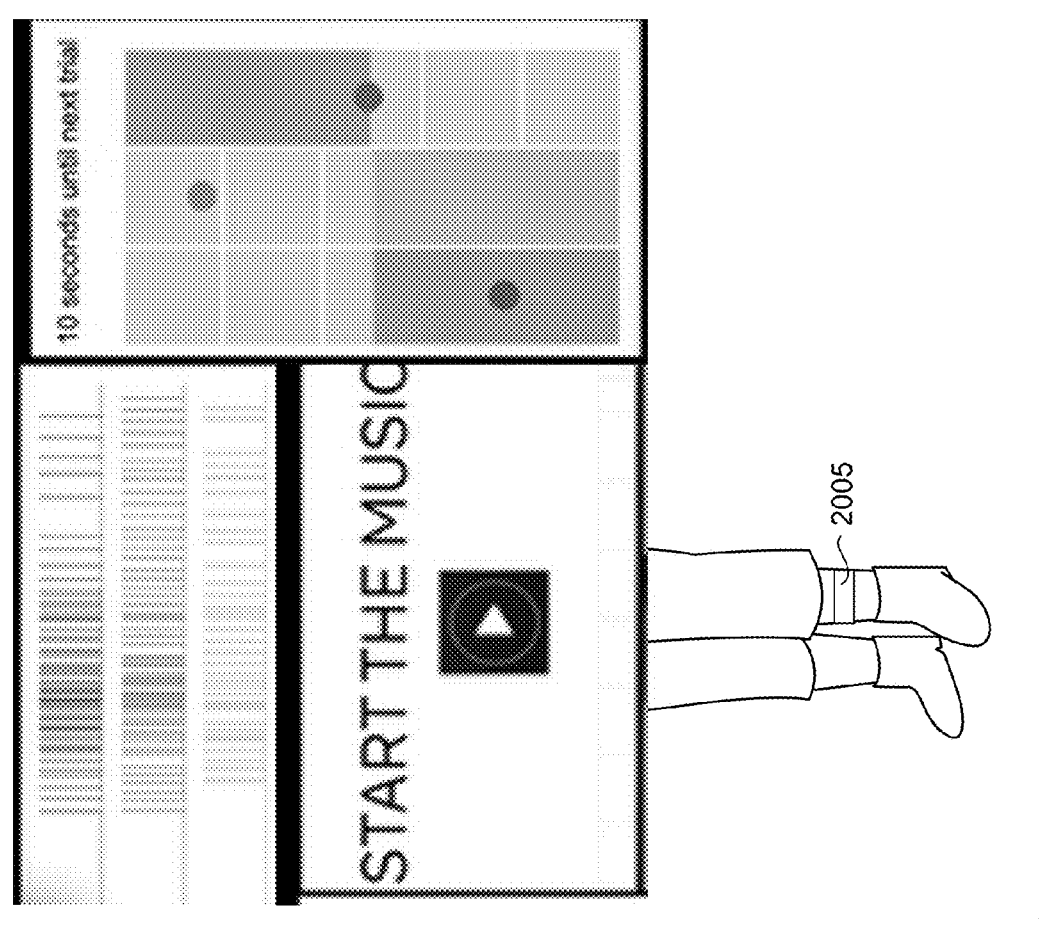
FIG. 20 illustrates activation of biological motor units at another portion of the user's body, in accordance with some embodiments.

FIG. 20 illustrates activation of biological motor units at another portion of the user's body, in accordance with some embodiments. In particular, in FIG. 20, the user wears a wearable band around their leg, the wearable band includes one or more biopotential sensors that detect the activation of one or more biological motor units. The user activates the biological motor unit on their leg to perform one or more actions. For example, in FIG. 20, activation of the biological motor units on the user's leg are used to initiate a video or play a song. While the example shown in FIG. 20 illustrates activation of the biological motor units on the user's leg, similar actions can be performed using biological motor units on other parts of the user's body (e.g., wrists, hands, cars, digits, arms, etc.).

In some embodiments, the number of biological motor units and/or control states for the biological motor units can be used to map the activation of one or more biological motor units to a specific command or action. In particular, controlling the activation of the biological motor unit with different states allows for binarized inputs. For example, a first biological motor unit can have two states (0 and 1) and a second biological motor unit can also have two states (0 and 1), and the number of possible combinations for the first and second biological motor units is four. The combined use of multiple biological motor units increase the total number of actions and commands available to a user.

FIG. 21 illustrates an example typing application using one or more biological motor units, in accordance with some embodiments. In FIG. 21, 3 biological motor units have 3 states, which allows for 27 possible combinations (e.g., 0, 0, 1; 0, 1, 1; 1, 1, 1; etc.). The 27 possible combinations cover the letters in the alphabet and enable a user to type out a message.

The above examples are non-limiting. Biological motor units can be used to perform any number of commands and actions.

FIG. 22A-23B illustrate flow diagrams of methods for guiding users to perform detectable biopotential-based gestures tied to specific motor units, and actionable feedback associated therewith, in accordance with some embodiments. Operations (e.g., steps) of the methods 2200 and 2300 can be performed by one or more processors (e.g., central processing unit and/or MCU) of a system, including a head-wearable device 120, a wrist-wearable device 110, and/or other communicatively coupled device, as describe in reference to FIGS. 1A-2H, 24A, and 24B). At least some of the operations shown in FIGS. 22A-23B correspond to instructions stored in a computer memory or computer-readable storage medium (e.g., storage, RAM, and/or memory, such as memory 2580 and 2650 described below in reference to FIGS. 25A-26C). Operations of the 2200 and 2300 can be performed by a single device alone or in conjunction with one or more processors and/or hardware components of another communicatively coupled device (e.g., a handheld intermediary processing device 2700, a server 2430, a mobile device 2450 and/or other device described below in reference to FIGS. 24A and 24B) and/or instructions stored in memory or computer-readable medium of the other device communicatively coupled to the system. In some embodiments, the various operations of the methods described herein are interchangeable and/or optional, and respective operations of the methods are performed by any of the aforementioned devices, systems, or combination of devices and/or systems. For convenience, the method operations will be described below as being performed by particular system, but should not be construed as limiting the performance of the operation to the particular device in all embodiments.

Figure 22B:
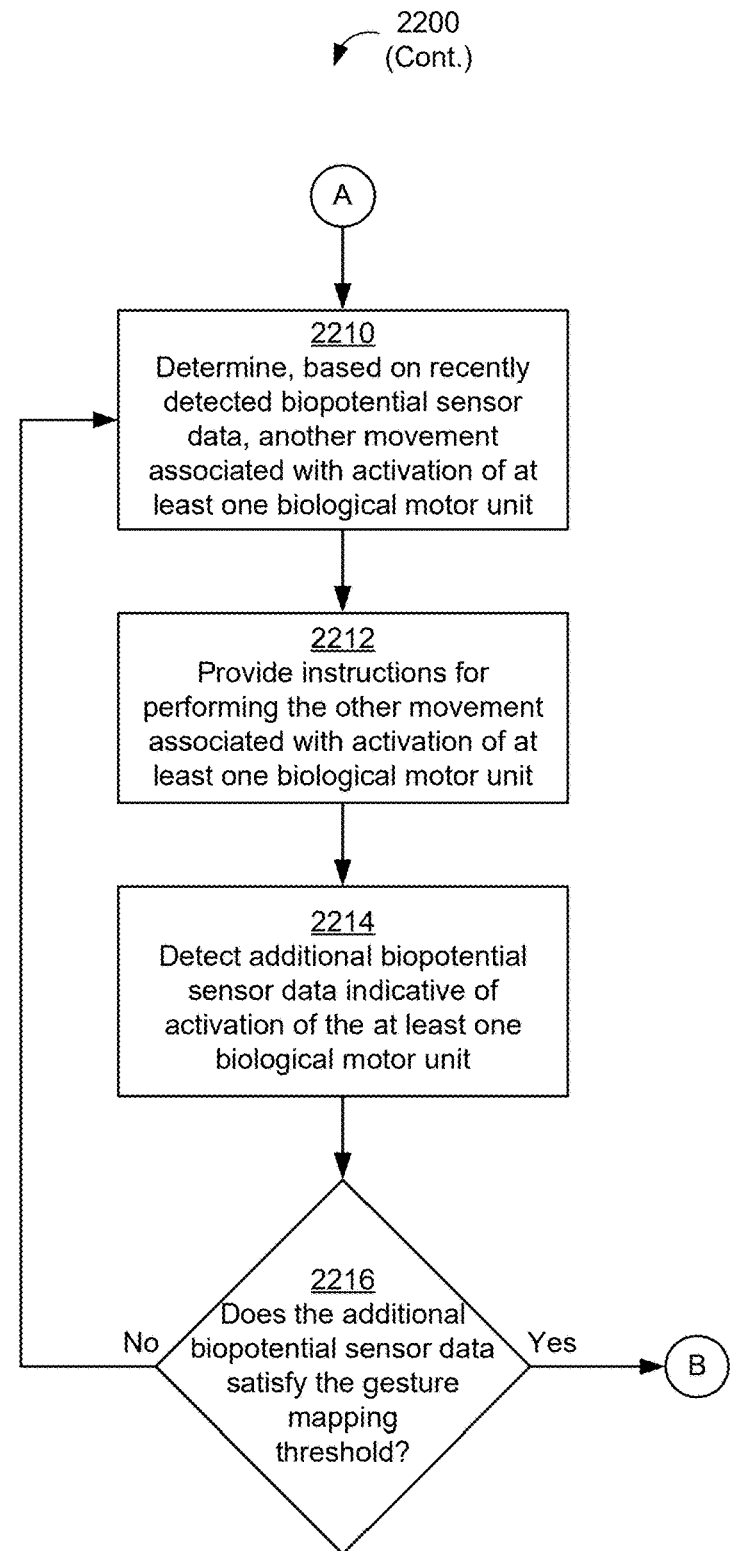

FIGS. 22A-22C illustrate a detailed flow chart of a first method 2200 for guiding users to perform detectable biopotential-based gestures tied to specific motor units, and actionable feedback associated therewith. The first method 2200 is performed at a system including at least a head-wearable device 120 and a wrist-wearable device 110 (e.g., similar to the system described above in reference to FIGS. 1A-2H).

The first method 2200 includes initiating (2202) a micro-movement-gesture detection training process. The first method 2200 include providing (2204) instructions for performing a movement associated with activation of at least one biological motor unit. For example, as described above in reference to FIG. 1E, instructions can include a particular movement, such as a digit movement, a hand movement, etc. In some embodiments, the movement is determined for a particular biological motor unit. In some embodiments, the instructions are presented via an AR UI 150. Alternatively, or in addition, in some embodiments, the instructions are presented via a display 115 of the wrist-wearable device 110.

The first method 2200 further includes detecting (2206) biopotential sensor data indicative of activation of the at least one biological motor unit. The biopotential sensor data can be detected or captured via one or more biopotential sensors of the head-wearable device 120 and/or the wrist-wearable device 110. For example, in FIGS. 1A-1M, the one or more biopotential sensors of the wrist-wearable device 110 are used to capture biopotential sensor data associated with the recommended finger movements presented to the user.

The first method 2200 includes determining ((2208)) whether the biopotential sensor data satisfies a gesture mapping threshold. As described above in reference to FIGS. 1E-1H, the gesture mapping threshold is a predetermined value of a biopotential signal detected for a biological motor unit. In some embodiments, the predetermined value is the smallest (accurate) detectable value by a biopotential sensors.

The first method 2200 includes in accordance with a determination that the biopotential sensor data does not satisfy the gesture mapping threshold ("No" at operation 2208), determining (2210), based on recently detected biopotential sensor data, another movement associated with activation of at least one biological motor unit. For example, as described above in reference to FIGS. 1E-1H, instructions presented to the user are configured to identify, isolate, and/or optimize activation of one or more biological motor units. Each additional instruction is based on biopotential sensor data captured during the performance of a previous movement (or biological motor unit activation).

The first method 2200 includes providing (2212) instructions for performing the other movement associated with activation of the at least one biological motor unit and detecting (2214) additional biopotential sensor data indicative of activation of the at least one biological motor unit. In other words, the first method 2200 collects biopotential sensor data for each new movement. This allows the first method 2200 to continuously use updated biopotential sensor data in the determination of new movement.

The first method 2200 includes determining (2216) whether the additional biopotential sensor data satisfies the gesture mapping threshold. For example, as described above in reference to FIGS. 1G and 1H, biopotential sensor data captured during the performance of each subsequent movement can be used to help the user activate specific biological motor units.

The first method 2200 includes, in accordance with a determination that the additional biopotential sensor data does not satisfy the gesture mapping threshold ("No" at operation 2216), the first method 2200 returns to operation 2210 to continuously improve or optimize the movement such that the gesture mapping threshold is satisfied.

Alternatively, the first method 2200 includes, in accordance with a determination that the additional biopotential sensor data does satisfy the gesture mapping threshold ("Yes" at operation 2216), associating (2218) the biopotential sensor data with one or more micromovement gestures.

The first method 2200 further includes determining (2220) whether a request to train another movement is provided. In accordance with a determination that the user does not provide a request to train another movement ("No" at operation 2220), the first method 2200 includes terminating (2222) the micromovement-gesture detection training. Alternatively, in accordance with a determination that the user does provide a request to train another movement ("Yes" at operation 2220), the first method 2200 returns to operation 2204.

Returning to operation 2208, in accordance with a determination that the biopotential sensor data does satisfy the gesture mapping threshold ("Yes" at operation 2208), the first method 2200 proceeds to operation 2218.

Turning to FIGS. 23A and 23B, a flow chart of a second method 2300 for guiding users to perform detectable biopotential-based gestures tied to specific motor units, and actionable feedback associated therewith are shown. The second method 2300 is performed at a system including at least a head-wearable device 120 and a wrist-wearable device 110 (e.g., similar to the system described above in reference to FIGS. 1A-2H).

(A1) The second method 2300 is performed while a head-wearable device and a wrist-wearable device are worn by a user and while presenting, via a display of the head-wearable device, an artificial-reality (AR) user interface (UI) overlaid over a field of view of the user (2302). The second method 2300 includes presenting (2304) i) first instructions for performing a first movement associated with activation of one or more biological motor units, and ii) graphical elements associated with the activation of the one or more biological motor units. For example, as described above in reference to FIG. 1A-1M, different instructions for performing movements associated with one or more specific biologic motor units are presented to the user. The different instructions are configured to improve the user's ability to identify, isolate, and activate the specific biologic motor units.

The second method 2300 includes, in response to detecting (2306), by one or more biopotential sensors of the wrist-wearable device, a first activation of the one or more biological motor units determining (2308), based on first biopotential sensor data captured during performance of the first movement a second movement to be performed by the user (2310) and a first change to the graphical elements (2312). The second movement is i) associated with the activation of the one or more biological motor units and is ii) predicted to generate optimized biopotential sensor data during performance of the second movement that would satisfy a gesture mapping threshold (2311). The first change indicates partial activation of the one or more biological motor units (2313). The second method 2300 further includes presenting (2314) i) second instructions for performing the second movement, and ii) the first change to the graphical elements. For example, as described above FIGS. 1E-1H, additional movements can be determined using captured biopotential sensor data such that the guidance provided to the user is personalized for them.

The second method 2300 includes, in response to detecting (2316), by the one or more biopotential sensors of the wrist-wearable device, a second activation of the one or more biological motor units, in accordance with a determination that second biopotential sensor data captured during performance of the second movement satisfies the gesture mapping threshold (2318) associating (2320) the second biopotential sensor data with one or more biopotential-based gestures, and presenting (2322) a second change to the graphical elements. The second change indicating successful activation of the one or more biological motor units. For example, as described above in reference to FIGS. 1I-1L, after the activated biological motor units satisfy the gesture mapping threshold, the biopotential sensor data associated with the activated biological motor units is mapped with one or more biopotential-based gestures.

(A2) In some embodiments of A1, the second method 2300 includes, in accordance with a determination that second biopotential sensor data captured during performance of the second movement does not satisfy the gesture mapping threshold (2324) determining (2326), based on the second biopotential sensor data captured during performance of the second movement a third movement to be performed by the user (2328) and a third change to the graphical elements (2330). The third movement is i) associated with the activation of the one or more biological motor units and is ii) predicted to generate further optimized biopotential sensor data during performance of the second movement that would satisfy the gesture mapping threshold. The third change indicates additional partial activation of the one or more biological motor units. The second method 2300 includes presenting (2332) the third instructions for performing the third movement, and the third change to the graphical elements. For example, as described above in reference to FIGS. 1E-1H, in accordance with a determination that biopotential sensor data measured during the activation of specific biological motor units do not satisfy an accuracy threshold and/or gesture mapping threshold, a new movement is determined and presented to the user.

(A3) In some embodiments of any one of A1 and A2, the second method 2300 includes, presenting fourth instructions for performing a fourth movement associated with activation of a particular biological motor unit of the one or more biological motor units, and ii) second graphical elements associated with the activation of the particular biological motor unit. The second method 2300 includes, in response to detecting, by the one or more biopotential sensors of the wrist-wearable device, a first activation of the particular biological motor unit determining, based on first isolated biopotential sensor data captured during performance of the fourth movement a fifth movement to be performed by the user and a first change to the second graphical elements. The fifth movement is i) associated with the activation of the particular biological motor unit and is ii) predicted to generate optimized isolated biopotential sensor data during performance of the fifth movement that would satisfy the gesture mapping threshold. The first change indicating partial activation of the particular biological motor unit. The second method 2300 includes presenting i) fifth instructions for performing the fifth movement, and ii) the first change to the second graphical elements. The second method 2300 further includes, in response to detecting, by the one or more biopotential sensors of the wrist-wearable device, a second activation of the particular biological motor unit, in accordance with a determination that second isolated biopotential sensor data captured during performance of the fifth movement satisfies the gesture mapping threshold associating the second isolated biopotential sensor data with one or more other biopotential-based gesture, and presenting a third change to the second graphical elements, the third change indicating successful activation of the particular biological motor unit. In some embodiments, the second method 2300 is configured to assist the user in isolating particular biological motor units. Examples of isolating one or more particular biological motor units are provided above in reference to FIGS. 1A-1M and 4-7C.

(A4) In some embodiments of A3, the second method 2300 includes, in accordance with a determination that second isolated biopotential sensor data captured during performance of the fifth movement does not satisfy the gesture mapping threshold determining, based on the second isolated biopotential sensor data captured during performance of the fifth movement a sixth movement to be performed by the user and a fourth change to the second graphical elements. The sixth movement is i) associated with the activation of the particular biological motor unit and is ii) predicted to generate further optimized isolated biopotential sensor data during performance of the sixth movement that would satisfy the gesture mapping threshold. The fourth change indicates additional partial activation of the particular biological motor unit. The second method 2300 further includes presenting sixth instructions for performing the sixth movement, and the fourth change to the second graphical elements.

(A5) In some embodiments of any one of A1-A4, the second method 2300 includes, before determining whether the second biopotential sensor data captured during performance of the second movement satisfies the gesture mapping threshold, obtaining, from the one or more biopotential sensors of the wrist-wearable device first candidate biopotential sensor data captured during performance of the second movement and second candidate biopotential sensor data captured during performance of the second movement. The first candidate biopotential sensor data is associated with a first set of biological motor units of the one or more biological motor units, and the second candidate biopotential sensor data is associated with a second set of biological motor units of the one or more biological motor units. The second method 2300 further includes selecting the first candidate biopotential sensor data or the second candidate biopotential sensor data as the second biopotential sensor data based on a comparison of the first candidate biopotential sensor data and the second candidate biopotential sensor data. FIGS. 1E-1H provide examples of the accuracy threshold and the gesture mapping threshold in accordance with some embodiments.

(A6) In some embodiments of A5, the comparison of the first candidate biopotential sensor data and the second candidate biopotential sensor data includes determining respective candidate biopotential sensor data that satisfies an accuracy threshold. In some embodiments, If both the first and the second candidate biopotential sensor data satisfy the accuracy threshold, the respective candidate biopotential sensor data is the biopotential sensor data with the largest magnitude or accuracy. If both the first and the second candidate biopotential sensor data satisfy the accuracy threshold and have the same accuracy and/or magnitude, one or both of the first and the second candidate biopotential sensor data are selected as the second biopotential sensor data. FIGS. 1E-1H provide examples of the accuracy threshold and the gesture mapping threshold in accordance with some embodiments.

Additionally, FIG. 3 provides an example method of selecting a model or algorithm for detecting activation of one or more biological motor units.

(A7) In some embodiments of any one of A1-A6, the second method 2300 includes, in response to detecting, by the one or more biopotential sensors of the wrist-wearable device, the second biopotential sensor data during the performance of another user movement, providing instructions for performing a command associated with the one or more biopotential-based gestures.

(A8) In some embodiments of any one of A1-A7, associating the second biopotential sensor data with the one or more biopotential-based gestures includes storing the second biopotential sensor data and a location of the one or more biopotential sensors on the user's body when the second biopotential sensor data was captured.

(A9) In some embodiments of A8, the second method 2300 includes, in accordance with a determination that the wrist-wearable device has been reposition, determining updated biopotential sensor data to be associated with the one or more biopotential-based gestures. The biopotential sensor data is based in part on the second biopotential sensor data and the location of the one or more biopotential sensors on the user's body when the second biopotential sensor data was captured. FIG. 10 provides sample adjustments to the wrist-wearable device 110 when reapplied on the user's body.

(A10) In some embodiments of any one of A1-A9, the first movement is a macro-movement and the second movement is a micromovement. A macro-movement is a movement visible and noticeable movement and a micromovement is a subtle imperceptible movement.

(A11) In some embodiments of any one of A1-A10, the graphical elements include a plurality of concentric circles. Example graphical elements are described above in reference to FIGS. 1A-1M.

(A12) In some embodiments A11, each concentric circle of the plurality of concentric circles is associated with a distinct motor unit. Examples of the concentric circles are described above in reference to FIGS. 1A-1M.

(A13) In some embodiments of A1, detecting the second activation of the one or more biological motor units includes, while biopotential sensor data captured during performance of a respective movement does not satisfy the gesture mapping threshold i) determining, based on biopotential sensor data captured during performance of a respective movement a respective movement to be performed by the user and a respective change to the graphical elements; and ii) presenting, via the communicatively coupled display, respective instructions for performing the respective movement, and the respective change to the graphical elements. The respective movement is associated with the activation of the one or more biological motor units and predicted to generate respective optimized biopotential sensor data during performance of the respective movement that would satisfy the gesture mapping threshold. The respective change indicates respective partial activation of the one or more biological motor units. Detecting the second activation of the one or more biological motor units further includes, in accordance with a determination that the biopotential sensor data captured during performance of a respective movement satisfies the gesture mapping threshold i) associating the biopotential sensor data captured during performance of the respective movement with one or more biopotential-based gestures, and ii) presenting, via the communicatively coupled display, a respective change to the graphical elements. The respective change indicating successful activation of the one or more biological motor units.

In some embodiments, the head-wearable device 120 and the wrist-wearable device 110 are packaged together as part of a software-development kit. As discussed with reference to at least FIG. 1A, the wrist-wearable device 110 includes a watch display 115, one or more sensors 2521 (including one or more biopotential sensors), one or more processors 2579, and/or other components and the head-wearable device 120 includes an AR display 125, one or more sensors 2623 (including one or more respective biopotential sensors), one or more cameras 2638, one or more processors 2648, and/or other components. The software-development kit may also include a handheld intermediary processing device 2700. The devices of the software-development kit are configured to communicate with a server 2430, a computer 2440, a mobile device 2450, and/or other electronic devices. In some embodiments, the server 2430 is configured specifically for devices associated with the software-development kit.

In some embodiments, users of the software-development kit can access the models used in detecting activation of the biological motor unit (as described with reference to FIG. 3), the true signal (e.g., actual measured values of a biological motor unit when activated), data from the biopotential sensors, and/or other information via an application programming interface. The models and the true signal may be accessed in real time.

(B1) Another method is performed while a wearable device is worn by a user. The other method includes presenting, via a communicatively coupled display, i) first instructions for performing a first movement associated with activation of one or more biological motor units, and ii) graphical elements associated with the activation of the one or more biological motor units. For example, as described above in reference to FIG. 1A-1M, different instructions for performing movements associated with one or more specific biologic motor units are presented to the user. The different instructions are configured to improve the user's ability to identify, isolate, and activate the specific biologic motor units.

The other method includes, in response to detecting, by one or more biopotential sensors of the wearable device, a first activation of the one or more biological motor units determining, based on first biopotential sensor data captured during performance of the first movement a second movement to be performed by the user and a first change to the graphical elements. The second movement is i) associated with the activation of the one or more biological motor units and is ii) predicted to generate optimized biopotential sensor data during performance of the second movement that would satisfy a gesture mapping threshold. The first change indicates partial activation of the one or more biological motor units. The other method further includes presenting, via a communicatively coupled display, i) second instructions for performing the second movement, and ii) the first change to the graphical elements. For example, as described above FIGS. 1E-1H, additional movements can be determined using captured biopotential sensor data such that the guidance provided to the user is personalized for them.

The other method includes, in response to detecting, by the one or more biopotential sensors of the wearable device, a second activation of the one or more biological motor units, in accordance with a determination that second biopotential sensor data captured during performance of the second movement satisfies the gesture mapping threshold associating the second biopotential sensor data with one or more biopotential-based gestures, and presenting, via a communicatively coupled display, a second change to the graphical elements. The second change indicating successful activation of the one or more biological motor units. For example, as described above in reference to FIGS. 11-1L, after the activated biological motor units satisfy the gesture mapping threshold, the biopotential sensor data associated with the activated biological motor units is mapped with one or more biopotential-based gestures.

(B2) In some embodiments of B1, the other method is configured in accordance with and/or configured to perform analogous operations to A2-A13.

(C1) In accordance with some embodiments, a system that includes one or more of a wrist wearable device, a head-wearable device, and/or a handheld intermediary processing device, and the system is configured to perform operations corresponding to any of A1-A13.

(D1) In accordance with some embodiments, a non-transitory computer readable storage medium including instructions that, when executed by a computing device in communication with a wrist wearable device, a head-wearable device, and/or a handheld intermediary processing device, cause the computer device to perform operations corresponding to any of A1-A13.

(E1) In accordance with some embodiments, a means on a wrist-wearable device, a head-wearable device, and/or a handheld intermediary processing device for performing or causing performance of the method of any of A1-A13.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 2500, a head-wearable device, an HIPD 2700, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a micro-controller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems

Figure 24A:
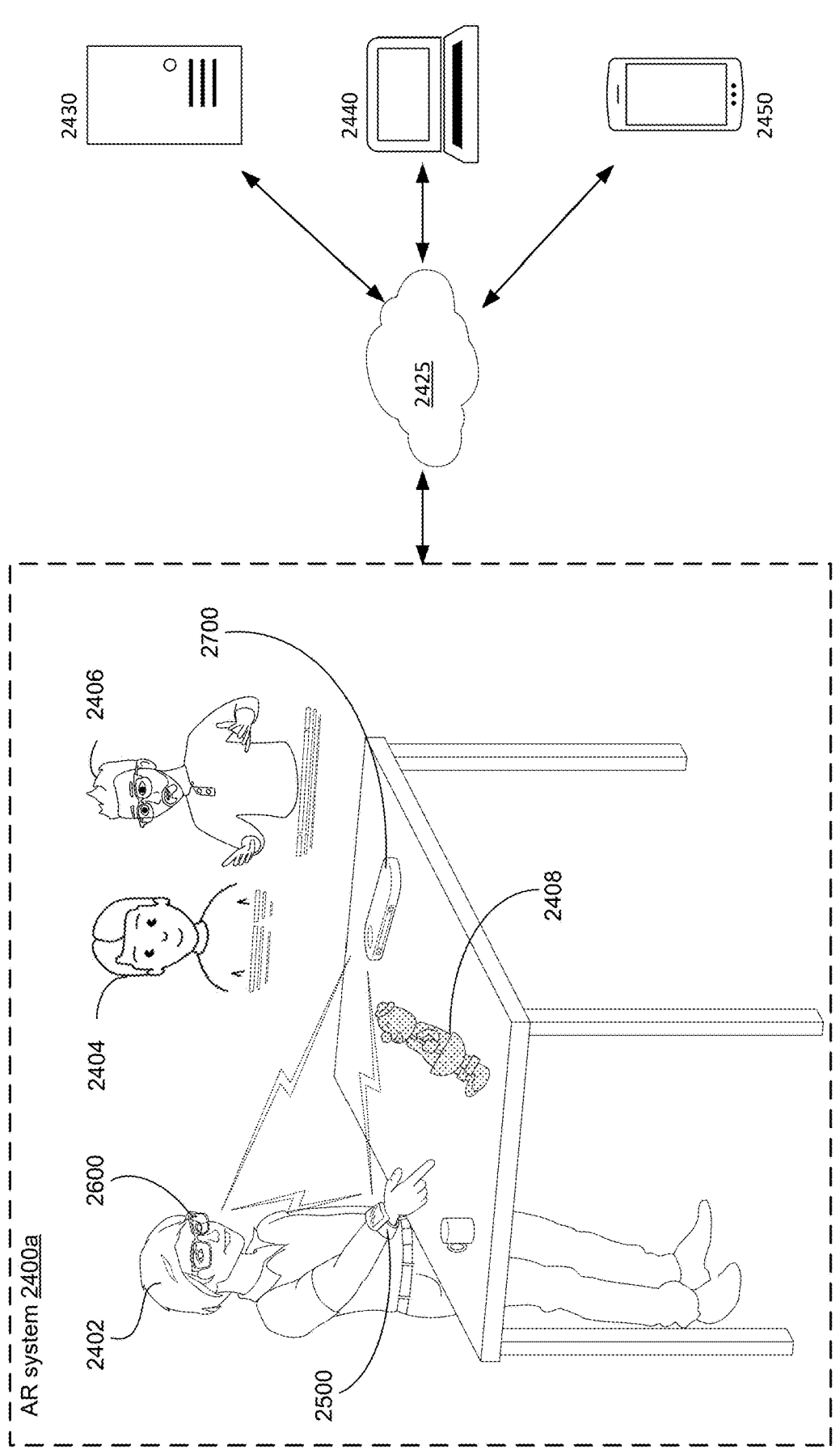
FIGS. 24A and 24B illustrate example artificial-reality systems, in accordance with some embodiments.
Figure 24B:
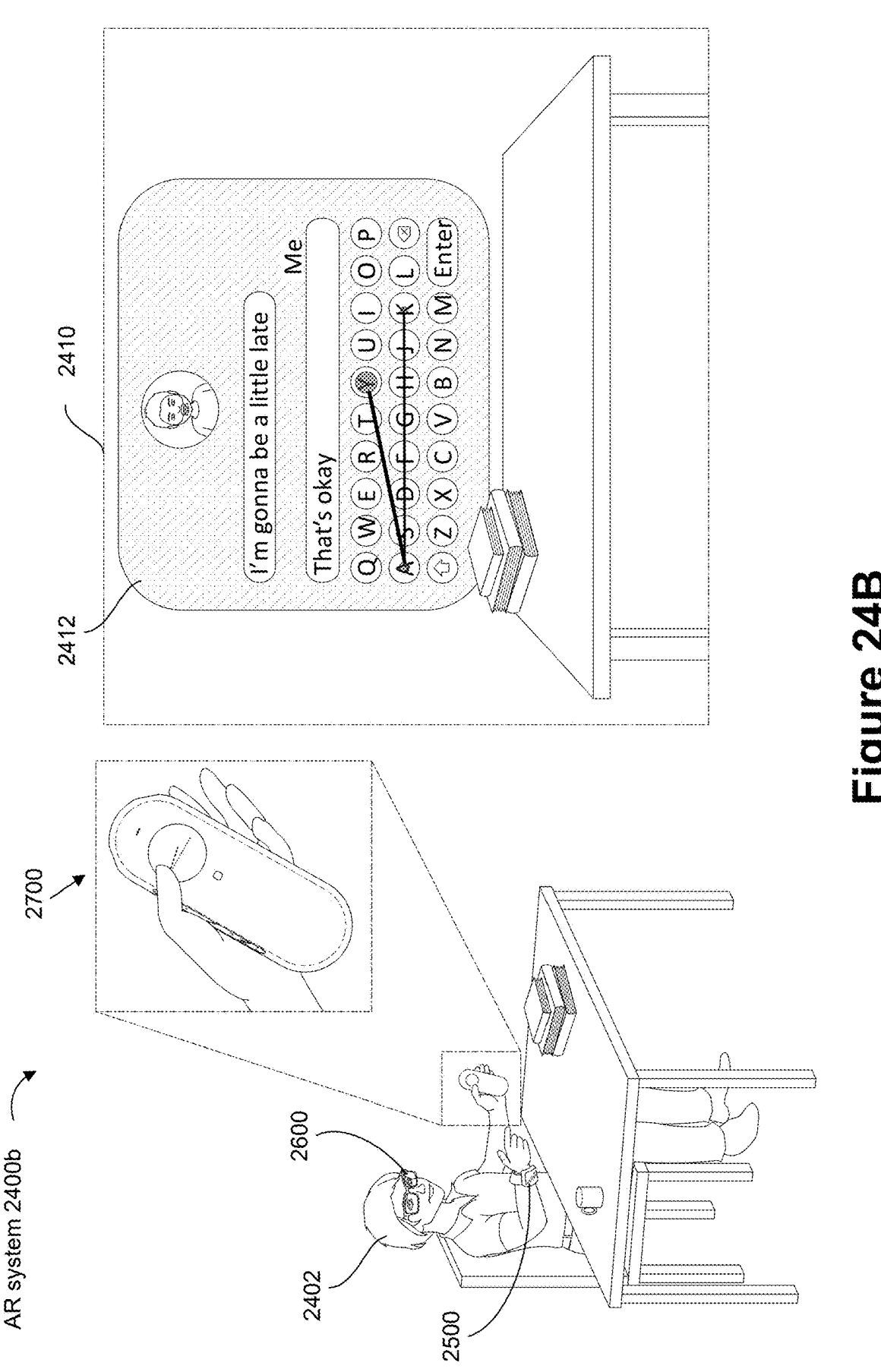

FIGS. 24A and 24B illustrate example AR systems, in accordance with some embodiments. FIG. 24A shows a first AR system 2400a and first example user interactions using a wrist-wearable device 2500, a head-wearable device (e.g., AR device 2600), and/or a handheld intermediary processing device (HIPD) 2700 and FIG. 24B shows a second AR system 2400b and second example user interactions using a wrist-wearable device 2500, AR device 2600, and/or an HIPD 2700. As the skilled artisan will appreciate upon reading the descriptions provided herein, the above-example AR systems (described in detail below) can perform various functions and/or operations described above with reference to FIGS. 1A-23B.

The wrist-wearable device 2500 and its constituent components are described below in reference to FIGS. 25A-25B, the head-wearable devices and their constituent components are described below in reference to FIGS. 26A-26C, and the HIPD 2700 and its constituent components are described below in reference to FIGS. 27A-27B. The wrist-wearable device 2500, the head-wearable devices, and/or the HIPD 2700 can communicatively couple via a network 2425 (e.g., cellular, near field, Wi-Fi, personal area network, or wireless LAN). Additionally, the wrist-wearable device 2500, the head-wearable devices, and/or the HIPD 2700 can also communicatively couple with one or more servers 2430, computers 2440 (e.g., laptops or computers), mobile devices 2450 (e.g., smartphones or tablets), and/or other electronic devices via the network 2425 (e.g., cellular, near field, Wi-Fi, personal area network, or wireless LAN).

Turning to FIG. 24A, a user 2402 is shown wearing the wrist-wearable device 2500 and the AR device 2600, and having the HIPD 2700 on their desk. The wrist-wearable device 2500, the AR device 2600, and the HIPD 2700 facilitate user interaction with an AR environment. In particular, as shown by the first AR system 2400a, the wrist-wearable device 2500, the AR device 2600, and/or the HIPD 2700 cause presentation of one or more avatars 2404, digital representations of contacts 2406, and virtual objects 2408. As discussed below, the user 2402 can interact with the one or more avatars 2404, digital representations of the contacts 2406, and virtual objects 2408 via the wrist-wearable device 2500, the AR device 2600, and/or the HIPD 2700.

The user 2402 can use any of the wrist-wearable device 2500, the AR device 2600, and/or the HIPD 2700 to provide user inputs. For example, the user 2402 can perform one or more hand gestures that are detected by the wrist-wearable device 2500 (e.g., using one or more EMG sensors and/or IMUs, described below in reference to FIGS. 25A-25B) and/or AR device 2600 (e.g., using one or more image sensors or cameras, described below in reference to FIGS. 26A-26B) to provide a user input. Alternatively, or additionally, the user 2402 can provide a user input via one or more touch surfaces of the wrist-wearable device 2500, the AR device 2600, and/or the HIPD 2700, and/or voice commands captured by a microphone of the wrist-wearable device 2500, the AR device 2600, and/or the HIPD 2700. In some embodiments, the wrist-wearable device 2500, the AR device 2600, and/or the HIPD 2700 include a digital assistant to help the user in providing a user input (e.g., completing a sequence of operations, suggesting different operations or commands, providing reminders, or confirming a command). In some embodiments, the user 2402 can provide a user input via one or more facial gestures and/or facial expressions. For example, cameras of the wrist-wearable device 2500, the AR device 2600, and/or the HIPD 2700 can track the user 2402's eyes for navigating a user interface.

The wrist-wearable device 2500, the AR device 2600, and/or the HIPD 2700 can operate alone or in conjunction to allow the user 2402 to interact with the AR environment. In some embodiments, the HIPD 2700 is configured to operate as a central hub or control center for the wrist-wearable device 2500, the AR device 2600, and/or another communicatively coupled device. For example, the user 2402 can provide an input to interact with the AR environment at any of the wrist-wearable device 2500, the AR device 2600, and/or the HIPD 2700, and the HIPD 2700 can identify one or more back-end and front-end tasks to cause the performance of the requested interaction and distribute instructions to cause the performance of the one or more back-end and front-end tasks at the wrist-wearable device 2500, the AR device 2600, and/or the HIPD 2700. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 27A-27B, the HIPD 2700 can perform the back-end tasks and provide the wrist-wearable device 2500 and/or the AR device 2600 operational data corresponding to the performed back-end tasks such that the wrist-wearable device 2500 and/or the AR device 2600 can perform the front-end tasks. In this way, the HIPD 2700, which has more computational resources and greater thermal headroom than the wrist-wearable device 2500 and/or the AR device 2600, performs computationally intensive tasks and reduces the computer resource utilization and/or power usage of the wrist-wearable device 2500 and/or the AR device 2600.

In the example shown by the first AR system 2400a, the HIPD 2700 identifies one or more back-end tasks and front-end tasks associated with a user request to initiate an AR video call with one or more other users (represented by the avatar 2404 and the digital representation of the contact 2406) and distributes instructions to cause the performance of the one or more back-end tasks and front-end tasks. In particular, the HIPD 2700 performs back-end tasks for processing and/or rendering image data (and other data) associated with the AR video call and provides operational data associated with the performed back-end tasks to the AR device 2600 such that the AR device 2600 performs front-end tasks for presenting the AR video call (e.g., presenting the avatar 2404 and the digital representation of the contact 2406).

In some embodiments, the HIPD 2700 can operate as a focal or anchor point for causing the presentation of information. This allows the user 2402 to be generally aware of where information is presented. For example, as shown in the first AR system 2400a, the avatar 2404 and the digital representation of the contact 2406 are presented above the HIPD 2700. In particular, the HIPD 2700 and the AR device 2600 operate in conjunction to determine a location for presenting the avatar 2404 and the digital representation of the contact 2406. In some embodiments, information can be presented within a predetermined distance from the HIPD 2700 (e.g., within five meters). For example, as shown in the first AR system 2400a, virtual object 2408 is presented on the desk some distance from the HIPD 2700. Similar to the above example, the HIPD 2700 and the AR device 2600 can operate in conjunction to determine a location for presenting the virtual object 2408. Alternatively, in some embodiments, presentation of information is not bound by the HIPD 2700. More specifically, the avatar 2404, the digital representation of the contact 2406, and the virtual object 2408 do not have to be presented within a predetermined distance of the HIPD 2700.

User inputs provided at the wrist-wearable device 2500, the AR device 2600, and/or the HIPD 2700 are coordinated such that the user can use any device to initiate, continue, and/or complete an operation. For example, the user 2402 can provide a user input to the AR device 2600 to cause the AR device 2600 to present the virtual object 2408 and, while the virtual object 2408 is presented by the AR device 2600, the user 2402 can provide one or more hand gestures via the wrist-wearable device 2500 to interact and/or manipulate the virtual object 2408.

FIG. 24B shows the user 2402 wearing the wrist-wearable device 2500 and the AR device 2600, and holding the HIPD 2700. In the second AR system 2400b, the wrist-wearable device 2500, the AR device 2600, and/or the HIPD 2700 are used to receive and/or provide one or more messages to a contact of the user 2402. In particular, the wrist-wearable device 2500, the AR device 2600, and/or the HIPD 2700 detect and coordinate one or more user inputs to initiate a messaging application and prepare a response to a received message via the messaging application.

In some embodiments, the user 2402 initiates, via a user input, an application on the wrist-wearable device 2500, the AR device 2600, and/or the HIPD 2700 that causes the application to initiate on at least one device. For example, in the second AR system 2400b, the user 2402 performs a hand gesture associated with a command for initiating a messaging application (represented by messaging user interface 2412), the wrist-wearable device 2500 detects the hand gesture, and, based on a determination that the user 2402 is wearing AR device 2600, causes the AR device 2600 to present a messaging user interface 2412 of the messaging application. The AR device 2600 can present the messaging user interface 2412 to the user 2402 via its display (e.g., as shown by user 2402's field of view 2410). In some embodiments, the application is initiated and can be run on the device (e.g., the wrist-wearable device 2500, the AR device 2600, and/or the HIPD 2700) that detects the user input to initiate the application, and the device provides another device operational data to cause the presentation of the messaging application. For example, the wrist-wearable device 2500 can detect the user input to initiate a messaging application, initiate and run the messaging application, and provide operational data to the AR device 2600 and/or the HIPD 2700 to cause presentation of the messaging application. Alternatively, the application can be initiated and run at a device other than the device that detected the user input. For example, the wrist-wearable device 2500 can detect the hand gesture associated with initiating the messaging application and cause the HIPD 2700 to run the messaging application and coordinate the presentation of the messaging application.

Further, the user 2402 can provide a user input provided at the wrist-wearable device 2500, the AR device 2600, and/or the HIPD 2700 to continue and/or complete an operation initiated at another device. For example, after initiating the messaging application via the wrist-wearable device 2500 and while the AR device 2600 presents the messaging user interface 2412, the user 2402 can provide an input at the HIPD 2700 to prepare a response (e.g., shown by the swipe gesture performed on the HIPD 2700). The user 2402's gestures performed on the HIPD 2700 can be provided and/or displayed on another device. For example, the user 2402's swipe gestures performed on the HIPD 2700 are displayed on a virtual keyboard of the messaging user interface 2412 displayed by the AR device 2600.

In some embodiments, the wrist-wearable device 2500, the AR device 2600, the HIPD 2700, and/or other communicatively coupled devices can present one or more notifications to the user 2402. The notification can be an indication of a new message, an incoming call, an application update, a status update, etc. The user 2402 can select the notification via the wrist-wearable device 2500, the AR device 2600, or the HIPD 2700 and cause presentation of an application or operation associated with the notification on at least one device. For example, the user 2402 can receive a notification that a message was received at the wrist-wearable device 2500, the AR device 2600, the HIPD 2700, and/or other communicatively coupled device and provide a user input at the wrist-wearable device 2500, the AR device 2600, and/or the HIPD 2700 to review the notification, and the device detecting the user input can cause an application associated with the notification to be initiated and/or presented at the wrist-wearable device 2500, the AR device 2600, and/or the HIPD 2700.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 2600 can present to the user 2402 game application data and the HIPD 2700 can use a controller to provide inputs to the game. Similarly, the user 2402 can use the wrist-wearable device 2500 to initiate a camera of the AR device 2600, and the user can use the wrist-wearable device 2500, the AR device 2600, and/or the HIPD 2700 to manipulate the image capture (e.g., zoom in or out or apply filters) and capture image data.

Having discussed example AR systems, devices for interacting with such AR systems, and other computing systems more generally, devices and components will now be discussed in greater detail below. Some definitions of devices and components that can be included in some or all of the example devices discussed below are defined here for case of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

Figure 25A:
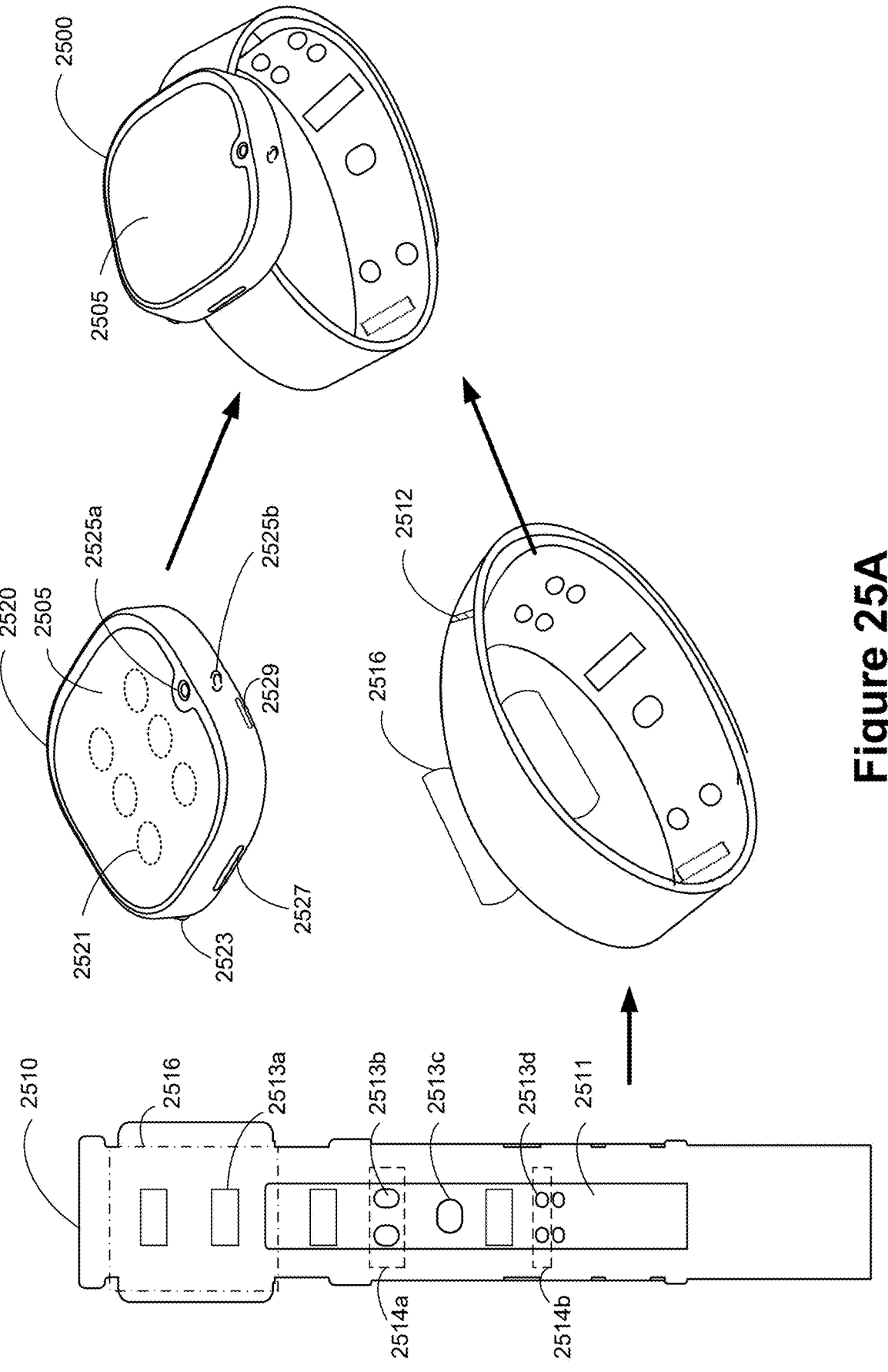
FIGS. 25A-25B illustrate an example wrist-wearable device 2500, in accordance with some embodiments.
Figure 25B:
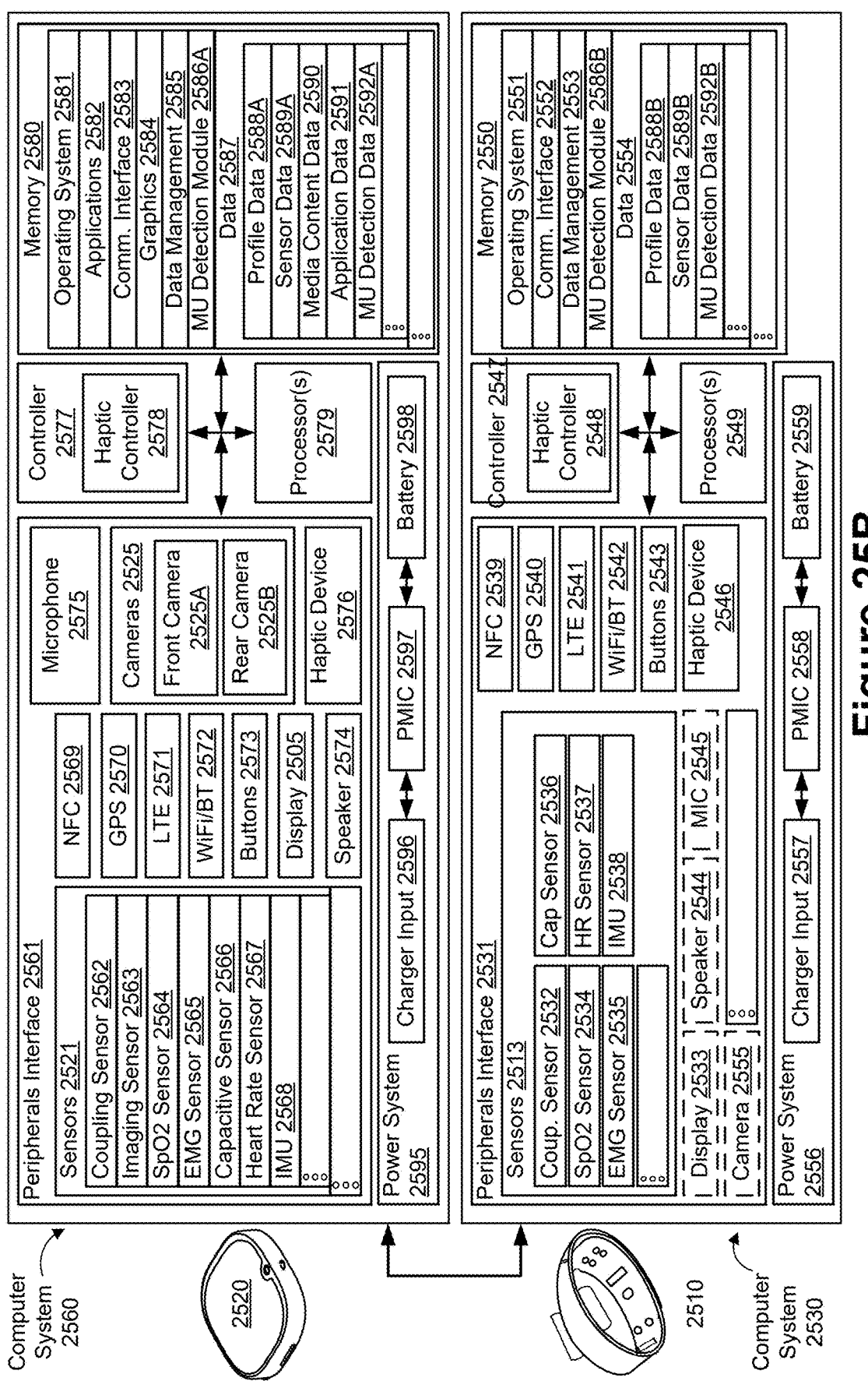

FIGS. 25A and 25B illustrate an example wrist-wearable device 2500, in accordance with some embodiments. The wrist-wearable device 2500 is an instance of the wearable device 110 described in reference to FIGS. 1A-23B herein, such that the wrist-wearable device 110 should be understood to have the features of the wrist-wearable device 2500 and vice versa. FIG. 25A illustrates components of the wrist-wearable device 2500, which can be used individually or in combination, including combinations that include other electronic devices and/or electronic components.

FIG. 25A shows a wearable band 2510 and a watch body 2520 (or capsule) being coupled, as discussed below, to form the wrist-wearable device 2500. The wrist-wearable device 2500 can perform various functions and/or operations associated with navigating through user interfaces and selectively opening applications, as well as the functions and/or operations described above with reference to FIGS. 1A-23B.

As will be described in more detail below, operations executed by the wrist-wearable device 2500 can include (i) presenting content to a user (e.g., displaying visual content via a display 2505); (ii) detecting (e.g., sensing) user input (e.g., sensing a touch on peripheral button 2523 and/or at a touch screen of the display 2505, a hand gesture detected by sensors (e.g., biopotential sensors)); (iii) sensing biometric data via one or more sensors 2513 (e.g., neuromuscular signals, heart rate, temperature, or sleep); messaging (e.g., text, speech, or video); image capture via one or more imaging devices or cameras 2525; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 2520, independently in the wearable band 2510, and/or via an electronic communication between the watch body 2520 and the wearable band 2510. In some embodiments, functions can be executed on the wrist-wearable device 2500 while an AR environment is being presented (e.g., via one of the AR systems 2400a and 2400b). As the skilled artisan will appreciate upon reading the descriptions provided herein, the novel wearable devices described herein can be used with other types of AR environments.

The wearable band 2510 can be configured to be worn by a user such that an inner (or inside) surface of the wearable structure 2511 of the wearable band 2510 is in contact with the user's skin. When worn by a user, sensors 2513 contact the user's skin. The sensors 2513 can sense biometric data such as a user's heart rate, saturated oxygen level, temperature, sweat level, neuromuscular-signal sensors, or a combination thereof. The sensors 2513 can also sense data about a user's environment, including a user's motion, altitude, location, orientation, gait, acceleration, position, or a combination thereof. In some embodiments, the sensors 2513 are configured to track a position and/or motion of the wearable band 2510. The one or more sensors 2513 can include any of the sensors defined above and/or discussed below with respect to FIG. 25B.

The one or more sensors 2513 can be distributed on an inside and/or an outside surface of the wearable band 2510. In some embodiments, the one or more sensors 2513 are uniformly spaced along the wearable band 2510. Alternatively, in some embodiments, the one or more sensors 2513 are positioned at distinct points along the wearable band 2510. As shown in FIG. 25A, the one or more sensors 2513 can be the same or distinct. For example, in some embodiments, the one or more sensors 2513 can be shaped as a pill (e.g., sensor 2513a), an oval, a circle a square, an oblong (e.g., sensor 2513c), and/or any other shape that maintains contact with the user's skin (e.g., such that neuromuscular signal and/or other biometric data can be accurately measured at the user's skin). In some embodiments, the one or more sensors 2513 are aligned to form pairs of sensors (e.g., for sensing neuromuscular signals based on differential sensing within each respective sensor). For example, sensor 2513b is aligned with an adjacent sensor to form sensor pair 2514a, and sensor 2513d is aligned with an adjacent sensor to form sensor pair 2514b. In some embodiments, the wearable band 2510 does not have a sensor pair. Alternatively, in some embodiments, the wearable band 2510 has a predetermined number of sensor pairs (one pair of sensors, three pairs of sensors, four pairs of sensors, six pairs of sensors, or sixteen pairs of sensors).

The wearable band 2510 can include any suitable number of sensors 2513. In some embodiments, the amount and arrangements of sensors 2513 depend on the particular application for which the wearable band 2510 is used. For instance, a wearable band 2510 configured as an armband, wristband, or chest-band may include a plurality of sensors 2513 with a different number of sensors 2513 and different arrangement for each use case, such as medical use cases, compared to gaming or general day-to-day use cases.

In accordance with some embodiments, the wearable band 2510 further includes an electrical ground electrode and a shielding electrode. The electrical ground and shielding electrodes, like the sensors 2513, can be distributed on the inside surface of the wearable band 2510 such that they contact a portion of the user's skin. For example, the electrical ground and shielding electrodes can be at an inside surface of coupling mechanism 2516 or an inside surface of a wearable structure 2511. The electrical ground and shielding electrodes can be formed and/or use the same components as the sensors 2513. In some embodiments, the wearable band 2510 includes more than one electrical ground electrode and more than one shielding electrode.

The sensors 2513 can be formed as part of the wearable structure 2511 of the wearable band 2510. In some embodiments, the sensors 2513 are flush or substantially flush with the wearable structure 2511 such that they do not extend beyond the surface of the wearable structure 2511. While flush with the wearable structure 2511, the sensors 2513 are still configured to contact the user's skin (e.g., via a skin-contacting surface). Alternatively, in some embodiments, the sensors 2513 extend beyond the wearable structure 2511 a predetermined distance (e.g., 0.1 mm to 2 mm) to make contact and depress into the user's skin. In some embodiments, the sensors 2513 are coupled to an actuator (not shown) configured to adjust an extension height (e.g., a distance from the surface of the wearable structure 2511) of the sensors 2513 such that the sensors 2513 make contact and depress into the user's skin. In some embodiments, the actuators adjust the extension height between 0.01 mm to 1.2 mm. This allows the user to customize the positioning of the sensors 2513 to improve the overall comfort of the wearable band 2510 when worn while still allowing the sensors 2513 to contact the user's skin. In some embodiments, the sensors 2513 are indistinguishable from the wearable structure 2511 when worn by the user.

The wearable structure 2511 can be formed of an elastic material, elastomers, etc., configured to be stretched and fitted to be worn by the user. In some embodiments, the wearable structure 2511 is a textile or woven fabric. As described above, the sensors 2513 can be formed as part of a wearable structure 2511. For example, the sensors 2513 can be molded into the wearable structure 2511 or be integrated into a woven fabric (e.g., the sensors 2513 can be sewn into the fabric and mimic the pliability of fabric (e.g., the sensors 2513 can be constructed from a series of woven strands of fabric)).

The wearable structure 2511 can include flexible electronic connectors that interconnect the sensors 2513, the electronic circuitry, and/or other electronic components (described below in reference to FIG. 25B) that are enclosed in the wearable band 2510. In some embodiments, the flexible electronic connectors are configured to interconnect the sensors 2513, the electronic circuitry, and/or other electronic components of the wearable band 2510 with respective sensors and/or other electronic components of another electronic device (e.g., watch body 2520). The flexible electronic connectors are configured to move with the wearable structure 2511 such that the user adjustment to the wearable structure 2511 (e.g., resizing, pulling, or folding) does not stress or strain the electrical coupling of components of the wearable band 2510.

As described above, the wearable band 2510 is configured to be worn by a user. In particular, the wearable band 2510 can be shaped or otherwise manipulated to be worn by a user. For example, the wearable band 2510 can be shaped to have a substantially circular shape such that it can be configured to be worn on the user's lower arm or wrist. Alternatively, the wearable band 2510 can be shaped to be worn on another body part of the user, such as the user's upper arm (e.g., around a bicep), forearm, chest, legs, etc. The wearable band 2510 can include a retaining mechanism 2512 (e.g., a buckle or a hook and loop fastener) for securing the wearable band 2510 to the user's wrist or other body part. While the wearable band 2510 is worn by the user, the sensors 2513 sense data (referred to as sensor data) from the user's skin. In particular, the sensors 2513 of the wearable band 2510 obtain (e.g., sense and record) neuromuscular signals.

The sensed data (e.g., sensed neuromuscular signals) can be used to detect and/or determine the user's intention to perform certain motor actions. In particular, the sensors 2513 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 2505 of the wrist-wearable device 2500 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 2513 can be used to provide a user with an enhanced interaction with a physical object (e.g., devices communicatively coupled with the wearable band 2510) and/or a virtual object in an AR application generated by an AR system (e.g., user interface objects presented on the display 2505 or another computing device (e.g., a smartphone)).

In some embodiments, the wearable band 2510 includes one or more haptic devices 2546 (FIG. 25B; e.g., a vibratory haptic actuator) that are configured to provide haptic feedback (e.g., a cutaneous and/or kinesthetic sensation) to the user's skin. The sensors 2513 and/or the haptic devices 2546 can be configured to operate in conjunction with multiple applications including, without limitation, health monitoring, social media, games, and AR (e.g., the applications associated with AR).

The wearable band 2510 can also include a coupling mechanism 2516 (e.g., a cradle or a shape of the coupling mechanism can correspond to the shape of the watch body 2520 of the wrist-wearable device 2500) for detachably coupling a capsule (e.g., a computing unit) or watch body 2520 (via a coupling surface of the watch body 2520) to the wearable band 2510. In particular, the coupling mechanism 2516 can be configured to receive a coupling surface proximate to the bottom side of the watch body 2520 (e.g., a side opposite to a front side of the watch body 2520 where the display 2505 is located), such that a user can push the watch body 2520 downward into the coupling mechanism 2516 to attach the watch body 2520 to the coupling mechanism 2516. In some embodiments, the coupling mechanism 2516 can be configured to receive a top side of the watch body 2520 (e.g., a side proximate to the front side of the watch body 2520 where the display 2505 is located) that is pushed upward into the cradle, as opposed to being pushed downward into the coupling mechanism 2516. In some embodiments, the coupling mechanism 2516 is an integrated component of the wearable band 2510 such that the wearable band 2510 and the coupling mechanism 2516 are a single unitary structure. In some embodiments, the coupling mechanism 2516 is a type of frame or shell that allows the watch body 2520 coupling surface to be retained within or on the wearable band 2510 coupling mechanism 2516 (e.g., a cradle, a tracker band, a support base, or a clasp).

The coupling mechanism 2516 can allow for the watch body 2520 to be detachably coupled to the wearable band 2510 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 2520 to the wearable band 2510 and to decouple the watch body 2520 from the wearable band 2510. For example, a user can twist, slide, turn, push, pull, or rotate the watch body 2520 relative to the wearable band 2510, or a combination thereof, to attach the watch body 2520 to the wearable band 2510 and to detach the watch body 2520 from the wearable band 2510. Alternatively, as discussed below, in some embodiments, the watch body 2520 can be decoupled from the wearable band 2510 by actuation of the release mechanism 2529.

The wearable band 2510 can be coupled with a watch body 2520 to increase the functionality of the wearable band 2510 (e.g., converting the wearable band 2510 into a wristwearable device 2500, adding an additional computing unit and/or battery to increase computational resources and/or a battery life of the wearable band 2510, or adding additional sensors to improve sensed data). As described above, the wearable band 2510 (and the coupling mechanism 2516) is configured to operate independently (e.g., execute functions independently) from watch body 2520. For example, the coupling mechanism 2516 can include one or more sensors 2513 that contact a user's skin when the wearable band 2510 is worn by the user and provide sensor data for determining control commands.

A user can detach the watch body 2520 (or capsule) from the wearable band 2510 in order to reduce the encumbrance of the wrist-wearable device 2500 to the user. For embodiments in which the watch body 2520 is removable, the watch body 2520 can be referred to as a removable structure, such that in these embodiments the wrist-wearable device 2500 includes a wearable portion (e.g., the wearable band 2510) and a removable structure (the watch body 2520).

Turning to the watch body 2520, the watch body 2520 can have a substantially rectangular or circular shape. The watch body 2520 is configured to be worn by the user on their wrist or on another body part. More specifically, the watch body 2520 is sized to be easily carried by the user, attached on a portion of the user's clothing, and/or coupled to the wearable band 2510 (forming the wrist-wearable device 2500). As described above, the watch body 2520 can have a shape corresponding to the coupling mechanism 2516 of the wearable band 2510. In some embodiments, the watch body 2520 includes a single release mechanism 2529 or multiple release mechanisms (e.g., two release mechanisms 2529 positioned on opposing sides of the watch body 2520, such as spring-loaded buttons) for decoupling the watch body 2520 and the wearable band 2510. The release mechanism 2529 can include, without limitation, a button, a knob, a plunger, a handle, a lever, a fastener, a clasp, a dial, a latch, or a combination thereof.

A user can actuate the release mechanism 2529 by pushing, turning, lifting, depressing, shifting, or performing other actions on the release mechanism 2529. Actuation of the release mechanism 2529 can release (e.g., decouple) the watch body 2520 from the coupling mechanism 2516 of the wearable band 2510, allowing the user to use the watch body 2520 independently from wearable band 2510 and vice versa. For example, decoupling the watch body 2520 from the wearable band 2510 can allow the user to capture images using rear-facing camera 2525b. Although the coupling mechanism 2516 is shown positioned at a corner of watch body 2520, the release mechanism 2529 can be positioned anywhere on watch body 2520 that is convenient for the user to actuate. In addition, in some embodiments, the wearable band 2510 can also include a respective release mechanism for decoupling the watch body 2520 from the coupling mechanism 2516. In some embodiments, the release mechanism 2529 is optional and the watch body 2520 can be decoupled from the coupling mechanism 2516, as described above (e.g., via twisting or rotating).

The watch body 2520 can include one or more peripheral buttons 2523 and 2527 for performing various operations at the watch body 2520. For example, the peripheral buttons 2523 and 2527 can be used to turn on or wake (e.g., transition from a sleep state to an active state) the display 2505, unlock the watch body 2520, increase or decrease volume, increase or decrease brightness, interact with one or more applications, interact with one or more user interfaces. Additionally, or alternatively, in some embodiments, the display 2505 operates as a touch screen and allows the user to provide one or more inputs for interacting with the watch body 2520.

In some embodiments, the watch body 2520 includes one or more sensors 2521. The sensors 2521 of the watch body 2520 can be the same or distinct from the sensors 2513 of the wearable band 2510. The sensors 2521 of the watch body 2520 can be distributed on an inside and/or an outside surface of the watch body 2520. In some embodiments, the sensors 2521 are configured to contact a user's skin when the watch body 2520 is worn by the user. For example, the sensors 2521 can be placed on the bottom side of the watch body 2520 and the coupling mechanism 2516 can be a cradle with an opening that allows the bottom side of the watch body 2520 to directly contact the user's skin. Alternatively, in some embodiments, the watch body 2520 does not include sensors that are configured to contact the user's skin (e.g., including sensors internal and/or external to the watch body 2520 that are configured to sense data of the watch body 2520 and the watch body 2520's surrounding environment). In some embodiments, the sensors 2513 are configured to track a position and/or motion of the watch body 2520.

The watch body 2520 and the wearable band 2510 can share data using a wired communication method (e.g., a Universal Asynchronous Receiver/Transmitter (UART) or a USB transceiver) and/or a wireless communication method (e.g., near-field communication or Bluetooth). For example, the watch body 2520 and the wearable band 2510 can share data sensed by the sensors 2513 and 2521, as well as application- and device-specific information (e.g., active and/or available applications), output devices (e.g., display or speakers), and/or input devices (e.g., touch screens, microphones, or imaging sensors).

In some embodiments, the watch body 2520 can include, without limitation, a front-facing camera 2525a and/or a rear-facing camera 2525b, sensors 2521 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 25B; imaging sensor 2563), a touch sensor, a sweat sensor). In some embodiments, the watch body 2520 can include one or more haptic devices 2576 (FIG. 25B; a vibratory haptic actuator) that is configured to provide haptic feedback (e.g., a cutaneous and/or kinesthetic sensation) to the user. The sensors 2521 and/or the haptic device 2576 can also be configured to operate in conjunction with multiple applications, including, without limitation, health-monitoring applications, social media applications, game applications, and AR applications (e.g., the applications associated with AR).

As described above, the watch body 2520 and the wearable band 2510, when coupled, can form the wrist-wearable device 2500. When coupled, the watch body 2520 and wearable band 2510 operate as a single device to execute functions (e.g., operations, detections, or communications) described herein. In some embodiments, each device is provided with particular instructions for performing the one or more operations of the wrist-wearable device 2500. For example, in accordance with a determination that the watch body 2520 does not include neuromuscular-signal sensors, the wearable band 2510 can include alternative instructions for performing associated instructions (e.g., providing sensed neuromuscular-signal data to the watch body 2520 via a different electronic device). Operations of the wrist-wearable device 2500 can be performed by the watch body 2520 alone or in conjunction with the wearable band 2510 (e.g., via respective processors and/or hardware components) and vice versa. In some embodiments, operations of the wrist-wearable device 2500, the watch body 2520, and/or the wearable band 2510 can be performed in conjunction with one or more processors and/or hardware components of another communicatively coupled device (e.g., FIGS. 27A-27B; the HIPD 2700).

As described below with reference to the block diagram of FIG. 25B, the wearable band 2510 and/or the watch body 2520 can each include independent resources required to independently execute functions. For example, the wearable band 2510 and/or the watch body 2520 can each include a power source (e.g., a battery), a memory, data storage, a processor (e.g., a CPU), communications, a light source, and/or input/output devices.

FIG. 25B shows block diagrams of a computing system 2530 corresponding to the wearable band 2510 and a computing system 2560 corresponding to the watch body 2520, according to some embodiments. A computing system of the wrist-wearable device 2500 includes a combination of components of the wearable band computing system 2530 and the watch body computing system 2560, in accordance with some embodiments.

The watch body 2520 and/or the wearable band 2510 can include one or more components shown in watch body computing system 2560. In some embodiments, a single integrated circuit includes all or a substantial portion of the components of the watch body computing system 2560 that are included in a single integrated circuit. Alternatively, in some embodiments, components of the watch body computing system 2560 are included in a plurality of integrated circuits that are communicatively coupled. In some embodiments, the watch body computing system 2560 is configured to couple (e.g., via a wired or wireless connection) with the wearable band computing system 2530, which allows the computing systems to share components, distribute tasks, and/or perform other operations described herein (individually or as a single device).

The watch body computing system 2560 can include one or more processors 2579, a controller 2577, a peripherals interface 2561, a power system 2595, and memory (e.g., a memory 2580), each of which are defined above and described in more detail below.

The power system 2595 can include a charger input 2596, a power-management integrated circuit (PMIC) 2597, and a battery 2598, each of which are defined above. In some embodiments, a watch body 2520 and a wearable band 2510 can have respective charger inputs (e.g., charger inputs 2596 and 2557), respective batteries (e.g., batteries 2598 and 2559), and can share power with each other (e.g., the watch body 2520 can power and/or charge the wearable band 2510 and vice versa). Although watch body 2520 and/or the wearable band 2510 can include respective charger inputs, a single charger input can charge both devices when coupled. The watch body 2520 and the wearable band 2510 can receive a charge using a variety of techniques. In some embodiments, the watch body 2520 and the wearable band 2510 can use a wired charging assembly (e.g., power cords) to receive the charge. Alternatively, or in addition, the watch body 2520 and/or the wearable band 2510 can be configured for wireless charging. For example, a portable charging device can be designed to mate with a portion of watch body 2520 and/or wearable band 2510 and wirelessly deliver usable power to a battery of watch body 2520 and/or wearable band 2510. The watch body 2520 and the wearable band 2510 can have independent power systems (e.g., power system 2595 and 2556) to enable each to operate independently. The watch body 2520 and wearable band 2510 can also share power (e.g., one can charge the other) via respective PMICs (e.g., PMICs 2597 and 2558) that can share power over power and ground conductors and/or over wireless charging antennas.

In some embodiments, the peripherals interface 2561 can include one or more sensors 2521, many of which listed below are defined above. The sensors 2521 can include one or more coupling sensors 2562 for detecting when the watch body 2520 is coupled with another electronic device (e.g., a wearable band 2510). The sensors 2521 can include imaging sensors 2563 (one or more of the cameras 2525 and/or separate imaging sensors 2563 (e.g., thermal-imaging sensors)). In some embodiments, the sensors 2521 include one or more SpO2 sensors 2564. In some embodiments, the sensors 2521 include one or more biopotential-signal sensors (e.g., EMG sensors 2565, which may be disposed on a user-facing portion of the watch body 2520 and/or the wearable band 2510). In some embodiments, the sensors 2521 include one or more capacitive sensors 2566. In some embodiments, the sensors 2521 include one or more heart rate sensors 2567. In some embodiments, the sensors 2521 include one or more IMUs 2568. In some embodiments, one or more IMUs 2568 can be configured to detect movement of a user's hand or other location that the watch body 2520 is placed or held.

In some embodiments, the peripherals interface 2561 includes an NFC component 2569, a GPS component 2570, a long-term evolution (LTE) component 2571, and/or a Wi-Fi and/or Bluetooth communication component 2572. In some embodiments, the peripherals interface 2561 includes one or more buttons 2573 (e.g., the peripheral buttons 2523 and 2527 in FIG. 25A), which, when selected by a user, cause operations to be performed at the watch body 2520. In some embodiments, the peripherals interface 2561 includes one or more indicators, such as a light-emitting diode (LED), to provide a user with visual indicators (e.g., message received, low battery, an active microphone, and/or a camera).

The watch body 2520 can include at least one display 2505 for displaying visual representations of information or data to the user, including user-interface elements and/or three-dimensional (3D) virtual objects. The display can also include a touch screen for inputting user inputs, such as touch gestures, swipe gestures, and the like. The watch body 2520 can include at least one speaker 2574 and at least one microphone 2575 for providing audio signals to the user and receiving audio input from the user. The user can provide user inputs through the microphone 2575 and can also receive audio output from the speaker 2574 as part of a haptic event provided by the haptic controller 2578. The watch body 2520 can include at least one camera 2525, including a front-facing camera 2525a and a rear-facing camera 2525b. The cameras 2525 can include ultra-wide-angle cameras, wide-angle cameras, fish-eye cameras, spherical cameras, telephoto cameras, depth-sensing cameras, or other types of cameras.

The watch body computing system 2560 can include one or more haptic controllers 2578 and associated componentry (e.g., haptic devices 2576) for providing haptic events at the watch body 2520 (e.g., a vibrating sensation or audio output in response to an event at the watch body 2520). The haptic controllers 2578 can communicate with one or more haptic devices 2576, such as electroacoustic devices, including a speaker of the one or more speakers 2574 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 2578 can provide haptic events to respective haptic actuators that are capable of being sensed by a user of the watch body 2520. In some embodiments, the one or more haptic controllers 2578 can receive input signals from an application of the applications 2582.

In some embodiments, the computer system 2530 and/or the computer system 2560 can include memory 2580, which can be controlled by a memory controller of the one or more controllers 2577 and/or one or more processors 2579. In some embodiments, software components stored in the memory 2580 include one or more applications 2582 configured to perform operations at the watch body 2520. In some embodiments, the one or more applications 2582 include games, word processors, messaging applications, calling applications, web browsers, social media applications, media streaming applications, financial applications, calendars, clocks, etc. In some embodiments, software components stored in the memory 2580 include one or more communication interface modules 2583 as defined above. In some embodiments, software components stored in the memory 2580 include one or more graphics modules 2584 for rendering, encoding, and/or decoding audio and/or visual data; and one or more data management modules 2585 for collecting, organizing, and/or providing access to the data 2587 stored in memory 2580. In some embodiments, software components stored in the memory 2580 include a biological motor unit (MU) detection module 2586A, which is configured to perform the features described above in reference to FIGS. 1A-23B. For example, the biological motor unit (MU) detection module 2586A is configured to identify and/or isolate biological motor units on the users body, as well as train a user in the activation of specific biological motor units. In some embodiments, one or more of applications 2582 and/or one or more modules can work in conjunction with one another to perform various tasks at the watch body 2520.

In some embodiments, software components stored in the memory 2580 can include one or more operating systems 2581 (e.g., a Linux-based operating system, an Android operating system, etc.). The memory 2580 can also include data 2587. The data 2587 can include profile data 2588A, sensor data 2589A, media content data 2590, application data 2591, and MU detection data 2592A, which stores data related to the performance of the features described above in reference to FIGS. 1A-23B. The MU detection data 2592A can also store one or more models and/or algorithms for detecting and/or isolating biological motor units, store historical biopotential sensor data, biopotential-based gestures, etc.

It should be appreciated that the watch body computing system 2560 is an example of a computing system within the watch body 2520, and that the watch body 2520 can have more or fewer components than shown in the watch body computing system 2560, combine two or more components, and/or have a different configuration and/or arrangement of the components. The various components shown in watch body computing system 2560 are implemented in hardware, software, firmware, or a combination thereof, including one or more signal processing and/or application-specific integrated circuits.

Turning to the wearable band computing system 2530, one or more components that can be included in the wearable band 2510 are shown. The wearable band computing system 2530 can include more or fewer components than shown in the watch body computing system 2560, combine two or more components, and/or have a different configuration and/or arrangement of some or all of the components. In some embodiments, all, or a substantial portion of the components of the wearable band computing system 2530 are included in a single integrated circuit. Alternatively, in some embodiments, components of the wearable band computing system 2530 are included in a plurality of integrated circuits that are communicatively coupled. As described above, in some embodiments, the wearable band computing system 2530 is configured to couple (e.g., via a wired or wireless connection) with the watch body computing system 2560, which allows the computing systems to share components, distribute tasks, and/or perform other operations described herein (individually or as a single device).

The wearable band computing system 2530, similar to the watch body computing system 2560, can include one or more processors 2549, one or more controllers 2547 (including one or more haptics controller 2548), a peripherals interface 2531 that can include one or more sensors 2513 and other peripheral devices, power source (e.g., a power system 2556), and memory (e.g., a memory 2550) that includes an operating system (e.g., an operating system 2551), data (e.g., data 2554 including profile data 2588B, sensor data 2589B, MU detection data 2592B, etc.), and one or more modules (e.g., a communications interface module 2552, a data management module 2553, a MU detection module 2586B, etc.).

The one or more sensors 2513 can be analogous to sensors 2521 of the computer system 2560 in light of the definitions above. For example, sensors 2513 can include one or more coupling sensors 2532, one or more SpO2 sensors 2534, one or more EMG sensors 2535, one or more capacitive sensors 2536, one or more heart rate sensors 2537, and one or more IMU sensors 2538.

The peripherals interface 2531 can also include other components analogous to those included in the peripheral interface 2561 of the computer system 2560, including an NFC component 2539, a GPS component 2540, an LTE component 2541, a Wi-Fi and/or Bluetooth communication component 2542, and/or one or more haptic devices 2576 as described above in reference to peripherals interface 2561. In some embodiments, the peripherals interface 2531 includes one or more buttons 2543, a display 2533, a speaker 2544, a microphone 2545, and a camera 2555. In some embodiments, the peripherals interface 2531 includes one or more indicators, such as an LED.

It should be appreciated that the wearable band computing system 2530 is an example of a computing system within the wearable band 2510, and that the wearable band 2510 can have more or fewer components than shown in the wearable band computing system 2530, combine two or more components, and/or have a different configuration and/or arrangement of the components. The various components shown in wearable band computing system 2530 can be implemented in one or a combination of hardware, software, and firmware, including one or more signal processing and/or application-specific integrated circuits.

The wrist-wearable device 2500 with respect to FIG. 25A is an example of the wearable band 2510 and the watch body 2520 coupled, so the wrist-wearable device 2500 will be understood to include the components shown and described for the wearable band computing system 2530 and the watch body computing system 2560. In some embodiments, wrist-wearable device 2500 has a split architecture (e.g., a split mechanical architecture or a split electrical architecture) between the watch body 2520 and the wearable band 2510.

In other words, all of the components shown in the wearable band computing system 2530 and the watch body computing system 2560 can be housed or otherwise disposed in a combined watch device 2500, or within individual components of the watch body 2520, wearable band 2510, and/or portions thereof (e.g., a coupling mechanism 2516 of the wearable band 2510).

The techniques described above can be used with any device for sensing neuromuscular signals, including the arm-wearable devices of FIG. 25A-25B, but could also be used with other types of wearable devices for sensing neuromuscular signals (such as body-wearable or head-wearable devices that might have neuromuscular sensors closer to the brain or spinal column).

In some embodiments, a wrist-wearable device 2500 can be used in conjunction with a head-wearable device described below (e.g., AR device 2600 and VR device 2610) and/or an HIPD 2700, and the wrist-wearable device 2500 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR device 2600 and VR device 2610.

Example Head-Wearable Devices

Figure 26A:
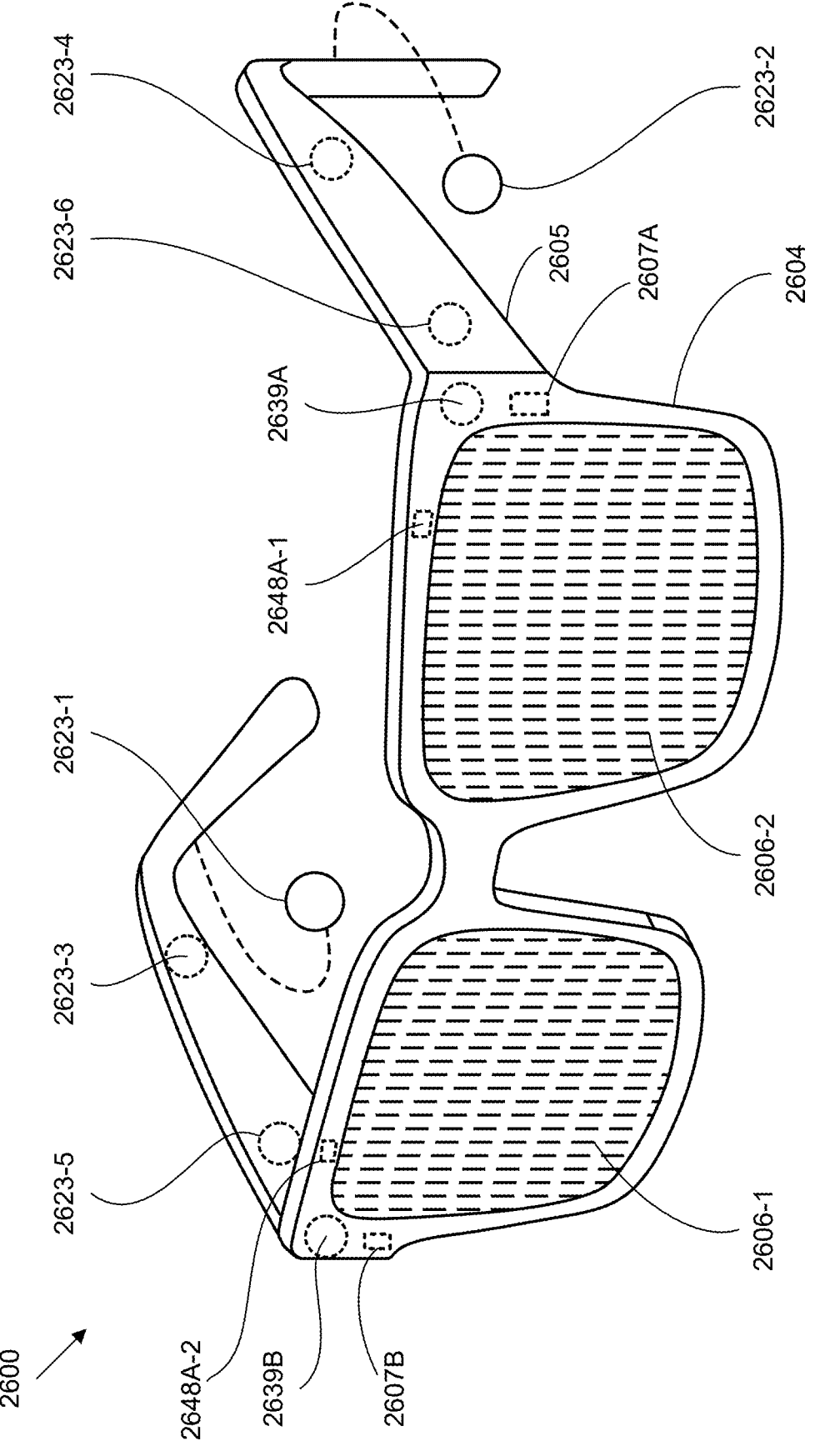
FIGS. 26A, 26B-1, 26B-2, and 26C illustrate example head-wearable devices, in accordance with some embodiments.
Figures 1, 26B:
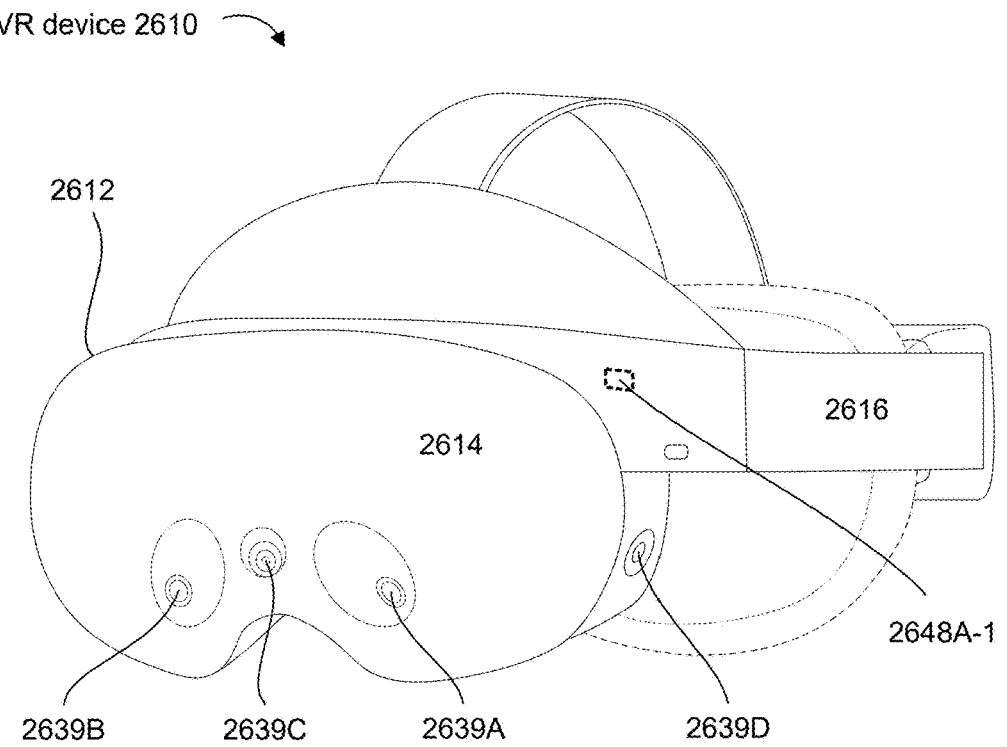
Figures 2, 26B:
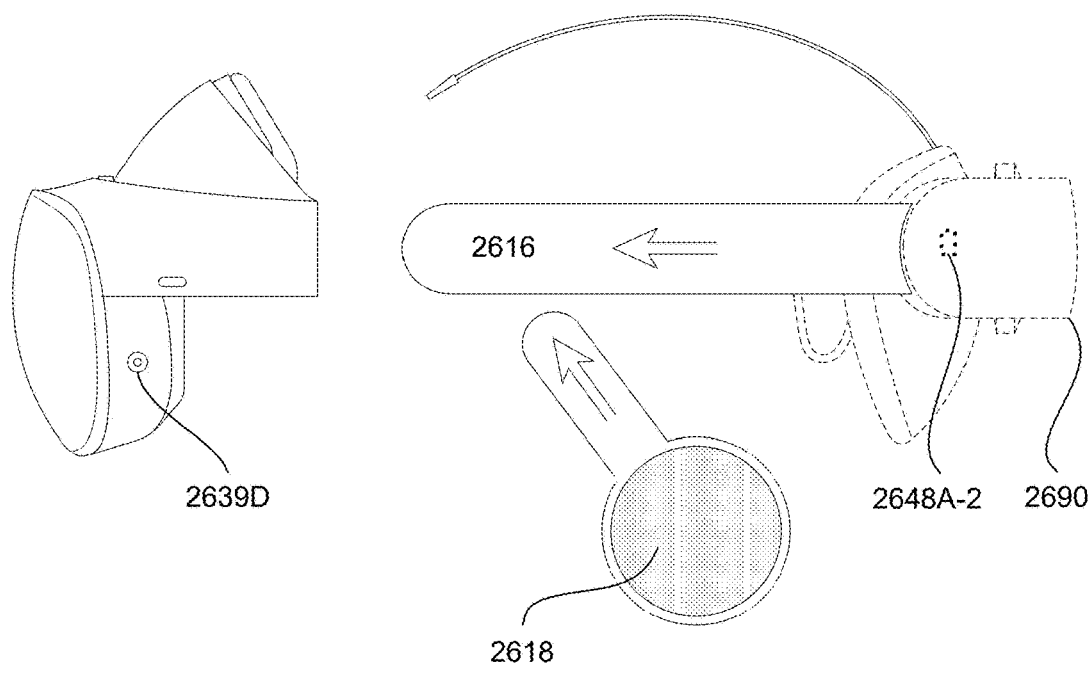
Figure 26C:
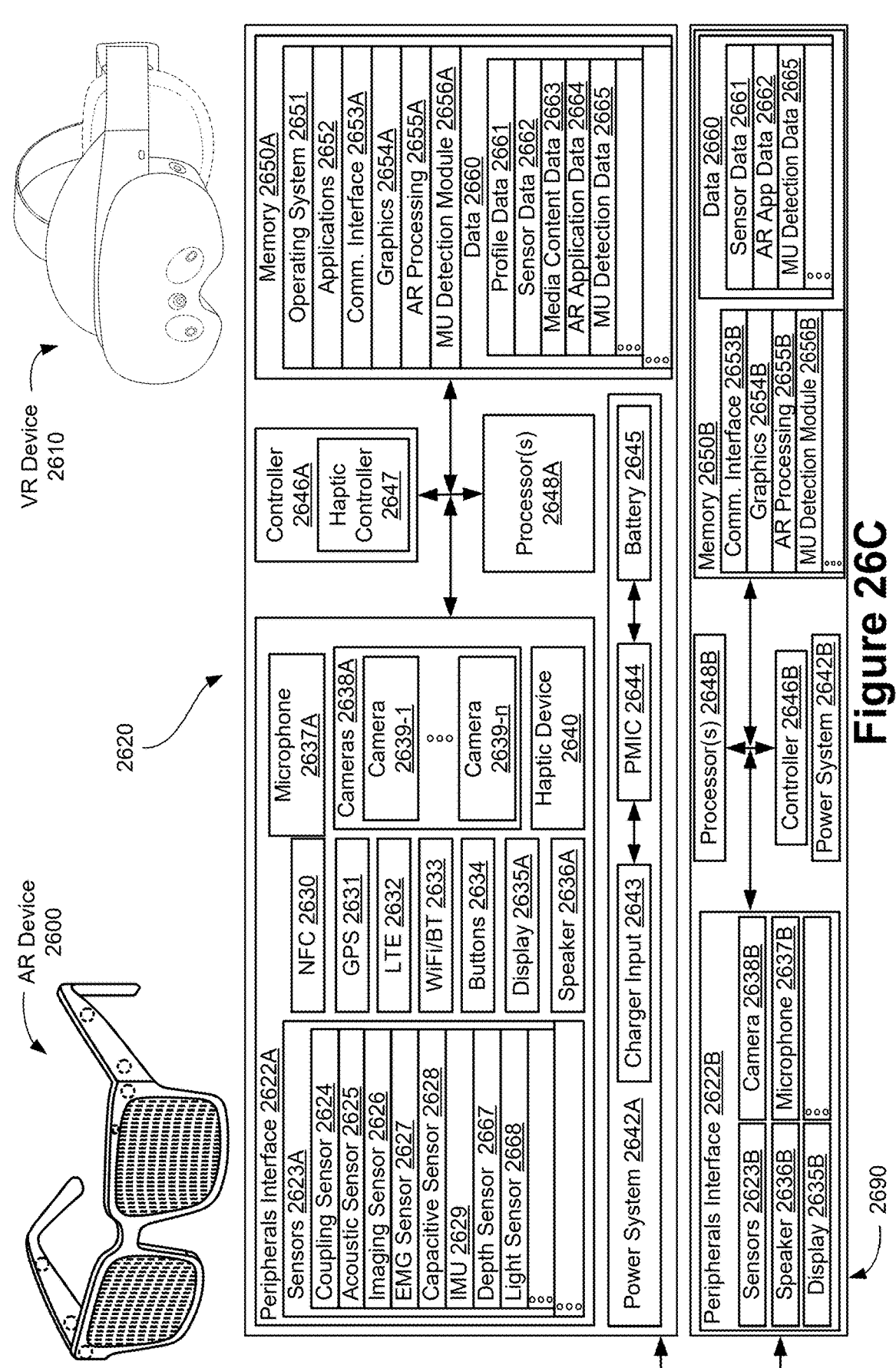

FIGS. 26A-26C show example head-wearable devices, in accordance with some embodiments. Head-wearable devices can include, but are not limited to, AR devices 2600 (e.g., AR or smart eyewear devices, such as smart glasses, smart monocles, smart contacts, etc.), VR devices 2610 (e.g., VR headsets or head-mounted displays (HMDs)), or other ocularly coupled devices. The AR devices 2600 and the VR devices 2610 are instances of the head-wearable devices 120 described in reference to FIGS. 1A-23B herein, such that the head-wearable device 120 should be understood to have the features of the AR devices 2600 and/or the VR devices 2610 and vice versa. The AR devices 2600 and the VR devices 2610 can perform various functions and/or operations associated with navigating through user interfaces and selectively opening applications, as well as the functions and/or operations described above with reference to FIGS. 1A-23B.

In some embodiments, an AR system (e.g., FIGS. 24A and 24B; AR systems 2400a-2400b) includes an AR device 2600 (as shown in FIG. 26A) and/or VR device 2610 (as shown in FIGS. 26B-1-B-2). In some embodiments, the AR device 2600 and the VR device 2610 can include one or more analogous components (e.g., components for presenting interactive AR environments, such as processors, memory, and/or presentation devices, including one or more displays and/or one or more waveguides), some of which are described in more detail with respect to FIG. 26C. The head-wearable devices can use display projectors (e.g., display projector assemblies 2607A and 2607B) and/or waveguides for projecting representations of data to a user. Some embodiments of head-wearable devices do not include displays.

FIG. 26A shows an example visual depiction of the AR device 2600 (e.g., which may also be described herein as augmented-reality glasses and/or smart glasses). The AR device 2600 can work in conjunction with additional electronic components that are not shown in FIGS. 26A, such as a wearable accessory device and/or an intermediary processing device, in electronic communication or otherwise configured to be used in conjunction with the AR device 2600. In some embodiments, the wearable accessory device and/or the intermediary processing device may be configured to couple with the AR device 2600 via a coupling mechanism in electronic communication with a coupling sensor 2624, where the coupling sensor 2624 can detect when an electronic device becomes physically or electronically coupled with the AR device 2600. In some embodiments, the AR device 2600 can be configured to couple to a housing (e.g., a portion of frame 2604 or temple arms 2605), which may include one or more additional coupling mechanisms configured to couple with additional accessory devices. The components shown in FIG. 26A can be implemented in hardware, software, firmware, or a combination thereof, including one or more signal-processing components and/or application-specific integrated circuits (ASICs).

The AR device 2600 includes mechanical glasses components, including a frame 2604 configured to hold one or more lenses (e.g., one or both lenses 2606-1 and 2606-2). One of ordinary skill in the art will appreciate that the AR device 2600 can include additional mechanical components, such as hinges configured to allow portions of the frame 2604 of the AR device 2600 to be folded and unfolded, a bridge configured to span the gap between the lenses 2606-1 and 2606-2 and rest on the user's nose, nose pads configured to rest on the bridge of the nose and provide support for the AR device 2600, earpieces configured to rest on the user's ears and provide additional support for the AR device 2600, temple arms 2605 configured to extend from the hinges to the earpieces of the AR device 2600, and the like. One of ordinary skill in the art will further appreciate that some examples of the AR device 2600 can include none of the mechanical components described herein. For example, smart contact lenses configured to present AR to users may not include any components of the AR device 2600.

The lenses 2606-1 and 2606-2 can be individual displays or display devices (e.g., a waveguide for projected representations). The lenses 2606-1 and 2606-2 may act together or independently to present an image or series of images to a user. In some embodiments, the lenses 2606-1 and 2606-2 can operate in conjunction with one or more display projector assemblies 2607A and 2607B to present image data to a user. While the AR device 2600 includes two displays, embodiments of this disclosure may be implemented in AR devices with a single near-eye display (NED) or more than two NEDs.

The AR device 2600 includes electronic components, many of which will be described in more detail below with respect to FIG. 26C. Some example electronic components are illustrated in FIG. 26A, including sensors 2623-1, 2623-2, 2623-3, 2623-4, 2623-5, and 2623-6, which can be distributed along a substantial portion of the frame 2604 of the AR device 2600. The different types of sensors are described below in reference to FIG. 26C. The AR device 2600 also includes a left camera 2639A and a right camera 2639B, which are located on different sides of the frame 2604. And the eyewear device includes one or more processors 2648A and 2648B (e.g., an integral microprocessor, such as an ASIC) that is embedded into a portion of the frame 2604.

FIGS. 26B-1 and 26B-2 show an example visual depiction of the VR device 2610 (e.g., a head-mounted display (HMD) 2612, also referred to herein as an AR headset, a head-wearable device, or a VR headset). The HMD 2612 includes a front body 2614 and a frame 2616 (e.g., a strap or band) shaped to fit around a user's head. In some embodiments, the front body 2614 and/or the frame 2616 includes one or more electronic elements for facilitating presentation of and/or interactions with an AR and/or VR system (e.g., displays, processors (e.g., processor 2648A-1), IMUs, tracking emitters or detectors, or sensors). In some embodiments, the HMD 2612 includes output audio transducers (e.g., an audio transducer 2618-1), as shown in FIG. 26B-2. In some embodiments, one or more components, such as the output audio transducer(s) 2618 and the frame 2616, can be configured to attach and detach (e.g., are detachably attachable) to the HMD 2612 (e.g., a portion or all of the frame 2616 and/or the output audio transducer 2618), as shown in FIG. 26B-2. In some embodiments, coupling a detachable component to the HMD 2612 causes the detachable component to come into electronic communication with the HMD 2612. The VR device 2610 includes electronic components, many of which will be described in more detail below with respect to FIG. 26C.

FIGS. 26B-1 and 26B-2 also show that the VR device 2610 having one or more cameras, such as the left camera 2639A and the right camera 2639B, which can be analogous to the left and right cameras on the frame 2604 of the AR device 2600. In some embodiments, the VR device 2610 includes one or more additional cameras (e.g., cameras 2639C and 2639D), which can be configured to augment image data obtained by the cameras 2639A and 2639B by providing more information. For example, the camera 2639C can be used to supply color information that is not discerned by cameras 2639A and 2639B. In some embodiments, one or more of the cameras 2639A to 2639D can include an optional IR (infrared) cut filter configured to remove IR light from being received at the respective camera sensors.

The VR device 2610 can include a housing 2690 storing one or more components of the VR device 2610 and/or additional components of the VR device 2610. The housing 2690 can be a modular electronic device configured to couple with the VR device 2610 (or an AR device 2600) and supplement and/or extend the capabilities of the VR device 2610 (or an AR device 2600). For example, the housing 2690 can include additional sensors, cameras, power sources, and processors (e.g., processor 2648A-2). to improve and/or increase the functionality of the VR device 2610. Examples of the different components included in the housing 2690 are described below in reference to FIG. 26C.

Alternatively, or in addition, in some embodiments, the head-wearable device, such as the VR device 2610 and/or the AR device 2600, includes, or is communicatively coupled to, another external device (e.g., a paired device), such as an HIPD 27 (discussed below in reference to FIGS. 27A-27B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 2700, an optional neckband, and/or a wearable accessory device)

with the head-wearable devices (e.g., an AR device 2600 and/or a VR device 2610) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 2700) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 2700, can process information generated by one or more of its sensors and/or information provided by other communicatively coupled devices. For example, a head-wearable device can include an IMU, and the intermediary processing device (a neckband and/or an HIPD 2700) can compute all inertial and spatial calculations from the IMUs located on the head-wearable device. Additional examples of processing performed by a communicatively coupled device, such as the HIPD 2700, are provided below in reference to FIGS. 27A and 27B.

AR systems may include a variety of types of visual feedback mechanisms. For example, display devices in the AR devices 2600 and/or the VR devices 2610 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 2600 and/or the VR device 2610 may include microLED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 2600 and the VR device 2610, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 2600 and/or the VR device 2610 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wristwearable devices that may be incorporated into headwear, gloves, body suits, handheld controllers, environmental devices (e.g., chairs or floormats), and/or any other type of device or system, such as a wrist-wearable device 2500, an HIPD 2700, smart textile-based garment [&&] 00), and/or other devices described herein.

FIG. 26C illustrates a computing system 2620 and an optional housing 2690, each of which shows components that can be included in a head-wearable device (e.g., the AR device 2600 and/or the VR device 2610). In some embodiments, more or fewer components can be included in the optional housing 2690 depending on practical restraints of the respective head-wearable device being described. Additionally or alternatively, the optional housing 2690 can include additional components to expand and/or augment the functionality of a head-wearable device.

In some embodiments, the computing system 2620 and/or the optional housing 2690 can include one or more peripheral interfaces 2622A and 2622B, one or more power systems 2642A and 2642B (including charger input 2643, PMIC 2644, and battery 2645), one or more controllers 2646A and 2646B (including one or more haptic controllers 2647), one or more processors 2648A and 2648B (as defined above, including any of the examples provided), and memory 2650A and 2650B, which can all be in electronic communication with each other. For example, the one or more processors 2648A and/or 2648B can be configured to execute instructions stored in the memory 2650A and/or 2650B, which can cause a controller of the one or more controllers 2646A and/or 2646B to cause operations to be performed at one or more peripheral devices of the peripherals interfaces 2622A and/or 2622B. In some embodiments, each operation described can occur based on electrical power provided by the power system 2642A and/or 2642B.

In some embodiments, the peripherals interface 2622A can include one or more devices configured to be part of the computing system 2620, many of which have been defined above and/or described with respect to wrist-wearable devices shown in FIGS. 25A and 25B. For example, the peripherals interface can include one or more sensors 2623A. Some example sensors include one or more coupling sensors 2624, one or more acoustic sensors 2625, one or more imaging sensors 2626, one or more EMG sensors 2627, one or more capacitive sensors 2628, and/or one or more IMUs 2629. In some embodiments, the sensors 2623A further include depth sensors 2667, light sensors 2668, and/or any other types of sensors defined above or described with respect to any other embodiments discussed herein.

In some embodiments, the peripherals interface can include one or more additional peripheral devices, including one or more NFC devices 2630, one or more GPS devices 2631, one or more LTE devices 2632, one or more Wi-Fi and/or Bluetooth devices 2633, one or more buttons 2634 (e.g., including buttons that are slidable or otherwise adjustable), one or more displays 2635A, one or more speakers 2636A, one or more microphones 2637A, one or more cameras 2638A (e.g., including the first camera 2639-1 through nth camera 2639-n, which are analogous to the left camera 2639A and/or the right camera 2639B), one or more haptic devices 2640, and/or any other types of peripheral devices defined above or described with respect to any other embodiments discussed herein.

The head-wearable devices can include a variety of types of visual feedback mechanisms (e.g., presentation devices). For example, display devices in the AR device 2600 and/or the VR device 2610 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 2635A can be coupled to each of the lenses 2606-1 and 2606-2 of the AR device 2600. The displays 2635A coupled to each of the lenses 2606-1 and 2606-2 can act together or independently to present an image or series of images to a user. In some embodiments, the AR device 2600 and/or the VR device 2610 includes a single display 2635A (e.g., a near-eye display) or more than two displays 2635A.

In some embodiments, a first set of one or more displays 2635A can be used to present an augmented-reality environment, and a second set of one or more display devices 2635A can be used to present a VR environment. In some embodiments, one or more waveguides are used in conjunction with presenting AR content to the user of the AR device 2600 and/or the VR device 2610 (e.g., as a means of delivering light from a display projector assembly and/or one or more displays 2635A to the user's eyes). In some embodiments, one or more waveguides are fully or partially integrated into the AR device 2600 and/or the VR device 2610. Additionally, or alternatively, to display screens, some AR systems include one or more projection systems. For example, display devices in the AR device 2600 and/or the VR device 2610 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 2635A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 2635A for presenting information to users. For example, an external display 2635A can be used to show a current battery level, network activity (e.g., connected, disconnected), current activity (e.g., playing a game, in a call, in a meeting, or watching a movie), and/or other relevant information. In some embodiments, the external displays 2635A can be used to communicate with others. For example, a user of the head-wearable device can cause the external displays 2635A to present a "do not disturb" notification. The external displays 2635A can also be used by the user to share any information captured by the one or more components of the peripherals interface 2622A and/or generated by the head-wearable device (e.g., during operation and/or performance of one or more applications).

The memory 2650A can include instructions and/or data executable by one or more processors 2648A (and/or processors 2648B of the housing 2690) and/or a memory controller of the one or more controllers 2646A (and/or controller 2646B of the housing 2690). The memory 2650A can include one or more operating systems 2651, one or more applications 2652, one or more communication interface modules 2653A, one or more graphics modules 2654A, one or more AR processing modules 2655A, MU detection module 2656 (analogous to MU detection module 2586; FIG. 25C) for performing the features described above in reference to FIGS. 1A-23B, and/or any other types of modules or components defined above or described with respect to any other embodiments discussed herein.

The data 2660 stored in memory 2650A can be used in conjunction with one or more of the applications and/or programs discussed above. The data 2660 can include profile data 2661, sensor data 2662, media content data 2663, AR application data 2664, MU detection data 2665 (analogous to MU detection data 2592; FIG. 25C) for storing data related to the performance of the features described above in reference to FIGS. 1A-23B; and/or any other types of data defined above or described with respect to any other embodiments discussed herein.

In some embodiments, the controller 2646A of the head-wearable devices processes information generated by the sensors 2623A on the head-wearable devices and/or another component of the head-wearable devices and/or communicatively coupled with the head-wearable devices (e.g., components of the housing 2690, such as components of peripherals interface 2622B). For example, the controller 2646A can process information from the acoustic sensors 2625 and/or image sensors 2626. For each detected sound, the controller 2646A can perform a direction of arrival (DOA) estimation to estimate a direction from which the detected sound arrived at a head-wearable device. As one or more of the acoustic sensors 2625 detect sounds, the controller 2646A can populate an audio data set with the information (e.g., represented by sensor data 2662).

In some embodiments, a physical electronic connector can convey information between the head-wearable devices and another electronic device, and/or between one or more processors 2648A of the head-wearable devices and the controller 2646A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 2700) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 2600 and/or the VR device 2610 can include one or more optical sensors such as two-dimensional (2D) or three-dimensional (3D) cameras, ToF depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 26B-1 and 26B-2 show the VR device 2610 having cameras 2639A-2639D, which can be used to provide depth information for creating a voxel field and a 2D mesh to provide object information to the user to avoid collisions.

The optional housing 2690 can include analogous components to those describe above with respect to the computing system 2620. For example, the optional housing 2690 can include a respective peripherals interface 2622B, including more or fewer components to those described above with respect to the peripherals interface 2622A. As described above, the components of the optional housing 2690 can be used to augment and/or expand on the functionality of the head-wearable devices. For example, the optional housing 2690 can include respective sensors 2623B, speakers 2636B, displays 2635B, microphones 2637B, cameras 2638B, and/or other components to capture and/or present data. Similarly, the optional housing 2690 can include one or more processors 2648B, controllers 2646B, and/or memory 2650B (including respective communication interface modules 2653B, one or more graphics modules 2654B, one or more AR processing modules 2655B, an MU detection modules 2656B, MU detection data 2665, etc.) that can be used individually and/or in conjunction with the components of the computing system 2620.

The techniques described above in FIGS. 26A-26C can be used with different head-wearable devices. In some embodiments, the head-wearable devices (e.g., the AR device 2600 and/or the VR device 2610) can be used in conjunction with one or more wearable devices such as a wrist-wearable device 2500 (or components thereof). Having thus described example the head-wearable devices, attention will now be turned to example handheld intermediary processing devices, such as HIPD 2700.

Example Handheld Intermediary Processing Devices

Figure 27B:
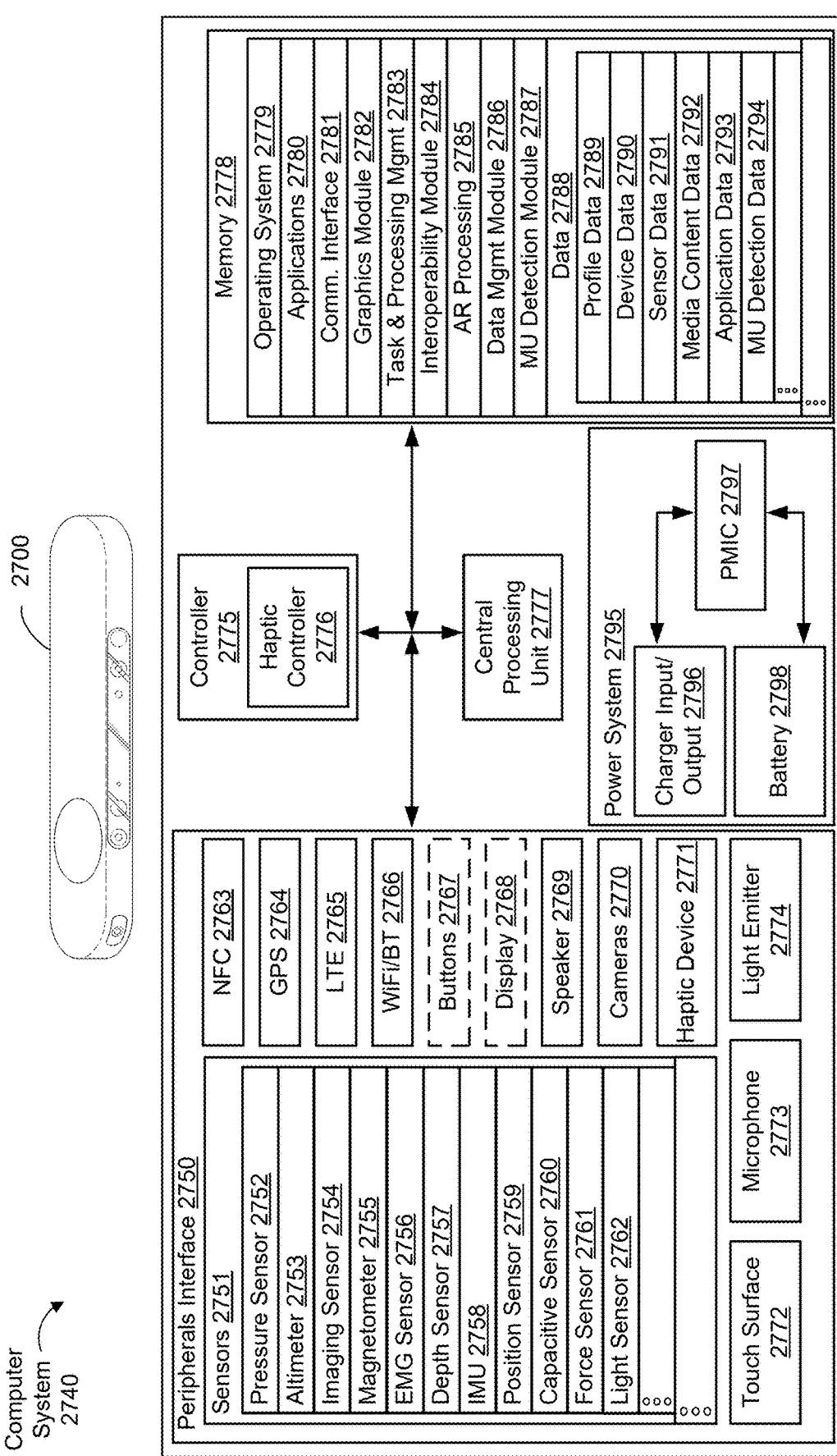

FIGS. 27A and 27B illustrate an example handheld intermediary processing device (HIPD) 2700, in accordance with some embodiments. The HIPD 2700 is an instance of the intermediary device referenced in FIGS. 1A-23B herein, such that the HIPD 2700 should be understood to have the features described with respect to any intermediary device defined above or otherwise described herein, and vice versa. The HIPD 2700 can perform various functions and/or operations associated with navigating through user interfaces and selectively opening applications, as well as the functions and/or operations described above with reference to FIGS. 1A-23B.

FIG. 27A shows a top view 2705 and a side view 2725 of the HIPD 2700. The HIPD 2700 is configured to communicatively couple with one or more wearable devices (or other electronic devices) associated with a user. For example, the HIPD 2700 is configured to communicatively couple with a user's wrist-wearable device 2500 (or components thereof, such as the watch body 2520 and the wearable band 2510), AR device 2600, and/or VR device 2610. The HIPD 2700 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 2700 can successfully be communicatively coupled with an electronic device, such as a wearable device).

The HIPD 2700 can perform various functions independently and/or in conjunction with one or more wearable devices (e.g., wrist-wearable device 2500, AR device 2600, and/or VR device 2610). The HIPD 2700 is configured to increase and/or improve the functionality of communicatively coupled devices, such as the wearable devices. The HIPD 2700 is configured to perform one or more functions or operations associated with interacting with user interfaces and applications of communicatively coupled devices, interacting with an AR environment, interacting with a VR environment, and/or operating as a human-machine interface controller, as well as functions and/or operations described above with reference to FIGS. 1A-23B. Additionally, as will be described in more detail below, functionality and/or operations of the HIPD 2700 can include, without limitation, task offloading and/or handoffs, thermals offloading and/or handoffs, 6 degrees of freedom (6DoF) raycasting and/or gaming (e.g., using imaging devices or cameras 2714A and 2714B, which can be used for simultaneous localization and mapping (SLAM), and/or with other image processing techniques), portable charging; messaging, image capturing via one or more imaging devices or cameras (e.g., cameras 2722A and 2722B), sensing user input (e.g., sensing a touch on a multitouch input surface 2702), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 2700 and/or in communication between the HIPD 2700 and another wearable device described herein. In some embodiments, functions can be executed on the HIPD 2700 in conjunction with an AR environment. As the skilled artisan will appreciate upon reading the descriptions provided herein, the novel HIPD 2700 described herein can be used with any type of suitable AR environment.

While the HIPD 2700 is communicatively coupled with a wearable device and/or other electronic device, the HIPD 2700 is configured to perform one or more operations initiated at the wearable device and/or the other electronic device. In particular, one or more operations of the wearable device and/or the other electronic device can be offloaded to the HIPD 2700 to be performed. The HIPD 2700 performs one or more operations of the wearable device and/or the other electronic device and provides data corresponding to the completed operations to the wearable device and/or the other electronic device. For example, a user can initiate a video stream using the AR device 2600 and back-end tasks associated with performing the video stream (e.g., video rendering) can be offloaded to the HIPD 2700, which the HIPD 2700 performs and provides corresponding data to the AR device 2600 to perform remaining front-end tasks associated with the video stream (e.g., presenting the rendered video data via a display of the AR device 2600). In this way, the HIPD 2700, which has more computational resources and greater thermal headroom than a wearable device can perform computationally intensive tasks for the wearable device, improving performance of an operation performed by the wearable device.

The HIPD 2700 includes a multi-touch input surface 2702 on a first side (e.g., a front surface) that is configured to detect one or more user inputs. In particular, the multi-touch input surface 2702 can detect single-tap inputs, multi-tap inputs, swipe gestures and/or inputs, force-based and/or pressure-based touch inputs, held taps, and the like. The multi-touch input surface 2702 is configured to detect capacitive touch inputs and/or force (and/or pressure) touch inputs. The multi-touch input surface 2702 includes a first touch-input surface 2704 defined by a surface depression, and a second touch-input surface 2706 defined by a substantially planar portion. The first touch-input surface 2704 can be disposed adjacent to the second touch-input surface 2706. In some embodiments, the first touch-input surface 2704 and the second touch-input surface 2706 can be different dimensions, shapes, and/or cover different portions of the multi-touch input surface 2702. For example, the first touch-input surface 2704 can be substantially circular and the second touch-input surface 2706 is substantially rectangular. In some embodiments, the surface depression of the multi-touch input surface 2702 is configured to guide user handling of the HIPD 2700. In particular, the surface depression is configured such that the user holds the HIPD 2700 upright when held in a single hand (e.g., such that the using imaging devices or cameras 2714A and 2714B are pointed toward a ceiling or the sky). Additionally, the surface depression is configured such that the user's thumb rests within the first touch-input surface 2704.

In some embodiments, the different touch-input surfaces include a plurality of touch-input zones. For example, the second touch-input surface 2706 includes at least a first touch-input zone 2708 within a second touch-input zone 2706 and a third touch-input zone 2710 within the first touch-input zone 2708. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 2708 causes the HIPD 2700 to perform a first command and a user input detected within the second touch-input zone 2706 causes the HIPD 2700 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 2708 can be configured to detect force touch inputs (e.g., a magnitude at which the user presses down) and capacitive touch inputs, and the second touch-input zone 2706 can be configured to detect capacitive touch inputs.

The HIPD 2700 includes one or more sensors 2751 for sensing data used in the performance of one or more operations and/or functions. For example, the HIPD 2700 can include an IMU that is used in conjunction with cameras 2714 for 3-dimensional object manipulation (e.g., enlarging, moving, destroying, etc. an object) in an AR or VR environment. Non-limiting examples of the sensors 2751 included in the HIPD 2700 include a light sensor, a magnetometer, a depth sensor, a pressure sensor, and a force sensor. Additional examples of the sensors 2751 are provided below in reference to FIG. 27B.

The HIPD 2700 can include one or more light indicators 2712 to provide one or more notifications to the user. In some embodiments, the light indicators are LEDs or other types of illumination devices. The light indicators 2712 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 2704. The light indicators can be illuminated in different colors and/or patterns to provide the user with one or more notifications and/or information about the device. For example, a light indicator positioned around the first touch-input surface 2704 can flash when the user receives a notification (e.g., a message), change red when the HIPD 2700 is out of power, operate as a progress bar (e.g., a light ring that is closed when a task is completed (e.g., 0% to 100%)), operates as a volume indicator, etc.).

In some embodiments, the HIPD 2700 includes one or more additional sensors on another surface. For example, as shown FIG. 27A, HIPD 2700 includes a set of one or more sensors (e.g., sensor set 2720) on an edge of the HIPD 2700.

The sensor set 2720, when positioned on an edge of the of the HIPD 2700, can be pe positioned at a predetermined tilt angle (e.g., 26 degrees), which allows the sensor set 2720 to be angled toward the user when placed on a desk or other flat surface. Alternatively, in some embodiments, the sensor set 2720 is positioned on a surface opposite the multi-touch input surface 2702 (e.g., a back surface). The one or more sensors of the sensor set 2720 are discussed in detail below.

The side view 2725 of the of the HIPD 2700 shows the sensor set 2720 and camera 2714B. The sensor set 2720 includes one or more cameras 2722A and 2722B, a depth projector 2724, an ambient light sensor 2728, and a depth receiver 2730. In some embodiments, the sensor set 2720 includes a light indicator 2726. The light indicator 2726 can operate as a privacy indicator to let the user and/or those around them know that a camera and/or microphone is active. The sensor set 2720 is configured to capture a user's facial expression such that the user can puppet a custom avatar (e.g., showing emotions, such as smiles, laughter, etc., on the avatar or a digital representation of the user). The sensor set 2720 can be configured as a side stereo red-green-blue (RGB) system, a rear indirect time-of-flight (iToF) system, or a rear stereo RGB system. As the skilled artisan will appreciate upon reading the descriptions provided herein, the novel HIPD 2700 described herein can use different sensor set 2720 configurations and/or sensor set 2720 placement.

In some embodiments, the HIPD 2700 includes one or more haptic devices 2771 (FIG. 27B; e.g., a vibratory haptic actuator) that are configured to provide haptic feedback (e.g., kinesthetic sensation). The sensors 2751, and/or the haptic devices 2771 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 2700 is configured to operate without a display. However, in optional embodiments, the HIPD 2700 can include a display 2768 (FIG. 27B). The HIPD 2700 can also income one or more optional peripheral buttons 2767 (FIG. 27B). For example, the peripheral buttons 2767 can be used to turn on or turn off the HIPD 2700. Further, the HIPD 2700 housing can be formed of polymers and/or elastomer elastomers. The HIPD 2700 can be configured to have a non-slip surface to allow the HIPD 2700 to be placed on a surface without requiring a user to watch over the HIPD 2700. In other words, the HIPD 2700 is designed such that it would not easily slide off a surfaces. In some embodiments, the HIPD 2700 include one or magnets to couple the HIPD 2700 to another surface. This allows the user to mount the HIPD 2700 to different surfaces and provide the user with greater flexibility in use of the HIPD 2700.

As described above, the HIPD 2700 can distribute and/or provide instructions for performing the one or more tasks at the HIPD 2700 and/or a communicatively coupled device. For example, the HIPD 2700 can identify one or more back-end tasks to be performed by the HIPD 2700 and one or more front-end tasks to be performed by a communicatively coupled device. While the HIPD 2700 is configured to offload and/or handoff tasks of a communicatively coupled device, the HIPD 2700 can perform both back-end and front-end tasks (e.g., via one or more processors, such as CPU 2777; FIG. 27B). The HIPD 2700 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 2700 can perform the above operations alone or in conjunction with a wearable device (or other communicatively coupled electronic device).

FIG. 27B shows block diagrams of a computing system 2740 of the HIPD 2700, in accordance with some embodiments. The HIPD 2700, described in detail above, can include one or more components shown in HIPD computing system 2740. The HIPD 2700 will be understood to include the components shown and described below for the HIPD computing system 2740. In some embodiments, all, or a substantial portion of the components of the HIPD computing system 2740 are included in a single integrated circuit. Alternatively, in some embodiments, components of the HIPD computing system 2740 are included in a plurality of integrated circuits that are communicatively coupled.

The HIPD computing system 2740 can include a processor (e.g., a CPU 2777, a GPU, and/or a CPU with integrated graphics), a controller 2775, a peripherals interface 2750 that includes one or more sensors 2751 and other peripheral devices, a power source (e.g., a power system 2795), and memory (e.g., a memory 2778) that includes an operating system (e.g., an operating system 2779), data (e.g., data 2788), one or more applications (e.g., applications 2780), and one or more modules (e.g., a communications interface module 2781, a graphics module 2782, a task and processing management module 2783, an interoperability module 2784, an AR processing module 2785, a data management module 2786, an MU detection module 2787, etc.). The HIPD computing system 2740 further includes a power system 2795 that includes a charger input and output 2796, a PMIC 2797, and a battery 2798, all of which are defined above.

In some embodiments, the peripherals interface 2750 can include one or more sensors 2751. The sensors 2751 can include analogous sensors to those described above in reference to FIG. 25B. For example, the sensors 2751 can include imaging sensors 2754, (optional) EMG sensors 2756, IMUs 2758, and capacitive sensors 2760. In some embodiments, the sensors 2751 can include one or more pressure sensor 2752 for sensing pressure data, an altimeter 2753 for sensing an altitude of the HIPD 2700, a magnetometer 2755 for sensing a magnetic field, a depth sensor 2757 (or a time-of flight sensor) for determining a difference between the camera and the subject of an image, a position sensor 2759 (e.g., a flexible position sensor) for sensing a relative displacement or position change of a portion of the HIPD 2700, a force sensor 2761 for sensing a force applied to a portion of the HIPD 2700, and a light sensor 2762 (e.g., an ambient light sensor) for detecting an amount of lighting. The sensors 2751 can include one or more sensors not shown in FIG. 27B.

Analogous to the peripherals described above in reference to FIGS. 25B, the peripherals interface 2750 can also include an NFC component 2763, a GPS component 2764, an LTE component 2765, a Wi-Fi and/or Bluetooth communication component 2766, a speaker 2769, a haptic device 2771, and a microphone 2773. As described above in reference to FIG. 27A, the HIPD 2700 can optionally include a display 2768 and/or one or more buttons 2767. The peripherals interface 2750 can further include one or more cameras 2770, touch surfaces 2772, and/or one or more light emitters 2774. The multi-touch input surface 2702 described above in reference to FIG. 27A is an example of touch surface 2772. The light emitters 2774 can be one or more LEDs, lasers, etc. and can be used to project or present information to a user. For example, the light emitters 2774 can include light indicators 2712 and 2726 described above in reference to FIG. 27A. The cameras 2770 (e.g., cameras 2714A, 2714B, and 2722 described above in FIG. 27A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 2770 can be used for SLAM; 6 DoF ray casting, gaming, object manipulation, and/or other rendering; facial recognition and facial expression recognition, etc.

Similar to the watch body computing system 2560 and the watch band computing system 2530 described above in reference to FIG. 25B, the HIPD computing system 2740 can include one or more haptic controllers 2776 and associated componentry (e.g., haptic devices 2771) for providing haptic events at the HIPD 2700.

Memory 2778 can include high-speed random-access memory and/or non-volatile memory, such as one or more magnetic disk storage devices, flash memory devices, or other non-volatile solid-state memory devices. Access to the memory 2778 by other components of the HIPD 2700, such as the one or more processors and the peripherals interface 2750, can be controlled by a memory controller of the controllers 2775.

In some embodiments, software components stored in the memory 2778 include one or more operating systems 2779, one or more applications 2780, one or more communication interface modules 2781, one or more graphics modules 2782, one or more data management modules 2786, which are analogous to the software components described above in reference to FIG. 25B. The software components stored in the memory 2778 can also include the MU detection module 2787 (analogous to MU detection module 2586; FIG. 25C), which is configured to perform the features described above in reference to FIGS. 1A-23B.

In some embodiments, software components stored in the memory 2778 include a task and processing management module 2783 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 2783 uses data 2788 (e.g., device data 2790) to distribute the one or more front-end and/or back-end tasks based on communicatively coupled devices' computing resources, available power, thermal headroom, ongoing operations, and/or other factors. For example, the task and processing management module 2783 can cause the performance of one or more back-end tasks (of an operation performed at communicatively coupled AR device 2600) at the HIPD 2700 in accordance with a determination that the operation is utilizing a predetermined amount (e.g., at least 70%) of computing resources available at the AR device 2600.

In some embodiments, software components stored in the memory 2778 include an interoperability module 2784 for exchanging and utilizing information received and/or provided to distinct communicatively coupled devices. The interoperability module 2784 allows for different systems, devices, and/or applications to connect and communicate in a coordinated way without user input. In some embodiments, software components stored in the memory 2778 include an AR module 2785 that is configured to process signals based at least on sensor data for use in an AR and/or VR environment. For example, the AR processing module 2785 can be used for 3D object manipulation, gesture recognition, facial and facial expression, recognition, etc.

The memory 2778 can also include data 2788, including structured data. In some embodiments, the data 2788 can include profile data 2789, device data 2789 (including device data of one or more devices communicatively coupled with the HIPD 2700, such as device type, hardware, software, configurations, etc.), sensor data 2791, media content data 2792, application data 2793, and MU detection data 2794 (analogous to MU detection data 2592; FIG. 25C), which stores data related to the performance of the features described above in reference to FIGS. 1A-23B.

It should be appreciated that the HIPD computing system 2740 is an example of a computing system within the HIPD 2700, and that the HIPD 2700 can have more or fewer components than shown in the HIPD computing system 2740, combine two or more components, and/or have a different configuration and/or arrangement of the components. The various components shown in HIPD computing system 2740 are implemented in hardware, software, firmware, or a combination thereof, including one or more signal processing and/or application-specific integrated circuits.

The techniques described above in FIG. 27A-27B can be used with any device used as a human-machine interface controller. In some embodiments, an HIPD 2700 can be used in conjunction with one or more wearable device such as a head-wearable device (e.g., AR device 2600 and VR device 2610) and/or a wrist-wearable device 2500 (or components thereof).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory, computer-readable storage medium including instructions that, when executed by a wearable device and/or an intermediary device in communication with the wearable device, cause performance of:

presenting, via a communicatively coupled display, i) first instructions for performing a first movement associated with activation of one or more biological motor units, and ii) graphical elements associated with the activation of the one or more biological motor units;

in response to detecting, by one or more biopotential sensors of a wearable device worn by a user, a first activation of the one or more biological motor units:

determining, based on first biopotential sensor data captured during performance of the first movement:

a second movement to be performed by the user, the second movement i) associated with the activation of the one or more biological motor units and ii) predicted to generate optimized biopotential sensor data during performance of the second movement that would satisfy a gesture mapping threshold; and a first change to the graphical elements, the first change indicating partial activation of the one or more biological motor units, and presenting, via the communicatively coupled display, i) second instructions for performing the second movement, and ii) the first change to the graphical elements; and in response to detecting, by the one or more biopotential sensors of the wearable device, a second activation of the one or more biological motor units:

in accordance with a determination that second biopotential sensor data captured during performance of the second movement satisfies the gesture mapping threshold:

associating the second biopotential sensor data with one or more biopotential-based gestures; and presenting, via the communicatively coupled display, a second change to the graphical elements, the second change indicating successful activation of the one or more biological motor units, and in accordance with a determination that the second biopotential sensor data captured during performance of the second movement does not satisfy the gesture mapping threshold:

determining, based on the second biopotential sensor data captured during performance of the second movement:

a third movement to be performed by the user, the third movement i) associated with the activation of the one or more biological motor units and ii)

predicted to generate further optimized biopotential sensor data during performance of the second movement that would satisfy the gesture mapping threshold, and a third change to the graphical elements, the third change indicating additional partial activation of the one or more biological motor units; and presenting, via the communicatively coupled display:

third instructions for performing the third movement, and the third change to the graphical elements.

2. The non-transitory, computer-readable storage medium of claim 1, wherein the graphical elements are first graphical elements and the instructions, when executed by the wearable device and/or the intermediary device in communication with the wearable device, further cause performance of:

presenting, via the communicatively coupled display, fourth instructions for performing a fourth movement associated with activation of a particular biological motor unit of the one or more biological motor units, and ii) second graphical elements associated with the activation of the particular biological motor unit;

in response to detecting, by the one or more biopotential sensors of the wearable device, a first activation of the particular biological motor unit:

determining, based on first isolated biopotential sensor data captured during performance of the fourth movement:

a fifth movement to be performed by the user, the fifth movement i) associated with the activation of the particular biological motor unit and ii) predicted to generate optimized isolated biopotential sensor data during performance of the fifth movement that would satisfy the gesture mapping threshold, and a first change to the second graphical elements, the first change indicating partial activation of the particular biological motor unit; and presenting, via the communicatively coupled display, i) fifth instructions for performing the fifth movement, and ii) the first change to the second graphical elements; and in response to detecting, by the one or more biopotential sensors of the wearable device, a second activation of the particular biological motor unit:

in accordance with a determination that second isolated biopotential sensor data captured during performance of the fifth movement satisfies the gesture mapping threshold:

associating the second isolated biopotential sensor data with one or more other biopotential-based gesture, and presenting a third change to the second graphical elements, the third change indicating successful activation of the particular biological motor unit.

3. The non-transitory, computer-readable storage medium of claim 2, wherein the instructions, when executed by the wearable device and/or the intermediary device in communication with the wearable device, further cause performance of:

in accordance with a determination that second isolated biopotential sensor data captured during performance of the fifth movement does not satisfy the gesture mapping threshold:

US 12,602,115 B2

63 64 determining, based on the second isolated biopotential sensor data captured during performance of the fifth movement:

a sixth movement to be performed by the user, the sixth movement i) associated with the activation of the particular biological motor unit and ii) predicted to generate further optimized isolated biopotential sensor data during performance of the sixth movement that would satisfy the gesture mapping threshold, and a fourth change to the second graphical elements, the fourth change indicating additional partial activation of the particular biological motor unit; and presenting, via the communicatively coupled display:

sixth instructions for performing the sixth movement, and the fourth change to the second graphical elements.

4. The non-transitory, computer-readable storage medium of claim 1, wherein the instructions, when executed by the wearable device and/or the intermediary device in communication with the wearable device, further cause performance of:

before determining whether the second biopotential sensor data captured during performance of the second movement satisfies the gesture mapping threshold:

obtaining, from the one or more biopotential sensors of the wearable device:

first candidate biopotential sensor data captured during performance of the second movement, the first candidate biopotential sensor data associated with a first set of biological motor units of the one or more biological motor units, and second candidate biopotential sensor data captured during performance of the second movement, the second candidate biopotential sensor data associated with a second set of biological motor units of the one or more biological motor units, selecting the first candidate biopotential sensor data or the second candidate biopotential sensor data as the second biopotential sensor data based on a comparison of the first candidate biopotential sensor data and the second candidate biopotential sensor data.

5. The non-transitory, computer-readable storage medium of claim 4, wherein the comparison of the first candidate biopotential sensor data and the second candidate biopotential sensor data includes determining respective candidate biopotential sensor data that satisfies an accuracy threshold.

6. The non-transitory, computer-readable storage medium of claim 1, wherein the instructions, when executed by the wearable device and/or the intermediary device in communication with the wearable device, further cause performance of:

in response to detecting, by the one or more biopotential sensors of the wearable device, the second biopotential sensor data during the performance of another user movement, providing instructions for performing a command associated with the one or more biopotential-based gestures.

7. The non-transitory, computer-readable storage medium of claim 1, wherein associating the second biopotential sensor data with the one or more biopotential-based gestures includes storing the second biopotential sensor data and a location of the one or more biopotential sensors on the user's body when the second biopotential sensor data was captured.

8. The non-transitory, computer-readable storage medium of claim 7, wherein the instructions, when executed by the wearable device and/or the intermediary device in communication with the wearable device, further cause performance of:

in accordance with a determination that the wearable device has been reposition, determining updated biopotential sensor data to be associated with the one or more biopotential-based gestures, wherein the biopotential sensor data is based in part on the second biopotential sensor data and the location of the one or more biopotential sensors on the user's body when the second biopotential sensor data was captured.

9. The non-transitory, computer-readable storage medium of claim 1, wherein the graphical elements include a plurality of concentric circles.

10. The non-transitory, computer-readable storage medium of claim 9, wherein each concentric circle of the plurality of concentric circles is associated with a distinct motor unit.

11. The non-transitory, computer-readable storage medium of claim 1, wherein detecting the second activation of the one or more biological motor units includes:

while biopotential sensor data captured during performance of a respective movement does not satisfy the gesture mapping threshold:

determining, based on biopotential sensor data captured during performance of a respective movement:

a respective movement to be performed by the user, the respective movement i) associated with the activation of the one or more biological motor units and ii) predicted to generate respective optimized biopotential sensor data during performance of the respective movement that would satisfy the gesture mapping threshold, and a respective change to the graphical elements, the respective change indicating respective partial activation of the one or more biological motor units; and presenting, via the communicatively coupled display:

respective instructions for performing the respective movement, and the respective change to the graphical elements; and in accordance with a determination that the biopotential sensor data captured during performance of a respective movement satisfies the gesture mapping threshold:

associating the biopotential sensor data captured during performance of the respective movement with one or more biopotential-based gestures, and presenting, via the communicatively coupled display, a respective change to the graphical elements, the respective change indicating successful activation of the one or more biological motor units.

12. An electronic device, comprising:

one or more displays; and one or more programs, wherein the one or more programs are stored in memory and configured to be executed by one or more processors, the one or more programs including instructions for:

presenting, via the one or more displays, i) first instructions for performing a first movement associated with activation of one or more biological motor units, and ii) graphical elements associated with the activation of the one or more biological motor units;

in response to detecting, by one or more biopotential sensors of a wearable device worn by a user, a first activation of the one or more biological motor units:

determining, based on first biopotential sensor data captured during performance of the first movement:

a second movement to be performed by the user, the second movement i) associated with the activation of the one or more biological motor units and ii) predicted to generate optimized biopotential sensor data during performance of the second movement that would satisfy a gesture mapping threshold; and a first change to the graphical elements, the first change indicating partial activation of the one or more biological motor units, and presenting, via the one or more displays, i) second instructions for performing the second movement, and ii) the first change to the graphical elements; and in response to detecting, by the one or more biopotential sensors of the wearable device, a second activation of the one or more biological motor units:

in accordance with a determination that second biopotential sensor data captured during performance of the second movement satisfies the gesture mapping threshold:

associating the second biopotential sensor data with one or more biopotential-based gestures; and presenting, via the one or more displays, a second change to the graphical elements, the second change indicating successful activation of the one or more biological motor units, and in accordance with a determination that the second biopotential sensor data captured during performance of the second movement does not satisfy the gesture mapping threshold:

determining, based on the second biopotential sensor data captured during performance of the second movement:

a third movement to be performed by the user, the third movement i) associated with the activation of the one or more biological motor units and ii) predicted to generate further optimized biopotential sensor data during performance of the second movement that would satisfy the gesture mapping threshold, and a third change to the graphical elements, the third change indicating additional partial activation of the one or more biological motor units; and presenting, via the one or more displays:

third instructions for performing the third movement, and the third change to the graphical elements.

13. The electronic device of claim 12, wherein the graphical elements are first graphical elements and the instructions, and wherein the one or more programs also include instructions for:

presenting, via the communicatively coupled display, fourth instructions for performing a fourth movement associated with activation of a particular biological motor unit of the one or more biological motor units, and ii) second graphical elements associated with the activation of the particular biological motor unit;

in response to detecting, by the one or more biopotential sensors of the wearable device, a first activation of the particular biological motor unit:

determining, based on first isolated biopotential sensor data captured during performance of the fourth movement:

a fifth movement to be performed by the user, the fifth movement i) associated with the activation of the particular biological motor unit and ii) predicted to generate optimized isolated biopotential sensor data during performance of the fifth movement that would satisfy the gesture mapping threshold, and a first change to the second graphical elements, the first change indicating partial activation of the particular biological motor unit; and presenting, via the communicatively coupled display, i) fifth instructions for performing the fifth movement, and ii) the first change to the second graphical elements; and in response to detecting, by the one or more biopotential sensors of the wearable device, a second activation of the particular biological motor unit:

in accordance with a determination that second isolated biopotential sensor data captured during performance of the fifth movement satisfies the gesture mapping threshold:

associating the second isolated biopotential sensor data with one or more other biopotential-based gesture, and presenting a third change to the second graphical elements, the third change indicating successful activation of the particular biological motor unit.

14. The electronic device of claim 13, wherein the one or more programs also include instructions for:

in accordance with a determination that second isolated biopotential sensor data captured during performance of the fifth movement does not satisfy the gesture mapping threshold:

determining, based on the second isolated biopotential sensor data captured during performance of the fifth movement:

a sixth movement to be performed by the user, the sixth movement i) associated with the activation of the particular biological motor unit and ii) predicted to generate further optimized isolated biopotential sensor data during performance of the sixth movement that would satisfy the gesture mapping threshold, and a fourth change to the second graphical elements, the fourth change indicating additional partial activation of the particular biological motor unit; and presenting, via the communicatively coupled display:

sixth instructions for performing the sixth movement, and the fourth change to the second graphical elements.

15. A method for guiding a user in activating biological motor units, comprising:

presenting, via a communicatively coupled display, i) first instructions for performing a first movement associated with activation of one or more biological motor units, and ii) graphical elements associated with the activation of the one or more biological motor units;

in response to detecting, by one or more biopotential sensors of a wearable device worn by a user, a first activation of the one or more biological motor units:

determining, based on first biopotential sensor data captured during performance of the first movement:

a second movement to be performed by the user, the second movement i) associated with the activation of the one or more biological motor units and ii) predicted to generate optimized biopotential sensor data during performance of the second movement that would satisfy a gesture mapping threshold; and a first change to the graphical elements, the first change indicating partial activation of the one or more biological motor units, and presenting, via the communicatively coupled display, i) second instructions for performing the second movement, and ii) the first change to the graphical elements; and in response to detecting, by the one or more biopotential sensors of the wearable device, a second activation of the one or more biological motor units:

in accordance with a determination that second biopotential sensor data captured during performance of the second movement satisfies the gesture mapping threshold:

associating the second biopotential sensor data with one or more biopotential-based gestures; and presenting, via the communicatively coupled display, a second change to the graphical elements, the second change indicating successful activation of the one or more biological motor units, and in accordance with a determination that the second biopotential sensor data captured during performance of the second movement does not satisfy the gesture mapping threshold:

determining, based on the second biopotential sensor data captured during performance of the second movement:

a third movement to be performed by the user, the third movement i) associated with the activation of the one or more biological motor units and ii) predicted to generate further optimized biopotential sensor data during performance of the second movement that would satisfy the gesture mapping threshold, and a third change to the graphical elements, the third change indicating additional partial activation of the one or more biological motor units; and presenting, via the communicatively coupled display:

third instructions for performing the third movement, and the third change to the graphical elements.

16. The method of claim 15, wherein the graphical elements are first graphical elements and the method includes:

presenting, via the communicatively coupled display, fourth instructions for performing a fourth movement associated with activation of a particular biological motor unit of the one or more biological motor units, and ii) second graphical elements associated with the activation of the particular biological motor unit;

in response to detecting, by the one or more biopotential sensors of the wearable device, a first activation of the particular biological motor unit:

determining, based on first isolated biopotential sensor data captured during performance of the fourth movement:

a fifth movement to be performed by the user, the fifth movement i) associated with the activation of the particular biological motor unit and ii) predicted to generate optimized isolated biopotential sensor data during performance of the fifth movement that would satisfy the gesture mapping threshold, and a first change to the second graphical elements, the first change indicating partial activation of the particular biological motor unit; and presenting, via the communicatively coupled display, i) fifth instructions for performing the fifth movement, and ii) the first change to the second graphical elements; and in response to detecting, by the one or more biopotential sensors of the wearable device, a second activation of the particular biological motor unit:

in accordance with a determination that second isolated biopotential sensor data captured during performance of the fifth movement satisfies the gesture mapping threshold:

associating the second isolated biopotential sensor data with one or more other biopotential-based gesture, and presenting a third change to the second graphical elements, the third change indicating successful activation of the particular biological motor unit.

17. The method of claim 16, including:

in accordance with a determination that second isolated biopotential sensor data captured during performance of the fifth movement does not satisfy the gesture mapping threshold:

determining, based on the second isolated biopotential sensor data captured during performance of the fifth movement:

a sixth movement to be performed by the user, the sixth movement i) associated with the activation of the particular biological motor unit and ii) predicted to generate further optimized isolated biopotential sensor data during performance of the sixth movement that would satisfy the gesture mapping threshold, and a fourth change to the second graphical elements, the fourth change indicating additional partial activation of the particular biological motor unit; and presenting, via the communicatively coupled display:

sixth instructions for performing the sixth movement, and the fourth change to the second graphical elements.

18. The method of claim 15, further comprising:

before determining whether the second biopotential sensor data captured during performance of the second movement satisfies the gesture mapping threshold:

obtaining, from the one or more biopotential sensors of the wearable device:

first candidate biopotential sensor data captured during performance of the second movement, the first candidate biopotential sensor data associated with a first set of biological motor units of the one or more biological motor units, and second candidate biopotential sensor data captured during performance of the second movement, the second candidate biopotential sensor data associated with a second set of biological motor units of the one or more biological motor units, selecting the first candidate biopotential sensor data or the second candidate biopotential sensor data as the second biopotential sensor data based on a comparison of the first candidate biopotential sensor data and the second candidate biopotential sensor data.

19. The method of claim 18, wherein the comparison of the first candidate biopotential sensor data and the second candidate biopotential sensor data includes determining respective candidate biopotential sensor data that satisfies an accuracy threshold.

20. The method of claim 15, further comprising:

in response to detecting, by the one or more biopotential sensors of the wearable device, the second biopotential sensor data during the performance of another user movement, providing instructions for performing a command associated with the one or more biopotential-based gestures.

\* \* \* \* \*